US011922752B2

(12) United States Patent
Haraguchi

(10) Patent No.: US 11,922,752 B2
(45) Date of Patent: Mar. 5, 2024

(54) ILLEGAL-ACT DETECTING MECHANISM, PAPER SHEET TRANSPORT DEVICE, AND PAPER SHEET HANDLING DEVICE

(71) Applicant: JAPAN CASH MACHINE CO., LTD., Osaka (JP)

(72) Inventor: Kohei Haraguchi, Osaka (JP)

(73) Assignee: JAPAN CASH MACHINE CO., LTD., Osaka (JP)

( * ) Notice: Subject to any disclaimer, the term of this patent is extended or adjusted under 35 U.S.C. 154(b) by 903 days.

(21) Appl. No.: 16/962,469

(22) PCT Filed: Oct. 9, 2018

(86) PCT No.: PCT/JP2018/037513
§ 371 (c)(1),
(2) Date: Jul. 15, 2020

(87) PCT Pub. No.: WO2019/146168
PCT Pub. Date: Aug. 1, 2019

(65) Prior Publication Data

US 2021/0082224 A1 Mar. 18, 2021

(30) Foreign Application Priority Data

Jan. 25, 2018 (JP) ................................. 2018-010412

(51) Int. Cl.
*G07D 11/225* (2019.01)
*B65H 7/02* (2006.01)
(Continued)

(52) U.S. Cl.
CPC ............. *G07D 11/225* (2019.01); *B65H 7/02* (2013.01); *G07D 11/16* (2019.01); *G07D 11/14* (2019.01); *G07D 2211/00* (2013.01)

(58) Field of Classification Search
CPC . B65H 5/36; B65H 7/02; B65H 9/004; B65H 9/04; B65H 9/06; B65H 2404/623;
(Continued)

(56) References Cited

U.S. PATENT DOCUMENTS 5,577,589 A * 11/1996 Garcia Tinoco .......... G07F 7/04 194/351
2004/0011619 A1* 1/2004 Yoshioka ................. G07D 7/04 194/206

(Continued)

FOREIGN PATENT DOCUMENTS

CN 2685994 Y 3/2005
EP 0602775 A1 6/1994

(Continued)

OTHER PUBLICATIONS

WIPO, Japanese International Search Authority, International Search Report (with English translation) and Written Opinion dated Nov. 27, 2018 in International Patent Application No. PCT/JP2018/037513, 7 pages.

(Continued)

*Primary Examiner* — Prasad V Gokhale
(74) *Attorney, Agent, or Firm* — MASUVALLEY & PARTNERS; Peter Martinez

(57) ABSTRACT

In an illegal-act detecting mechanism including an opening/closing member for detecting an illegal act and preventing pullout, at the time of stopping the opening/closing member at an initial rotation position, it is prevented that a stop position is deviated due to overrun by an inertial force of a motor. The illegal-act detecting mechanism includes an opening/closing member 50 that permits passage of a paper sheet at the initial rotation position, and blocks passage of the paper sheet at a non-initial rotation position deviated from the initial rotation position, a rotary member 70 that integrally rotates with the opening/closing member, a driv- (Continued)

ing member 90 pivotally supported so as to be able to rotate relative to the opening/closing member, and a drive transmission mechanism 100. The drive transmission mechanism includes at least one driven piece provided in the rotary member, at least one driving piece that is provided in the driving member and intermittently drives and rotates the rotary member, and a buffer member 101 that biases the driven piece and the driving piece in a direction away from each other.

13 Claims, 30 Drawing Sheets

(51) Int. Cl.
*G07D 11/16* (2019.01)
*G07D 11/14* (2019.01)

(58) Field of Classification Search
CPC .......... B65H 2404/72; B65H 2404/721; B65H 2404/722; B65H 2405/321; G07D 11/14; G07D 11/16; G07D 11/17; G07D 11/225; G07D 2211/00
See application file for complete search history.

(56) References Cited

U.S. PATENT DOCUMENTS

| | | | | |
|---|---|---|---|---|
| 2004/0212145 | A1 | 10/2004 | Yang et al. | |
| 2008/0128240 | A1 | 6/2008 | Uemizo et al. | |
| 2013/0032447 | A1 | 2/2013 | Hu et al. | |
| 2014/0027976 | A1 | 1/2014 | Zubarevich et al. | |
| 2015/0030366 | A1* | 1/2015 | Honda | B65H 7/02 399/406 |
| 2017/0315063 | A1 | 11/2017 | Jin et al. | |
| 2020/0039771 | A1* | 2/2020 | Tajima | B65H 3/0669 |

FOREIGN PATENT DOCUMENTS

| | | | |
|---|---|---|---|
| JP | H08147526 | A | 6/1996 |
| JP | H09190559 | A | 7/1997 |
| JP | H1131250 | A | 2/1999 |
| JP | 2005236208 | A | 9/2005 |
| JP | 3817342 | B2 | 9/2006 |
| KR | 20100001039 | U | 2/2010 |
| RU | 2482046 | C2 | 5/2013 |
| TW | 200629177 | A | 8/2006 |
| TW | M418356 | U | 12/2011 |
| TW | 201320010 | A | 5/2013 |
| WO | WO 2016/070643 | A1 | 5/2016 |

OTHER PUBLICATIONS

Russian Office Action (with English translation) dated Feb. 15, 2021 in Russian Application No. 2020124210, 12 pages.
EOP, Extended European Search Report dated Sep. 21, 2021 in European Application No. 18902031.6, 9 pages with translation.

* cited by examiner (a)

(b)

(c)

(a)

(b)

(c)

(d)

A-A SECTIONAL VIEW (a)

(b)

(c)

(d)

B-B SECTIONAL VIEW (a)

(b)

(c)

(d)

D-D SECTIONAL VIEW (a)

ILLEGAL-ACT DETECTING MECHANISM, PAPER SHEET TRANSPORT DEVICE, AND PAPER SHEET HANDLING DEVICE

RELATED APPLICATIONS

This application is the U.S. National Phase of and claims priority to International Patent Application No. PCT/JP2018/037513, International Filing Date Oct. 9, 2018, entitled ILLEGAL-ACT DETECTING MECHANISM, PAPER SHEET TRANSPORT DEVICE, AND PAPER SHEET HANDLING DEVICE; which claims benefit of Japanese Application No. 2018-010412 filed Jan. 25, 2018; both of which are incorporated herein by reference in their entireties.

FIELD

The present invention relates to an illegal-act detecting mechanism, a paper sheet transport device, and a paper sheet handling device that detects an ongoing illegal pulling act of a banknote by pullout means such as a string or a tape connected to the banknote and prevents such an act.

BACKGROUND

In various types of banknote handling devices such as a banknote deposit machine, various automatic vending machines, and a money changer, such an act of illegally receiving provision of articles and services is performed, by inserting a banknote attached with illegal pullout means such as a line material including a fishing line or a string, or a tape that is difficult to be detected by a sensor from an insertion slot into a machine, and after completion of recognition processing of the banknote, pulling back the illegal-act means to collect the banknote from the insertion slot.

Patent Literature 1 discloses a banknote authentication device in which a rotating body having a slit that opens a path to permit passage of a banknote at an initial rotation position (at a home position), and closes the path to block passage of a banknote at a position deviated from the initial rotation position is arranged in a transport route of the banknote. Patent Literature 1 also discloses a technique that can reliably detect that a banknote attached with illegal-act means such as a line material has passed the slit in the banknote authentication device, and prevent damage of the rotating body or a rotary drive device of the rotating body due to an inertial force of a motor at the time of stopping the rotating body at the initial rotation position.

In Patent Literature 1, the rotating body not at the initial rotation position is rotationally transferred toward the initial rotation position, by assembling a gear to the rotating body having the slit coaxially and rotatably relative to each other, and by pressing a protruding junction provided on the rotating body by a protrusion provided in the gear. If the rotating body is stopped at a point in time when it is detected that the rotating body has reached the initial rotation position, a gap is formed as a deceleration section between the junction of the rotating body and the protrusion of the gear. Therefore, the protrusion of the gear rotates while decelerating until there is no deceleration section even after the rotation of the rotating body has stopped to absorb an impact force at the time of coming into contact with the junction, thereby enabling to prevent damage of the rotating body and the rotary drive device of the rotating body. Further, positioning of the slit can be performed reliably at the initial rotation position (overrun can be prevented) at the time of stopping the rotating body.

However, in practice, an optimum deceleration section common to all devices is not always formed due to a variability such as a part accuracy error in each device, and if the deceleration section is too small, the protrusion of the gear presses the junction of the rotating body continuously after coming into contact therewith, and the rotating body may be displaced (overrun) to a rotation position exceeding the initial rotation position. That is, if the deceleration section of all the devices is to be evenly set, it becomes difficult to control the gear to stop at an accurate position and at an accurate timing, while it is further difficult to find, adjust, and set an optimum deceleration section for each device.

If an overrun of the rotating body occurs, it is necessary to reversely rotate the gear by an overrun amount to return the rotating body to the initial rotation position in order to prevent jam of banknotes being transported. However, in a case where the number of operations at a high level of about 500000 is required as a durability specification value of a motor, if reverse rotation is repeated every time one banknote passes, not only a significant deterioration occurs in the durability of the motor, but also the total processing time is prolonged. Further, the stop position and the stop timing of the protrusion can be PWM-controlled so that after the rotating body has stopped at the initial rotation position, the protrusion of the gear does not press the junction of the rotating body excessively. However, this causes problems such as prolongation of the processing time and a decrease in the processing speed, and thus it is not practical.

Differences between Patent Literature 1 and the invention of the present application are further explained in detail in the descriptions of embodiments.

CITATION LIST

Patent Literature

Patent Literature 1: Japanese Patent No. 3817342

SUMMARY

Technical Problem

The present invention has been achieved in view of the above problems, and an object of the present invention is to provide an illegal-act detecting mechanism provided with an opening/closing member for illegal-act detection and illegal-act prevention in a transport route of a paper sheet to permit or block passage of a banknote by changing a rotation posture thereof, and to prevent pullout of a paper sheet after completion of recognition thereof by using illegal-act means fixed to the paper sheet, and prevent misalignment of a stop position of the opening/closing member caused by overrun due to an inertial force of a motor at the time of stopping the opening/closing member at an initial rotation position.

According to the illegal-act detecting mechanism, since misalignment of a stop position of the opening/closing member can be effectively prevented, conventional problems such as deterioration in the durability due to reverse rotation of the motor in order to correct the misalignment, and prolongation of the processing time by executing complicated control can be solved.

Solution to Problem

In order to achieve the above object, an illegal-act detecting mechanism according to the present invention is an illegal-act detecting mechanism that detects that illegal-act means is attached to a paper sheet to be transported, comprising: an opening/closing member that permits passage of the paper sheet at an initial rotation position (an initial rotation angle), and blocks passage of the paper sheet at a non-initial rotation position deviated from the initial rotation position; a rotary member that integrally rotates with the opening/closing member; a driving member for driving the opening/closing member, which is arranged opposite to the rotary member and pivotally supported so as to be able to rotate relative to the rotary member; and a drive transmission mechanism that transmits a driving force from the driving member to the rotary member, wherein the drive transmission mechanism includes at least one driven piece provided in the rotary member, at least one driving piece that is provided in the driving member and intermittently drives and rotates the rotary member by pressing the driven piece directly or indirectly in a process of rotational transfer relative to the driven piece, and a buffer member that biases the driven piece and the driving piece in a direction away from each other.

Advantageous Effects of Invention

According to the present invention, it is possible to prevent misalignment of a stop position of an opening/closing member caused by overrun due to an inertial force of a motor at the time of stopping the opening/closing member at an initial rotation position, in an illegal-act detecting mechanism provided with the opening/closing member for illegal-act detection and pullout prevention.

DESCRIPTION OF EMBODIMENTS

Figure 1:
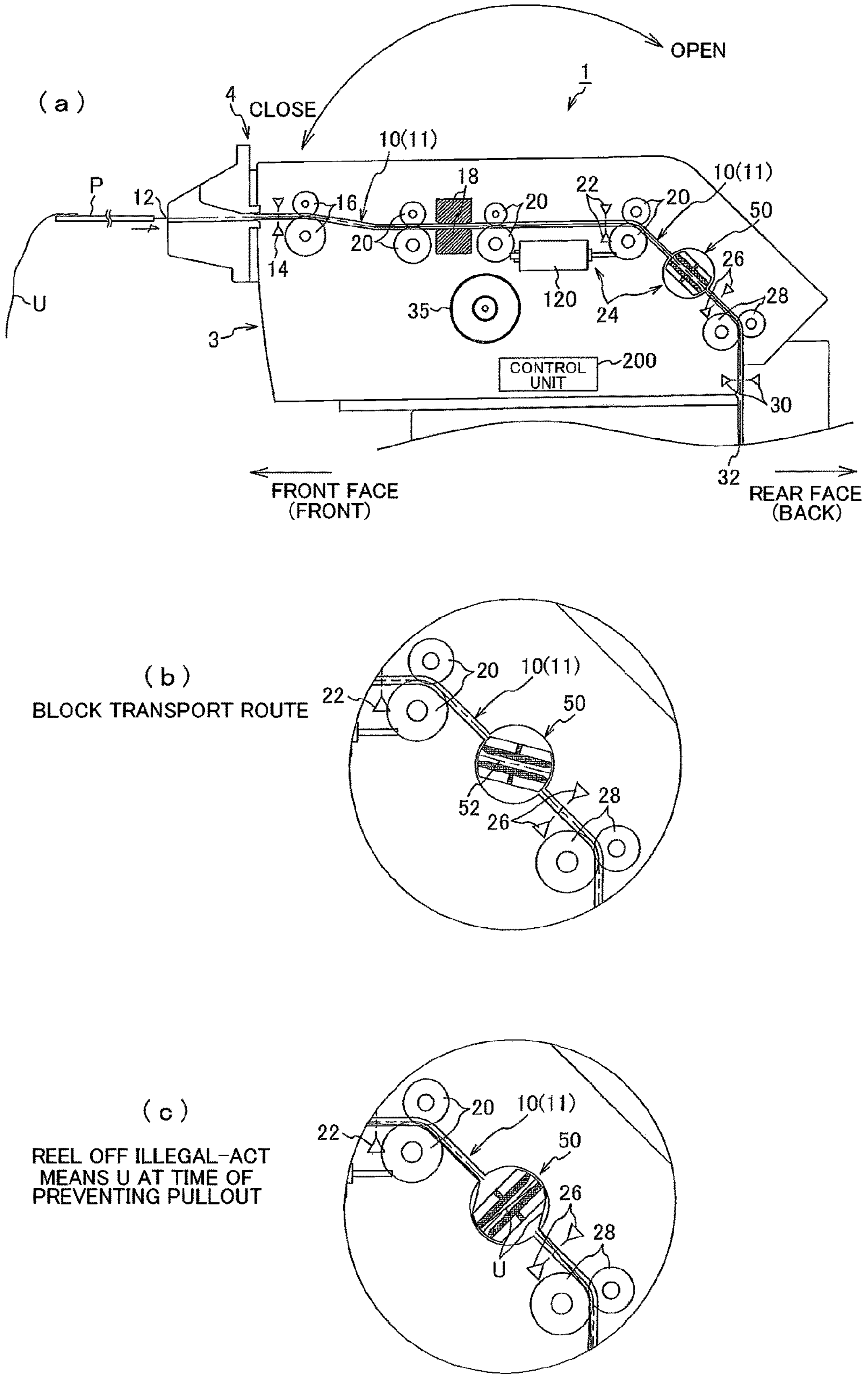
FIG. 1(*a*) is a longitudinal sectional view illustrating an internal configuration of a banknote transport device including an illegal-act detecting mechanism according to the present invention and (*b*) and (*c*) are enlarged views of relevant parts illustrating a closed state of a transport path by an opening/closing member.

The present invention will be described below in detail with embodiments illustrated in the drawings.

Constituent elements, types, combinations, shapes, and relative arrangements described in the following embodiments are merely explanatory examples, and are not intended to limit the scope of the present invention solely thereto unless otherwise specified.

Banknote Transport Device

FIG. 1(*a*) is a longitudinal sectional view illustrating an internal configuration of a banknote transport device including an illegal-act detecting mechanism according to the present invention, and (*b*) and (*c*) are enlarged views of relevant parts illustrating a closed state of a transport path by an opening/closing member. FIG. 1(*b*) illustrates a state where a transport route is blocked, and (*c*) illustrates a state where the opening/closing member is rotated to reel off illegal-act means.

In this example, a banknote is described as an example of paper sheets. However the present device can be applied to prevention of an illegal act in transport of paper sheets other than banknotes, for example, marketable securities, cash vouchers, or tickets.

The banknote transport device (paper sheet transport device) 1 is mounted on a banknote handling device body such as a banknote deposit machine, various automatic vending machines, or a money exchanger (not illustrated) and is used. A banknote accepted by the banknote transport device 1 undergoes authentication of the banknote and recognition of denomination by a recognition sensor, and then is stored sequentially one by one in a cash box in the banknote handling machine body.

The banknote transport device 1 includes a lower unit 3 and an upper unit 4 supported so as to be opened and closed with respect to the lower unit 3, and when the respective units are in a closed state illustrated in FIG. 1, a banknote transport path (transport route) 10 is formed between opposite faces of the respective units.

An inlet 12 for inserting a banknote P is provided at one end of the banknote transport route 10. An inlet paper-passage sensor 14 for detection of a banknote, an inlet roller pair 16, an optical recognition sensor 18 that reads information for recognizing the denomination and authenticity of the banknote, relay roller pairs 20, a paper-passage sensor 22 on an inlet side of an illegal-act preventing mechanism, an illegal-act preventing mechanism 24 configured by an opening/closing member for detection of an illegal act, an illegal-act preventing motor, and the like, a paper-passage sensor 26 on an outlet side of the illegal-act preventing mechanism, an outlet roller pair 28, an outlet paper-passage sensor 30, and an outlet 32 are arranged inside the inlet 12 along the transport route 10. A transport motor 35 that drives the respective roller pairs 16, 20, and 28 for transport of banknotes, and a control unit (CPU, MPU, ROM, RAM) 200 that determines denomination and authenticity of a banknote based on recognition information from the optical recognition sensor 18, and controls the transport motor 35 and other control targets based on a banknote detection signal from the various paper-passage sensors and the outlet sensor are further arranged.

A banknote discharged from the outlet 32 is stored in a stacker device (not illustrated).

The above configuration of the banknote transport device 1 is an example only, and various modifications are possible. For example, various changes and selections are possible such as the number of motors to be used, arrangement of the roller pairs, and the types of the recognition sensor.

The respective roller pairs 16, 20, and 28 are each configured by a drive roller arranged in the lower unit 3, and a driven roller arranged in the upper unit 4, and have a configuration in which both surfaces of a banknote are nipped and transported. The optical recognition sensor 18 is a photocoupler that is configured by a light-emitting element and a light-receiving element arranged opposite to each other, having the transport route 10 therebetween, and can recognize an optical pattern (optical characteristics) of a banknote by receiving light by the light-receiving element after infrared rays generated by the light-emitting element are caused to penetrate the banknote. As the recognition sensor, a magnetic sensor may be used.

Illegal-Act Preventing Mechanism: First Embodiment

Basic Configuration

An illegal-act preventing mechanism according to a first embodiment is described with reference to FIG. 1 to FIG. 11.

Figure 2:
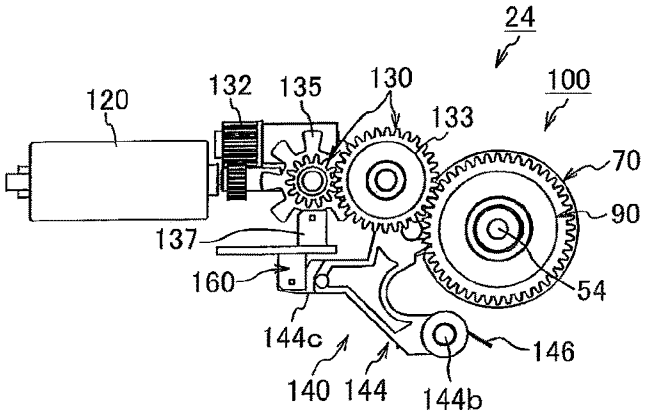
FIGS. 2(*a*), (*b*), and (*c*) are each a front elevation illustrating an example of an illegal-act preventing mechanism, a front elevation illustrating an assembled state of a rotary member and a rotation-posture detecting unit, and a front elevation illustrating a state with a part of a drive gear and a buffer member being added to (b).
Figure 2:
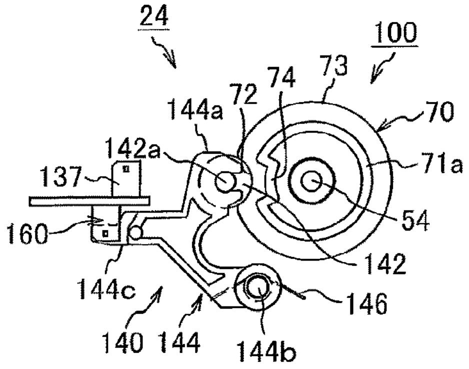
Figure 2:
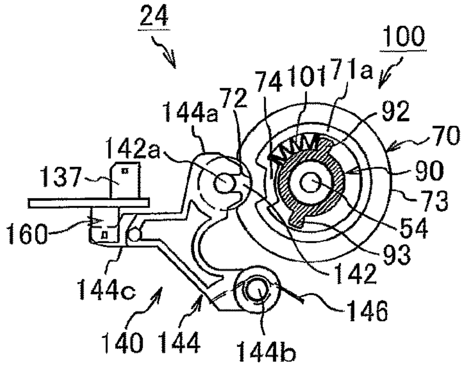
Figure 3:
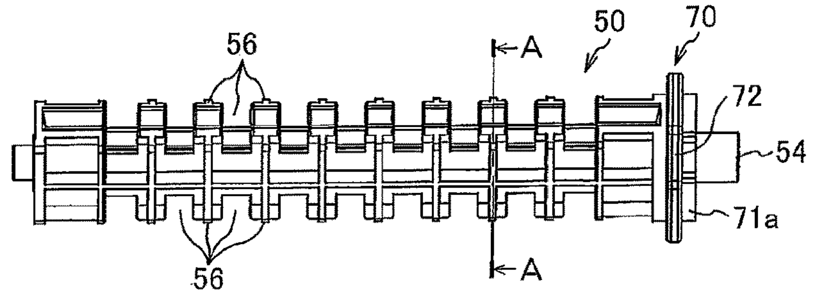
FIGS. 3(*a*) to (*d*) are each an explanatory diagram, a perspective view, a right-side view (with the buffer member) of (a), and an A-A sectional view of (a) illustrating a configuration of the opening/closing member.
Figure 3:
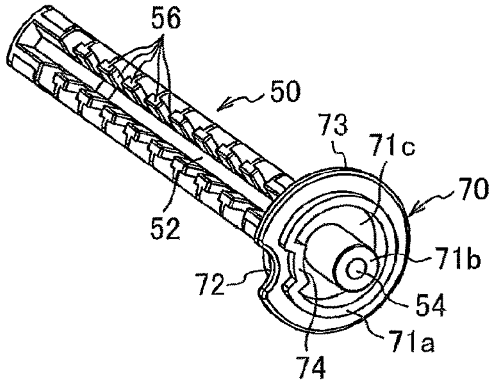
Figure 3:
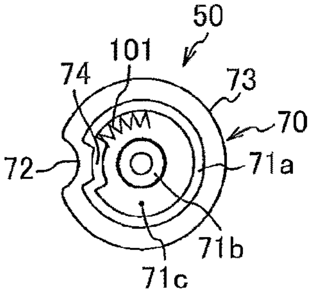
Figure 3:
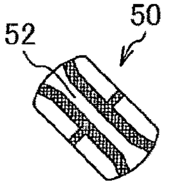
Figure 4:
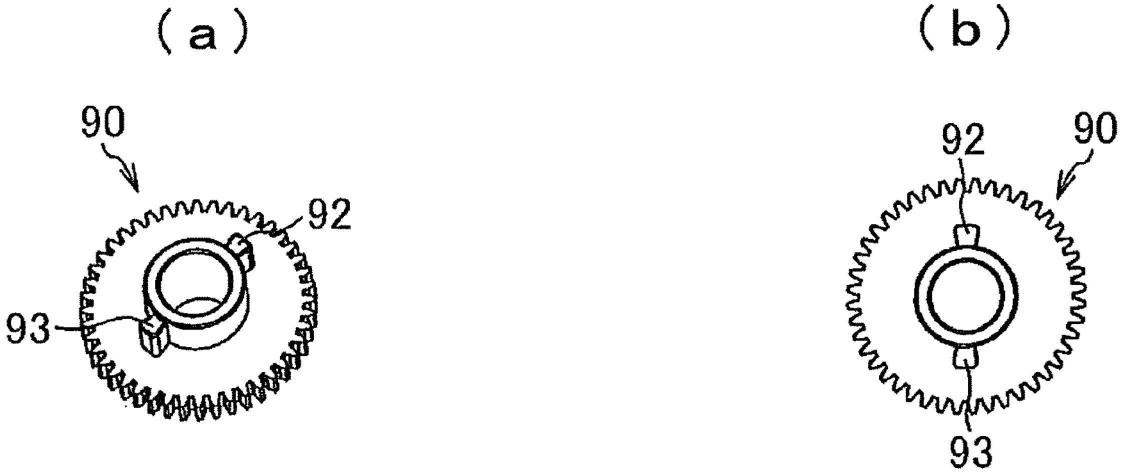
FIGS. 4(*a*) and (*b*) are each a perspective view of an inner side face and a side view of the drive gear.
Figure 5:
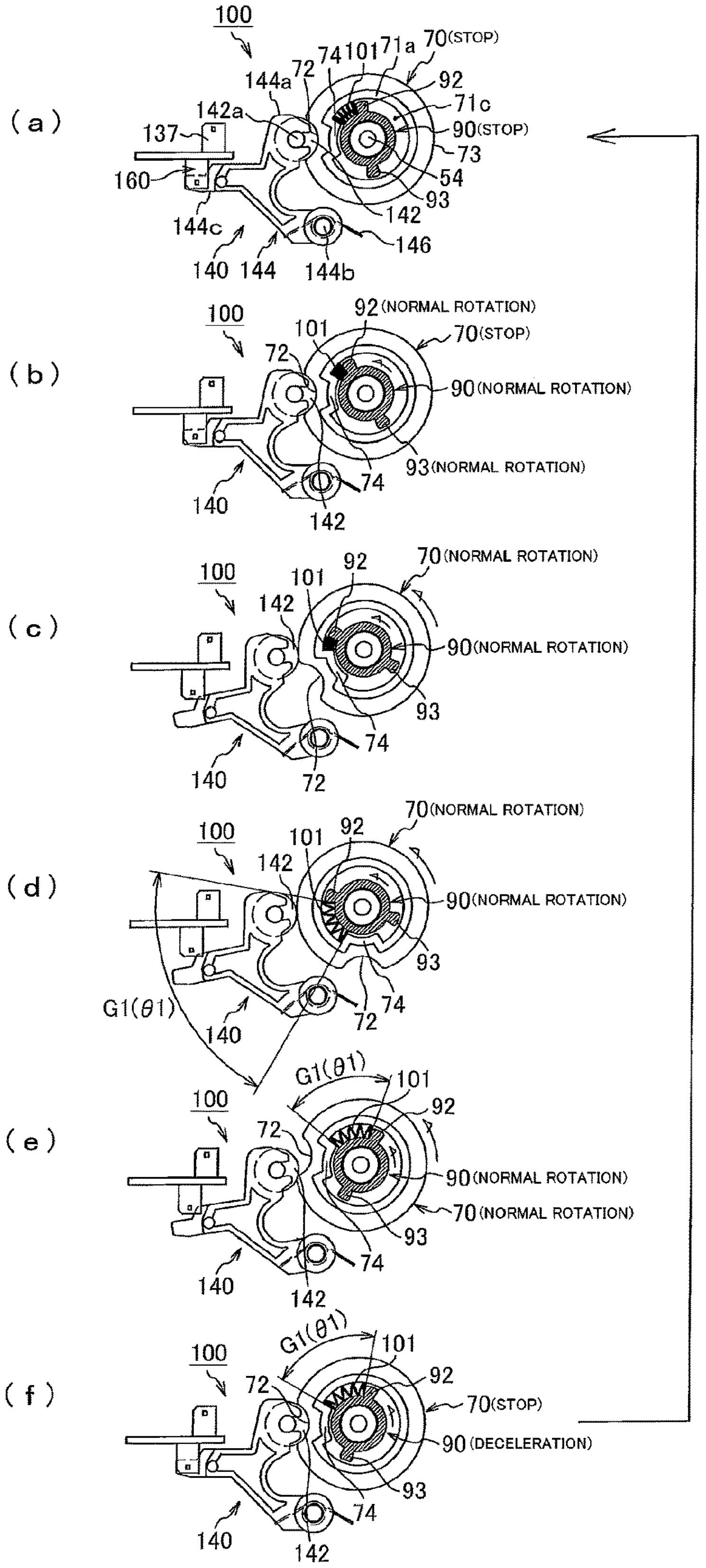
FIGS. 5(*a*) to (*f*) are explanatory diagrams of an operating procedure in the illegal-act preventing mechanism at the time of normal rotation of the opening/closing member.

FIGS. 2(*a*), (*b*), and (*c*) are each a front elevation illustrating an example of the illegal-act preventing mechanism, a front elevation illustrating an assembled state of a rotary member and a rotation-posture (rotation-angle) detecting unit, and a front elevation illustrating a state with a part of a drive gear and a buffer member being added to (b). FIGS. 3(*a*) to (*d*) are each an explanatory diagram, a perspective view, a right-side view (with the buffer member) of (a), and an A-A sectional view of (a) illustrating a configuration of an opening/closing member. FIGS. 4(*a*) and (*b*) are each a perspective view of an inner side face and a side view of the drive gear. FIGS. 5(*a*) to (*f*) are explanatory diagrams of an operating procedure in the illegal-act preventing mechanism at the time of normal rotation of the opening/closing member, and FIGS. 6(*a*) to (*f*) are explanatory diagrams of an operating procedure in the illegal-act preventing mechanism at the time of reverse rotation of the opening/closing member.

The illegal-act preventing mechanism 24 is an illegal-act detecting and preventing mechanism that detects that illegal-act means U for pulling out a banknote P is fixed to the banknote P inserted from the inlet 12 and transported along the transport route 10, and prevents pullout of the banknote by the illegal-act means U.

The illegal-act preventing mechanism 24 includes an opening/closing member 50 for illegal-act detection and illegal-act prevention that includes a guide slit 52 having a shutter function that permits entry and passage of a transported banknote by opening the transport route when the opening/closing member is at an initial rotation position (standby position) illustrated in FIG. 1(*a*), and blocks (disables) passage of a banknote by closing all or a part of the transport route when the opening/closing member is at a non-initial rotation position (FIGS. (1*b*) and (*c*)) deviated from the initial rotation position, and is pivotally supported so as to be able to rotate about a rotation shaft 54 being parallel to the guide slit 52. Further, the illegal-act preventing mechanism 24 includes a rotary member 70 that is a disk with a shaft center being fixed by one end of the rotation shaft 54 of the opening/closing member, includes at least one depressed portion 72 on an outer peripheral edge, and integrally rotates with the opening/closing member. The illegal-act preventing mechanism 24 also includes a drive gear (driving member) 90 for driving the opening/closing member, which is arranged close to and opposite to a lateral surface of the rotary member, with a shaft center being pivotally supported by the one end of the rotation shaft 54 of the opening/closing member so as to be able to rotate relative to the rotary member. The illegal-act preventing mechanism 24 also includes a drive transmission mechanism 100 that operates to transmit a driving force from the drive gear to the rotary member 70 intermittently at a predetermined timing, an illegal-act preventing motor (DC motor) 120 that drives the drive gear, a gear mechanism 130 that transmits the driving force between the illegal-act preventing motor and the drive gear 90, a rotation-posture detecting unit 140 that detects that the opening/closing member is at the initial rotation position or that the opening/closing member is not at the initial rotation position, and a control unit 200 that controls the illegal-act preventing motor 120.

The slit 52 has a shape that permits passage of a banknote, and is configured to permit smooth passage only at the initial rotation position (initial rotation angle), and blocks the passage even if the rotation position moves only slightly. The slit is not essential, and may open or close the transport path in a process of rotation of the opening/closing member itself having no slit, or a notch may be provided in the opening/closing member, so that the notch opens the transport path only when the opening/closing member is at the initial rotation position.

Concavities and convexities 56 formed along a longitudinal side edge of the opening/closing member 50 are configured to engage with corresponding concavities and convexities provided in a cover member on the device body side arranged on an outer diameter side thereof, and small irregularity gaps are formed between the both concavities and convexities. The irregularly gaps have a function of facilitating to catch the pullout means U on the outer periphery of the opening/closing member, when the opening/closing member rotates in a state where the pullout means U fixed to a banknote enters into the slit 52. Further, if the pullout means U twines around the opening/closing member 50, rotation of the opening/closing member 50 is disturbed by the pullout means. Therefore, abnormality occurs in a pulse from rotary encoders 135 and 137 or the rotational speed decreases as compared with the rotational speed of the opening/closing member 50 set as a reference value, and thus it can be determined that an illegal act is being performed.

The drive transmission mechanism 100 according to a configuration example illustrated in FIG. 2 to FIG. 6 has a configuration including one driven piece 74 and two driving pieces 92 and 93. A buffer member 101 has a characteristic that it is arranged in a circumferential gap formed between the driven piece 74 and a first driving piece 92, and biases the driven piece 74 in a normal rotation direction, while being compressed between the first driving piece 92 and the driven piece 74.

That is, the drive transmission mechanism 100 includes at least one driven piece 74 being a protrusion provided on the lateral surface of the rotary member 70, at least one, in the example, two driving pieces 92 and 93 as protrusions provided on an inner side face (a surface opposite to the rotary member) of the drive gear 90 to rotate the rotary member 70 intermittently (at a predetermined timing) by pressing the driven piece directly or indirectly in a circumferential direction (in the normal rotation direction), at a predetermined timing in a process of rotational transfer relative to the driven piece 74, and the buffer member (elastic member) 101 formed by a compression spring or the like that biases the driven piece 74 and the first driving piece 92 in a direction away from each other. The drive gear 90 rotates relative to the rotary member 70 in a range of the circumferential gap between the driven piece 74 and the respective driving pieces 92 and 93.

In the present embodiment, the first driving piece 92 has a configuration to press the driven piece 74 indirectly, that is, via the buffer member 101, and the second driving piece 93 has a configuration to press the driven piece 74 directly.

As the buffer member 101, a plate spring and various other spring members can be used other than the coiled compression spring, and elastic members such as rubber or sponge may be used. The buffer member 101 may be arranged in a free state within a circumferential space between the driving piece 92 and the driven piece 74, or one end thereof may be fixed to the driving piece or the driven piece.

The driven piece 74 is formed by projecting (bending) a part of an inner periphery of an annular convex portion 71*a* provided along an outer peripheral edge of the lateral surface of the rotary member 70 toward an inner diameter side, and in this example, the position for forming the driven piece 74 corresponds to the inner diameter side of the depressed portion 72 (the same circumferential position). However, the circumferential position of the driven piece 74 may not be on the inner diameter side of the depressed portion 72, so long as the operation and the behavior of the drive transmission mechanism described later can be realized.

An annular recess 71*c* formed between the annular convex portion 71*a* and a central convex portion 71*b* is used as a space for accommodating the driving pieces 92 and 93 of the drive gear and the buffer member, at the time of assembly in a state with an internal surface of the drive gear facing an external surface of the rotary member.

As the drive member 90, a pulley may be used instead of the drive gear.

The largest difference between the present invention and Patent Literature 1 is in a configuration of the present invention in which the driven piece 74 and the first driving piece 92 do not come in direct contact with each other, and the buffer member 101 formed of a compression spring is present between the both pieces. Further, in Patent Literature 1, two driven pieces (junctions) are provided on the rotating body with an interval of 130 degrees, and two driving pieces on the drive gear side are also provided with an interval of 180 degrees. On the other hand, in the example of the present embodiment, one driven piece 74 is provided on the rotary member 70, and two driving pieces (92 and 93) are provided on the surface of the drive gear 90 with an interval of 180 degrees. The first driving piece 92 located on an upstream side in the normal rotation direction presses and biases the driven piece 74 via the buffer member 101 at the time of normal rotation, and the second driving piece 93 located on a downstream side in the normal rotation direction directly presses and biases the driven piece 74 at the time of reverse rotation.

When the rotation-posture detecting unit 140 is detecting that the guide slit 52 is at the initial rotation position, the control unit 200 turns off the illegal-act preventing motor 120, and when the rotation-posture detecting unit 140 is detecting that the guide slit 52 is not at the initial rotation position, that is, at a non-initial rotation position, the control unit 200 executes control so that the illegal-act preventing motor is driven in the normal rotation direction to move the rotary member to the initial rotation position via the drive gear.

The gear mechanism 130 includes relay gears 132, 133, 134, and the like arranged in a drive transmission route between an output gear 120*a* of the illegal-act preventing motor 120 and the drive gear 90. A pulse plate 135 is coaxially fixed to the one relay gear 133. A photo interrupter 137 detects notches formed along a peripheral edge of the pulse plate at a predetermined pitch to output a pulse, so that the control unit calculates the outputs per unit time to detect the number of rotations (rotational speed, rotation angle) of the illegal-act preventing motor 120 and the drive gear 90. The pulse plate 135 and the photo interrupter 137 constitute a rotary encoder.

If any two gears constituting the gear mechanism 130 are set as a worm gear constituted by a worm and a worm wheel, reverse rotation by being driven from a load side becomes difficult, thereby making it difficult for a person who intends to perform an illegal act to rotate the opening/closing member reversely by using illegal-act means.

The rotation-posture detecting unit 140 includes a roller (follow-up member) 142 configured by a rotatable roller that fits in the depressed portion 72 and stops when the guide slit 52 is at the initial rotation position, and when the guide slit (the rotary member) is moved from the initial rotation position illustrated in FIG. 1(*a*) to the non-initial rotation position illustrated in FIG. 1(*b*), withdraws from the depressed portion 72 and moves along an outer periphery (a non-depressed portion) 73 of the rotary member, a lever 144 that rotatably supports a shaft 142*a* of the roller by a support portion 144*a*, and rocks the roller about a shaft portion 144*b* provided in another portion toward the outer peripheral edge of the rotary member along a surface orthogonal to the rotation shaft 54. The rotation-posture detecting unit 140 also includes a lever-biasing elastic member (a torsion spring) 146 for elastically biasing the lever 144 in a direction in which the roller 142 comes in pressure contact with the outer peripheral edge of the rotary member, and a home-position detecting sensor 160 that detects that the guide slit 52 is at the initial rotation position by detecting a detected portion 144*c* provided in the lever, only when the roller 142 completely fits (enters) in the depressed portion 72.

The elastic member 146 for elastically biasing the lever (a lever biasing member) 146 is a torsion spring with an annular portion thereof being wound around the shaft portion 144*b*, and biases the lever and the roller to the outer peripheral edge of the rotary member along a pivoting trajectory about the shaft portion 144*b*, with one end projecting from the annular portion being locked by a fixing portion of the device body and the other end portion being locked by an appropriate portion of the lever 144.

The roller 142 as a follow-up member is an example only, and in a case of a member that can move smoothly on the outer peripheral edge of the rotary member because of having low friction resistance, the member may have a configuration in which the member does not rotate.

The control unit 200 turns off the illegal-act preventing motor 120 when the home-position detecting sensor 160 is detecting that the guide slit 52 is at the initial rotation position, and when the guide slit 52 is at the non-initial rotation position deviated from the initial rotation position, drives the illegal-act preventing motor 120 in a normal rotation direction.

While the drive gear (driving member) 90 has a configuration of rotating relative to the rotary member 70 coaxially coupled therewith, the drive gear is means for driving the rotary member 70 via the driven piece since the first driving piece 92 presses the driven piece 74 via the buffer member 101 in a process in which the drive gear rotates in the normal rotation direction (FIGS. 5(*a*) to (*d*)). Further, in a process in which the rotary member is driven in the normal rotation direction by the drive gear 90, when the roller 142 supported by the lever 144 fits in the depressed portion 72 of the rotary member 70 from an outer periphery 73 of the rotary member, the rotary member suddenly increases the speed and enters in the depressed portion due to biasing of the lever biasing member 146. Therefore, the driven piece 74 has a circumferential positional relationship with the first driving piece 92 such that the driven piece 74 is ahead of the first driving piece 92 by a required angle and away from the first driving piece 92 (see FIGS. 5(*e*) and (*f*)).

In other words, when the roller fits in the depressed portion, the rotary member 70 suddenly increases the speed than the rotational speed at the time of being driven by the drive gear until that time due to the force of the lever biasing member 146. Therefore, a gap G1 is formed as a deceleration section between the driven piece 74 and the first driving piece 92 in the circumferential direction.

Further, the rotary member stops rotation mechanically, because the roller biased by a spring fits in the depressed portion.

A circumferential gap between the driven piece 74 and the first driving piece 92 at a point in time when the rotary member stop becomes the deceleration section G1 of the drive gear. That is, since the home-position detecting sensor 160 detects the detected portion 144*c* of the lever at a point in time when the roller completely enters in the depressed portion, the control unit stops the drive of the illegal-act preventing motor 120. Therefore, the drive gear 90 (the first driving piece 92) continuously rotates in the range of the deceleration section by the inertia (by the own momentum) of the illegal-act preventing motor, with respect to the rotary member 70 (the driven piece 74) stopped at the initial rotation position by being locked by the roller. That is, when rotation of the illegal-act preventing motor 120 and the rotary member stops, the inertial force of the drive gear decreases due to an attenuation action of the buffer member while the drive gear 90 performs rotational transfer in the deceleration section while compressing the buffer member 101, and an impact force of the driving piece at the time of pressing the driven piece via the buffer member is alleviated. Due to the buffering action, the rotary member locked by the roller biased by the lever biasing member 146 can continuously maintain the stopped condition at the initial rotation position during a period while the driving piece performs rotational transfer in the deceleration section. Therefore, the opening/closing member 50 is reliably positioned so that the guide slit 52 is at the initial rotation position to open the transport route.

An angular range of the deceleration section to be formed when there is the buffer member 101 has a function of enlarging a distance between the driving piece and the driven piece by the buffer member. Therefore, it is obvious that the deceleration section to be formed when there is the buffer member is larger than the deceleration section to be formed when there is no buffer member. Since the deceleration section increases, deceleration becomes possible with a margin of time, and an impact applied to the driven piece can be diminished significantly.

In this example, a sufficiently wide deceleration section has been ensured by an expanding force of the buffer member at an earlier stage, without using a phenomenon in which the rotary member is ahead of the drive gear due to an energy when the roller fits in the depressed portion.

Next, a problem in the case having a configuration in which the driving piece directly drives the driven piece as in Patent Literature 1 (when the buffer member 101 in the present embodiment is not present) is described with reference to FIG. 7 as comparative diagrams.

Figure 7:
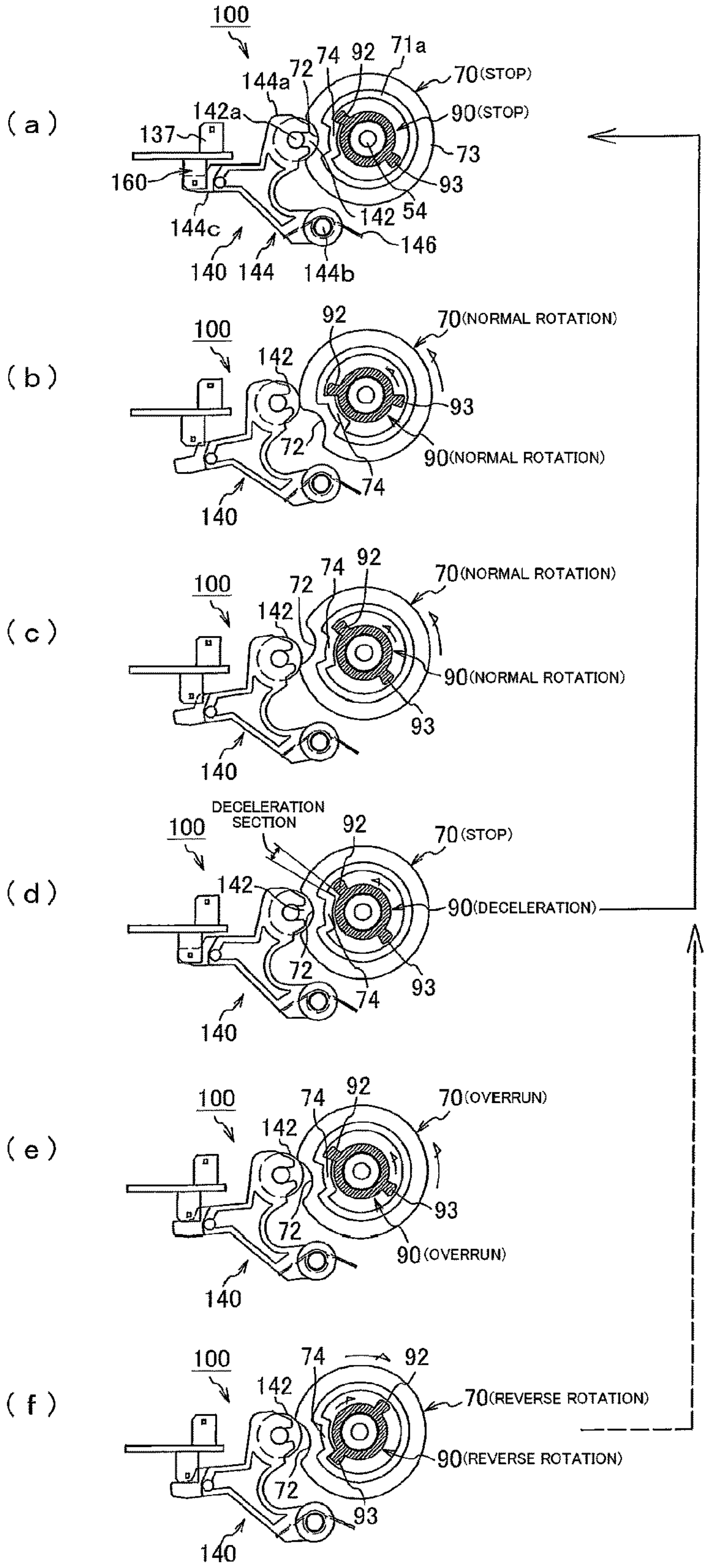
FIGS. 7(*a*) to (*f*) are comparative diagrams illustrating problems in a case where a driving piece directly drives a driven piece.

In FIG. 7(*a*), the guide slit 52 of the opening/closing member 50 is at the initial rotation position and is in an opened state (a standby state) where passage of a banknote P to be transported is permitted. In the standby state, the illegal-act preventing motor 120 has stopped the rotary member 70.

Further, in the standby state in FIG. 7(*a*), the first driving piece 92 of the drive gear 90 is stopped in a state of being in direct contact with the driven piece 74.

Next in the normal-rotation start state in FIG. 7(*b*), when the drive gear 90 presses the rotary member (the driven piece 74) to start rotation thereof, the roller withdraws from the depressed portion (home-out) and moves onto the outer periphery 73 ((*c*)).

Thereafter, when the drive gear 90 and the rotary member 70 integrally rotate in a normal rotation direction, the roller relatively moves along the outer periphery of the rotary member, and becomes a fitted (home-in) state in the depressed portion illustrated in (d).

In the home-in state illustrated in FIG. 7(*d*), the illegal-act preventing motor 120 stops driving, and thus the first driving piece 92 (the drive gear 90) starts to decelerate at the position illustrated in the drawing. That is, since transmission of the driving force from the motor 120 is blocked in a state where a narrow deceleration section is left illustrated in (d) between the first driving piece 92 and the driven piece 74, thereafter, the first driving piece 92 continues rotation in the normal rotation direction by the inertia. However, in the normal rotation process, since the deceleration section is very short, the first driving piece 92 cannot sufficiently decelerate and collides with the driven piece to apply an impact to the driven piece. Therefore, as illustrated in (e), the rotary member overruns and the depressed portion 72 exceeds the roller.

When overrun occurs, the home-position detecting sensor 160 detects occurrence of such a behavior that immediately after the roller fits in the depressed portion once, the roller withdraws from the depressed portion. Therefore, the control unit can recognize the occurrence of overrun. Accordingly, as illustrated in (f), the control unit immediately causes the motor 120 to perform reverse rotation, so that the second driving piece 93 presses the driven piece 74 in a clockwise direction to cause the roller to fit in the depressed portion again, thereby enabling to resolve the overrun.

However, in order to handle occurrence of overrun, if the illegal-act preventing motor 120 is caused to rotate reversely to perform home-in every time overrun occurs, the durability of the motor deteriorates. That is, durability equal to or more than 500000 rotations is required with respect to the DC motor 120 of the banknote transport device 1, for example, for a normal rotation. Therefore, if reverse rotation is added thereto, it is obvious that the durability of the motor deteriorates significantly.

Thus, when the deceleration section is too small, it is not sufficient for the drive gear to decelerate with respect to the rotary member being in the stopped state, thereby causing overrun.

Further, when a larger width can be ensured as the deceleration section than the width illustrated in FIG. 7(*d*), if the momentum when the first driving piece 92 moving in the deceleration section comes into contact with the driven piece 74 being in a stopped state is within an allowable value range, the drive gear 90 can stop without affecting the stopped state of the rotary member. However, if the momentum exceeds the allowable value, the drive gear 90 strongly presses the driven piece 74 against the force of the lever biasing member 146. As a result, when the depressed portion 72 is detached from the roller, the rotary member cannot stay at the initial rotation position and overruns. Therefore, the guide slit 52 moves to a non-initial rotation position to interrupt passage of a banknote.

On the other hand, according to the present invention, the buffer member 101 is provided between the both pieces 74 and 92 so that the driven piece 74 is pressed by the first driving piece 92 via the buffer member 101, thereby enabling to largely ensure a necessary and sufficient deceleration section using the expanding force of the buffer member. Therefore, an occurrence rate of overrun can be decreased significantly, and since reverse rotation is not necessary, deterioration in the durability of the motor can be prevented.

After the outlet sensor 30 confirms passage of a rear end of a banknote to stop the transport motor, the control unit 200 drives the illegal-act preventing motor 120 in a normal rotation direction for an arbitrary number of times. If the pullout means such as a line material is fixed to the banknote, the pullout means remains in the guide slit because the rear end of the banknote has passed through the slit, and thus the opening/closing member 50 is rotated to curl the pullout means around the opening/closing member, thereby enabling to prevent pullback of the banknote by the pullout means. Further, abnormality in the rotational speed of the opening/closing member generated because the pullout means twines around the opening/closing member can be detected by the rotary encoders 135 and 137, thereby enabling to recognize the presence of an illegal act, which serves as a trigger to issue a warning. That is, the pullout means twining around the opening/closing member interrupts rotation of the opening/closing member 50 to decrease the rotational speed. Therefore, a reference rotational speed in a normal state without the pullout means or a reference rotational speed required for returning to the initial rotation position by performing n times of rotations is compared with an actual rotational speed of the opening/closing member or a rotation time required for returning to the initial rotation position, and when the rotational speed of the opening/closing member is slower than a reference value or the rotational speed is longer than the reference time, it can be detected and determined that the pullout means is twining around the opening/closing member.

When the number of rotations of the opening/closing member is constant at all times after a banknote has passed through the guide slit, the timing to stop the rotation may be apparent to a person intending to perform an illegal act to perceive an optimum pullout timing. Accordingly, the number of rotations can be set to be random.

In this example, when the opening/closing member 50 is at the initial rotation position waiting for insertion of a banknote, the guide slit 52 opens a banknote moving route on the transport route. However, at the time of waiting for a banknote, the guide slit may be at a non-initial rotation position to close the transport route, thereby preventing illegal insertion of a tool from the inlet 12 and illegal pullout of a banknote in the stacker device.

The control unit 200 includes a discriminating unit that judges whether a banknote is genuine by receiving an output of the optical recognition sensor 18, and after judging that the banknote is genuine, receives an output of the outlet sensor 30 to continuously drive the transport motor 35 in a normal rotation direction, or when judging that the banknote is not genuine, reversely rotates the transport motor 35 to return the banknote to the inlet 12, and a comparing unit that compares the reference rotation time and/or a reference rotational speed with the actual rotation time and/or the actual rotational speed of the opening/closing member 50, and when the actual rotation time and/or the actual rotational speed is outside a reference range, issues a warning output.

Figure 8:
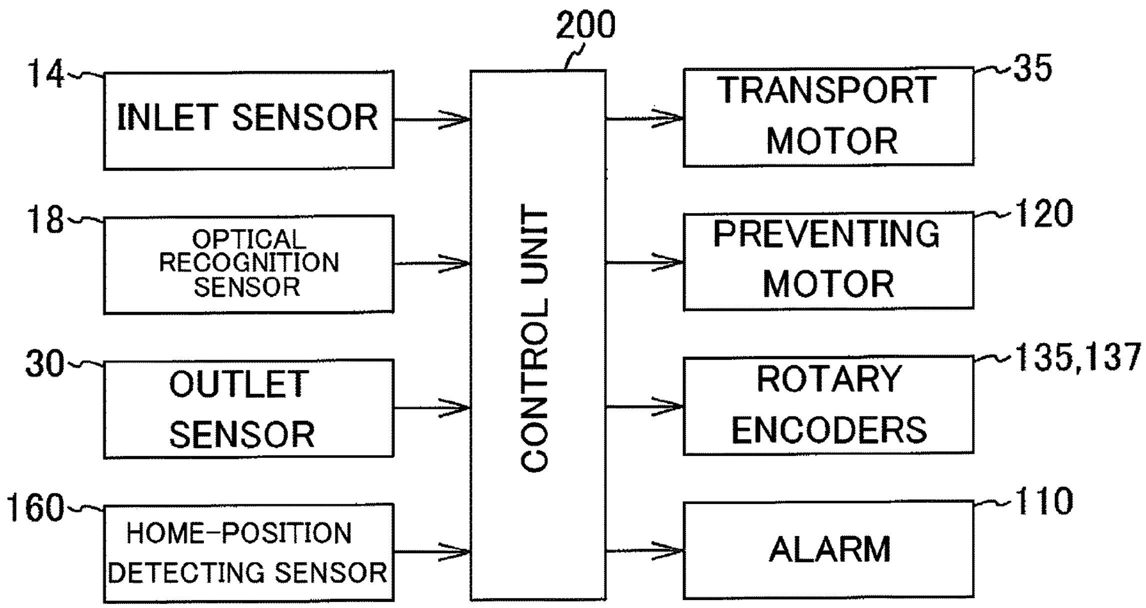
FIG. 8 is a block diagram of a control unit.

As illustrated in a block diagram of the control unit in FIG. 8, the inlet sensor 14, the optical recognition sensor 18, the outlet sensor 30, and the home-position detecting sensor 160 are connected to each input terminal of the control unit 200. The transport motor 35, the illegal-act preventing motor 120, the rotary encoders 135 and 137, and an alarm 110 are connected to each output terminal of the control unit 200. The control unit 200 can calculate outputs of the rotary encoder per unit time to detect the number of rotations and the rotational speed of the illegal-act preventing motor 120.

Figure 9:
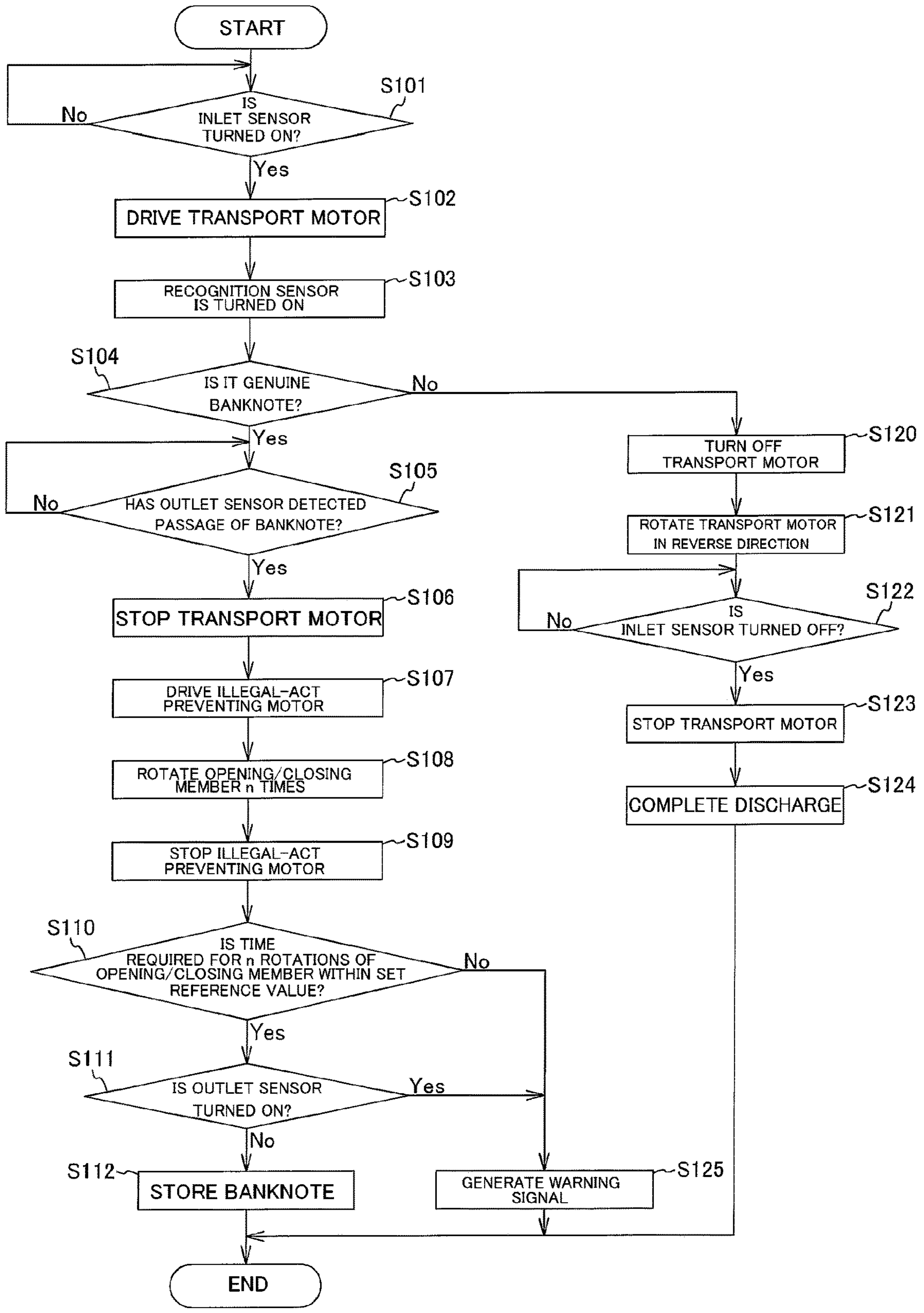
FIG. 9 is a flowchart of an illegal-act detecting and an illegal-act preventing operation in the illegal-act preventing mechanism.

Next, a control procedure of an illegal-act detecting and illegal-act preventing operation in the illegal-act preventing mechanism 24 is described based on a flowchart in FIG. 9.

At Step 101, the control unit (a recognition control circuit) 200 stands by for detecting whether a banknote is inserted into the inlet 12. In the standby state before a banknote is inserted into the inlet 12, the slit 52 of the opening/closing member 50 is held at the initial rotation position illustrated in FIG. 1(*a*) at which an upstream side and a downstream side of the transport route 10 communicate with each other. When a banknote is inserted into the inlet 12 provided at one end of the transport route 10, the inlet sensor 14 detects insertion of the banknote and transmits an output to the control unit 200. Next, at Step 102, the control unit 200 drives the transport motor 35 to transport the banknote along the transport route 10, and at Step 103, turns on the optical recognition sensor 18. Subsequently, the banknote proceeds along the transport route 10, passes through the slit 52 of the opening/closing member 50, and is transported toward the outlet 32.

When the banknote moving along the transport route 10 passes through the optical recognition sensor 18, the control unit 200 receives an output from the optical recognition sensor 18, to determine the authenticity of the transported banknote, whether the banknote is genuine (Step 104). When determining that the banknote is genuine based on optical characteristics of the banknote, the control unit 200 determines whether the outlet sensor 30 has detected passage of the banknote at Step 105. When the outlet sensor 30 has detected passage of the banknote, at Step 106, the transport motor 35 is stopped. When the banknote passes the outlet sensor 30 and the outlet 32, and the transport motor 35 has stopped, at Steps 107 and 108, the control unit 200 transmits an output to the illegal-act preventing motor 120, and stops the illegal-act preventing motor at Step 109 after the opening/closing member 50 is rotated n times. Accordingly, determination at Step 110 can be performed after the illegal-act preventing motor is stopped.

At Step 110, the control unit 200 determines whether the opening/closing member 50 has rotated n times, and when the opening/closing member 50 has rotated n times and the home-position detecting sensor 160 detects the detected portion 144*c* of the lever, the control unit 200 stops the operation of the illegal-act preventing motor 120. The reason of rotating the opening/closing member 50 n times is to find whether a total required time from home-out to home-in at the time of rotating the opening/closing member 50 n times after the banknote is stored in the stacker device is longer than the set reference time (time-out), or whether the number of encoder pulses from home-out to home-in is less than the set reference value. Using the total time required for the opening/closing member to rotate n times n the determination based on the set reference value is an example only, and "time required for one rotation×n determinations" may be used.

Further, only the home-position detecting sensor 160 may be provided without providing the rotary encoder. In this case, the control unit monitors only the time-out of an abnormality determination condition, that is, whether the total required time from home-out to home-in at the time of rotating the opening/closing member 50 n times is longer than the set reference time.

Figure 10:
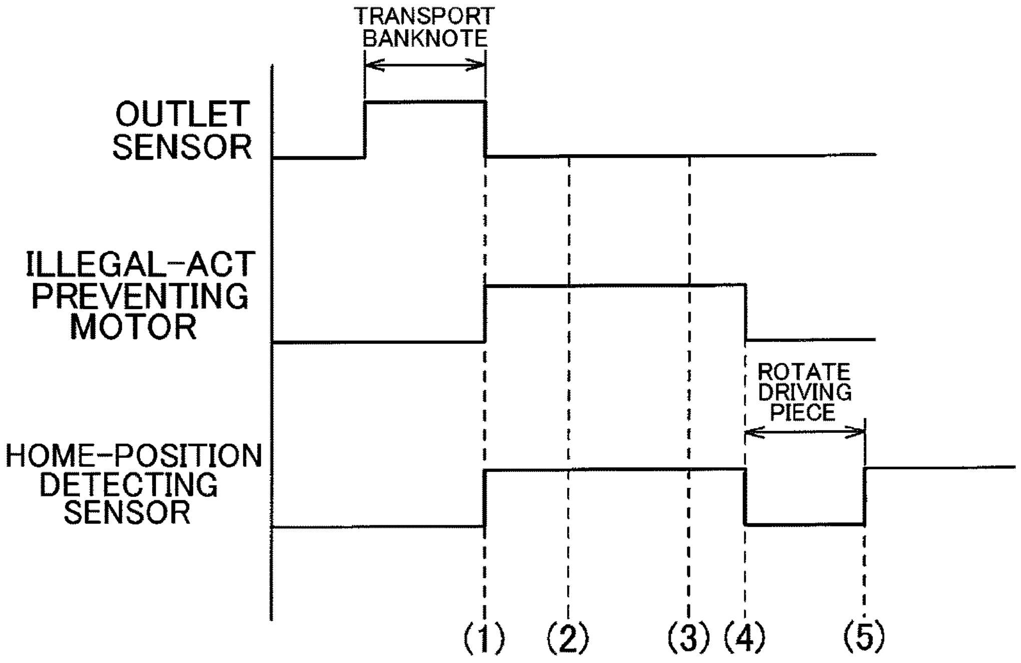
FIG. 10 is a timing chart illustrating respective operations of an outlet sensor, an illegal-act preventing motor, and a home-position detecting sensor.

As illustrated in a timing chart in FIG. 10 illustrating respective operations of the outlet sensor, the illegal-act preventing motor, and the home-position detecting sensor, the outlet sensor 30 generates an output when detecting passage of a banknote. However, at a point in time when a rear end of a banknote completely passes the outlet sensor 30, the illegal-act preventing motor 120 is biased by the output of the control unit 200, and as illustrated in FIGS. 5(*b*) and (*c*), since the driving piece 92 of the drive gear starts to press the driven piece 74 of the rotary member, while compressing and squeezing the buffer member 101, the opening/closing member 50 starts rotation. At this time, as illustrated in FIG. 5(*c*), the roller 142 moves radially outward of the opening/closing member 50 against the elastic force of the lever biasing member 146, and the detected portion 144*c* of the lever moves away from the home-position detecting sensor 160, and thus the home-position detecting sensor 160 generates an output "1". When the opening/closing member 50 further rotates to rotate the roller 142 to a position just short of the depressed portion 72 as illustrated in FIG. 5(*e*) indicating a state immediately before home-in through FIG. 5(*d*), the roller 142 presses an end portion of the depressed portion 72 in the normal rotation direction by the elastic force of the lever biasing member 146. Therefore, as illustrated in FIG. 5(*f*) illustrating the home-in state, when the roller 142 fits in the depressed portion 72, as illustrated in FIG. 5(*f*), the opening/closing member 50 and the rotary member 70 rotate ahead of the drive gear 90, to operate so as to form an angular gap (the deceleration section G1) between the driving piece 92 of the drive gear and the driven piece 74 of the opening/closing member. However, in the present embodiment, since the buffer member 101 that operates in a direction of separating the driving piece 92 and the driven piece 74 from each other is arranged, in the stages of FIGS. 5(*a*) to (*e*), a gap (deceleration section) G1 sufficient as a deceleration section has already been formed. Therefore, there is no need to expect preceding rotation of the rotary member because the roller fits in the depressed portion and formation of a small deceleration section by the preceding operation. The gap as the deceleration section to be formed when there is no buffer member 101 remains in a very narrow angular range as described with reference to FIG. 7.

In the home-in state illustrated in FIG. 5(*f*), since the output from the home-position detecting sensor 160 is changed from “1” to “0” as illustrated in (4) in FIG. 10. the operation of the illegal-act preventing motor 120 is stopped. Therefore, the inertial force of the illegal-act preventing motor 120 and the gear mechanism 130 generated after the operation of the illegal-act preventing motor 120 has stopped is diminished during movement of the driving piece 92 while compressing the buffer member 101 in the deceleration section G1. Further, since a state where the driving piece 92 does not come in direct contact with the driven piece 74 and a wide deceleration section G1 remains can be maintained, due to the presence of the buffer member 101 as illustrated in FIGS. 5(*e*) and (*f*), the opening/closing member 50 can be reliably moved to and held at the initial rotation position illustrated in FIG. 5(*a*) without generating a strong impact from the driving piece 92 with respect to the driven piece 74. Thus, the opening/closing member 50 is reliably positioned at the initial rotation position at which the slit 52 of the opening/closing member 50 comes into alignment with the transport route 10.

If pullout means U such as a cord, a string, or a tape is connected to an authentic banknote having passed through the outlet 32, the pullout means is in a state extended in the transport route 10 and the slit 52 of the opening/closing member 50. Therefore, at Steps 107 and 108, when the opening/closing member 50 is rotated n times, the pullout means U twines around the outer periphery of the opening/closing member 50, while being held in a small clearance formed between the concavities and convexities 56 of the opening/closing member 50 and concavities and convexities on the device body side. Since the pullout means twines around the outer periphery of the opening/closing member 50, rotation of the opening/closing member 50 is interrupted by the pullout means. Therefore, an abnormality occurs in the pulse acquired from the pulse plate 135 constituting the rotary encoder, or the rotational speed of the opening/closing member 50 decreases as compared with the set reference value. Accordingly, at Step 110, when the time required for n rotations of the opening/closing member (total required time from home-out to home-in during n rotations) is longer than the set reference value (at the time of time-out), or when the number of encoder pulses during n rotations of the opening/closing member is less than the set reference value, the control unit 200 determines that the pullout means is being connected to a banknote, and at Step 125, transmits a warning signal to the alarm 110 to operate the alarm 110, and ends the process. The pullout means twining around the outer periphery of the opening/closing member 50 can be removed by opening the upper unit 4 and rotating the opening/closing member 50. At Step 110, when the time required for n rotations of the opening/closing member is within the set reference value, or the number of encoder pulses during n rotations of the opening/closing member is within the set reference value, the control unit 200 determines that the pullout means is not connected to the banknote, and proceeds to Step 111, to determine whether the outlet sensor 30 is in an on state. When the banknote is stored in the stacker device, the outlet sensor 30 is maintained in an off state. However, if the banknote is pulled out by the pullout means, the banknote passes through the outlet sensor 30 in a reverse direction, and thus the outlet sensor 30 is in an on state. At Step 111, if the outlet sensor 30 is in an on state, the control unit 200 determines that the banknote is pulled out by the pullout means, to generate a warning signal at Step 125. At Step 111, if the outlet sensor 30 in an off state, the control unit 200 stores the banknote in the stacker device at Step 112, to end the process.

At Step 104, when the control unit 200 determines that the banknote is not genuine, at Steps 120 and 121, the control unit 200 stops the transport motor 35, and rotates the transport motor 35 in a reverse direction, to return the banknote toward the inlet 12.

At Step 122, when the inlet sensor 14 is turned off, the control unit 200 stops the drive of the transport motor 35 (Step 123), and completes discharge of the banknote (Step 124), to end the process.

The control procedure for illegal-act detecting and illegal-act preventing operation in the illegal-act preventing mechanism 24 described with reference to FIG. 9 is common in all the embodiments described below, and therefore redundant explanations thereof are omitted in the following embodiments.

Operation of Illegal-Act Preventing Mechanism According to First Embodiment

Figure 11:
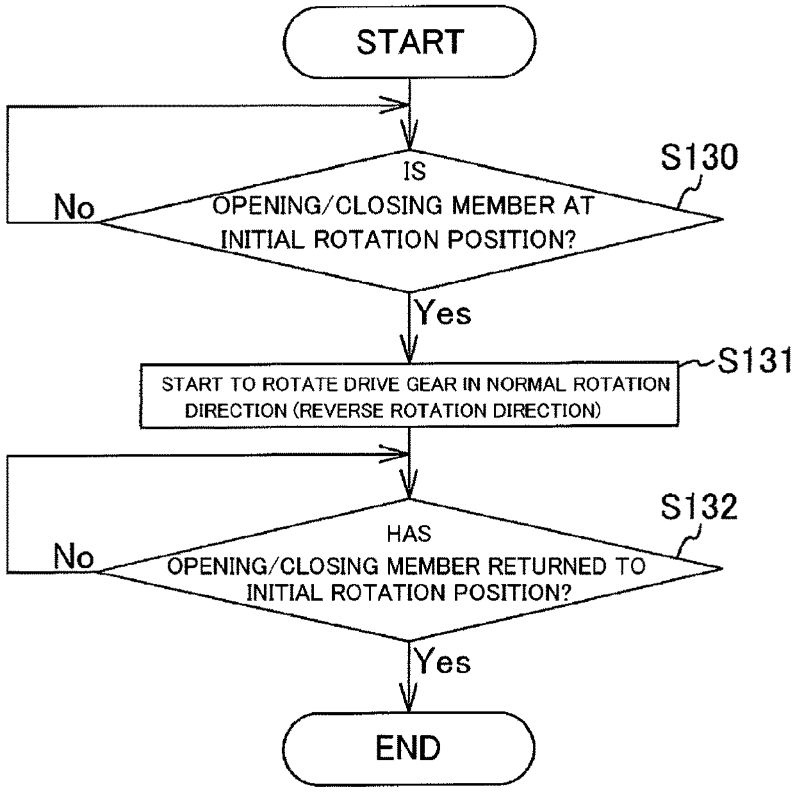
FIG. 11 is a flowchart of an operating procedure for rotating the opening/closing member n times.

Next, a rotation-posture control procedure of the opening/closing member in an illegal-act preventing mechanism 24 according to a first embodiment is described with reference to FIGS. 5, FIGS. 6, and FIG. 11.

FIGS. 5(*a*) to (*f*) are explanatory diagrams illustrating a rotation-posture control procedure of the opening/closing member at the time of normal rotation of the illegal-act preventing motor in the illegal-act preventing mechanism according to the first embodiment. FIG. 11 is a flowchart illustrating an operating procedure for rotating the opening/closing member n times, and is a subroutine corresponding to Step 108 in the flowchart in FIG. 9.

In FIG. 5(*a*), the guide slit 52 of the opening/closing member 50 is at an initial rotation position and in an opened state (a standby state) where it is permitted that a banknote P transported on the transport route along a longitudinal direction passes through the guide slit smoothly. In the standby state, since the detected portion 144*c* of the lever is being detected by the home-position detecting sensor 160, the illegal-act preventing motor 120 is stopped. Since the roller 142 supported by the lever 144 biased by the lever biasing member 146 completely fits in the depressed portion 72 of the rotary member, the rotary member 70 stops rotation. At this time, Step 130 in FIG. 11 becomes YES, and it is detected that the opening/closing member is at the initial rotation position.

Further, in the standby state in FIG. 5(*a*), the first driving piece 92 of the drive gear (driving member) 90 has stopped in a state with the first driving piece 92 being engaged with one end of the driven piece 74 via the buffer member 101. At this time, as illustrated in the drawing, the buffer member 101 is compressed by a predetermined force between the driven piece and the first driving piece. However, an elastic force large enough to detach the roller 142 from the depressed portion is not generated.

Next, in a normal-rotation start state (Step 131) in (b), the control unit 200 causes the illegal-act preventing motor 120 to start rotation in a normal rotation direction. Therefore, the drive gear 90 starts rotation ahead of the rotary member being in the stopped state, to compress the buffer member 101 strongly. When the compressed state of the buffer member 101 exceeds a predetermined limit, the pressing force transmitted from the driving piece to the driven piece via the buffer member increases, and thus the rotary member starts rotation against the biasing force of the lever biasing member 146. When the rotary member starts rotation, the depressed portion 72 starts rotational transfer with respect to the roller 142, and as sequentially illustrated in (c) and (d), the roller is displaced in an outer diameter direction and withdraws from the depressed portion (home-out), and moves onto the outer peripheral edge 73 to continue relative movement along the outer peripheral edge.

The rotation-posture detecting unit 140 continuously detects whether the opening/closing member has returned to the initial rotation position during this period (Step 132).

After the roller withdraws from the depressed portion, as illustrated in (d) and (e), the buffer member 101 is released from the pressure from the drive gear and is in an expanded state. That is, the rotary member rotates ahead of the drive gear due to biasing with an appropriate strength when the buffer member expands, and the deceleration section G1 in an angular range necessary and sufficient for deceleration is formed between the driven piece 74 and the driving piece 92.

When the drive gear 90, the expanded buffer member 101, and the rotary member 70 integrally continue normal rotation, the roller relatively moves along the outer peripheral edge of the rotary member while rotating, and becomes a state illustrated in (e) immediately before fitting in the depressed portion (home-in) illustrated in (f). In the present embodiment, different from the configuration example in which the buffer member is not provided as illustrated in FIG. 7, since the distance between the driven piece 74 and the driving piece 92 is sufficiently expanded due to the expanding force of the buffer member 101, there is no need to expect a deceleration section with a small width formed due to an increase in speed when the roller fits in the depressed portion in (e) and thereafter.

Further, since a wide deceleration section G1 can be ensured before home-in, without depending on the behavior of the roller at the time of fitting in the depressed portion, even if the drive gear is rotated at a high speed, smooth rotation without overrun and a return operation to the initial rotation position can be realized. Therefore, an illegal-act preventing mechanism suitable for high-speed processing can be constructed.

In the home-in state illustrated in (f), the illegal-act preventing motor 120 stops driving and transmission of the driving force to the drive gear 90 is blocked. Therefore, the first driving piece 92 of the drive gear starts to decelerate at a position illustrated in the drawing. That is, since transmission of the driving force from the motor 120 is blocked in a state with a large deceleration section G1 indicated by an angle θ1 in (f) being left between the first driving piece and the driven piece, thereafter, the first driving piece continues to rotate in a normal rotation direction by the inertia. In the normal rotation process, the first driving piece 92 compresses the buffer member, while gradually decelerating by the buffering action due to squeezing of the buffer member 101, and can stop without applying an impact to the driven piece. In this manner, a circumferential length of the deceleration section G1 formed at a point in time when the motor 120 stops can be set to a necessary and sufficient length, and further, due to the buffering action of the buffer member, it can be prevented that the driven piece 74 is pressed with an excessive force to cause overrun.

Since overrun of the rotary member is resolved, the guide slit 52 of the opening/closing member 50 can stop at an initial rotation position at all times, and the risk of occurrence of jam of banknotes newly transported in the transport route can be eliminated. Further, a resolving operation of the overrun by reversely rotating the motor 120 is not required, thereby enabling to prevent deterioration in the durability of driving components including the motor, while preventing a decrease in the processing speed.

Figure 6:
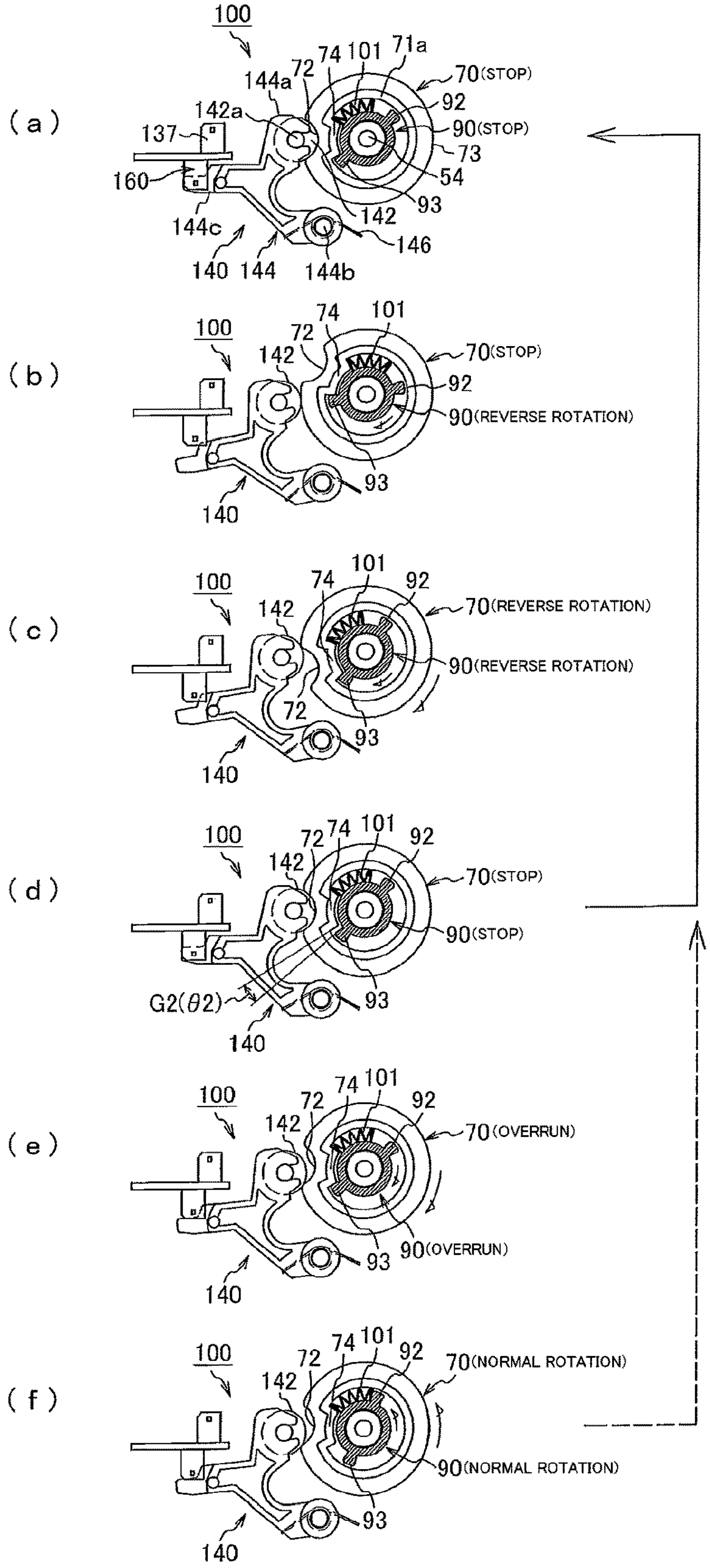
FIGS. 6(*a*) to (*f*) are explanatory diagrams of an operating procedure in the illegal-act preventing mechanism at the time of reverse rotation of the opening/closing member.

Next, FIGS. 6(*a*) to (*f*) are explanatory diagrams illustrating an operating procedure at the time of reverse rotation of the drive transmission mechanism according to the first embodiment.

The drive transmission mechanism 100 performs an operation to reel off the illegal-act means U by rotating the opening/closing member 50 in a normal rotation direction (a counter-clockwise direction) as illustrated in FIG. 5 as the basics of illegal-act detection and illegal-act prevention. However, according to a user's request, there may be such a specification that illegal-act means is reeled off at the time of rotating the opening/closing member in a reverse direction (clockwise direction) in the same banknote transport device 1. Therefore, a configuration that enables reeling off of illegal-act means at the time of reverse rotation in the same drive transmission mechanism is also proposed and explained.

In FIG. 6(*a*), the guide slit 52 of the opening/closing member 50 is at an initial rotation position. In the standby state, since the detected portion 144*c* of the lever is being detected by the home-position detecting sensor 160, the illegal-act preventing motor 120 is stopped, and since the roller 142 completely fits in the depressed portion 72, the rotary member 70 stops rotation.

Further, in the standby state in FIG. 6(*a*), while the second driving piece 93 of the drive gear is at a position coming into contact with the driven piece 74, the first driving piece 92 is at a position away from the buffer member 101.

Subsequently, when the illegal-act preventing motor 120 starts reverse rotation, the second driving piece 93 of the drive gear 90 starts to press the driven piece 74 being in a stopped state in a reverse rotation direction (clockwise direction), and as illustrated in (b), the roller 142 withdraws from the depressed portion 72 (home-out) and moves onto the outer peripheral edge 73.

By continuing the reverse rotation further, in the stage of (c), the roller is immediately before fitting in the depressed portion (home-in).

In (d), the reverse rotation further proceeds, and the roller is in a home-in state in the depressed portion, and the illegal-act preventing motor 120 stops driving to block transmission of the driving force to the drive gear 90. When the roller homes in to the depressed portion, the roller presses one end of the depressed portion in the reverse rotation direction due to biasing by the lever biasing member 146. Therefore, only the rotary member suddenly increases the speed to cause the roller to fit in the depressed portion suddenly, and the driven piece is separated from the second driving piece. Therefore, the second driving piece starts to decelerate from the separated position. That is, transmission of the driving force to the second driving piece from the motor 120 is blocked in a state with a deceleration section G2 indicated by an angle θ2 being left between the second driving piece and the driven piece. Thereafter, the second driving piece continues rotation in the reverse rotation direction by the inertia. When the second driving piece 93 does not press the driven piece 74 with an excessive force to cause home-out, the reverse rotation operation ends. In the reverse rotation operation up to this point, the buffer member 101 does not play a special role.

However, since the deceleration section G2 is very short, if sufficient deceleration cannot be performed in the process of reverse rotation, overrun occurs as illustrated in (e). Particularly, since the buffer member 101 is not present between the second driving piece 93 and the driven piece 74, an occurrence rate of overrun increases. When overrun occurs, as illustrated in (f), the drive gear 90 is rotated in a normal rotation direction by the illegal-act preventing motor, to rotate the driven piece 74 in the normal rotation direction by the first driving piece 92 via the buffer member 101, and the normal rotation is stopped at a point in time when the roller homes in to the depressed portion to stop the normal rotation.

As measures for preventing overrun at the time of reverse rotation, it suffices to arrange a second buffer member between the second driving piece 93 and the driven piece 74. With this configuration, the deceleration section θ2 formed at a point in time when the illegal-act preventing motor has stopped is increased, and even if the second driving piece presses the second buffer member with an excessive force, the pressure is not transmitted to the driven piece due to the buffering action, thereby preventing occurrence of overrun.

By resolving overrun of the rotary member at the time of reverse rotation, the guide slit 52 of the opening/closing member 50 can stop at the initial rotation position at all times, thereby eliminating the risk of occurrence of banknote jam. Further, since a resolving operation of the overrun by rotating the motor 120 in a normal rotation direction is not required, deterioration in the durability of driving components including the motor can be prevented, while preventing a decrease in the processing speed.

Illegal-Act Preventing Mechanism: Second Embodiment

Basic Configuration

An illegal-act preventing mechanism according to a second embodiment is described with reference to FIG. 12 to FIG. 16.

Figure 12:
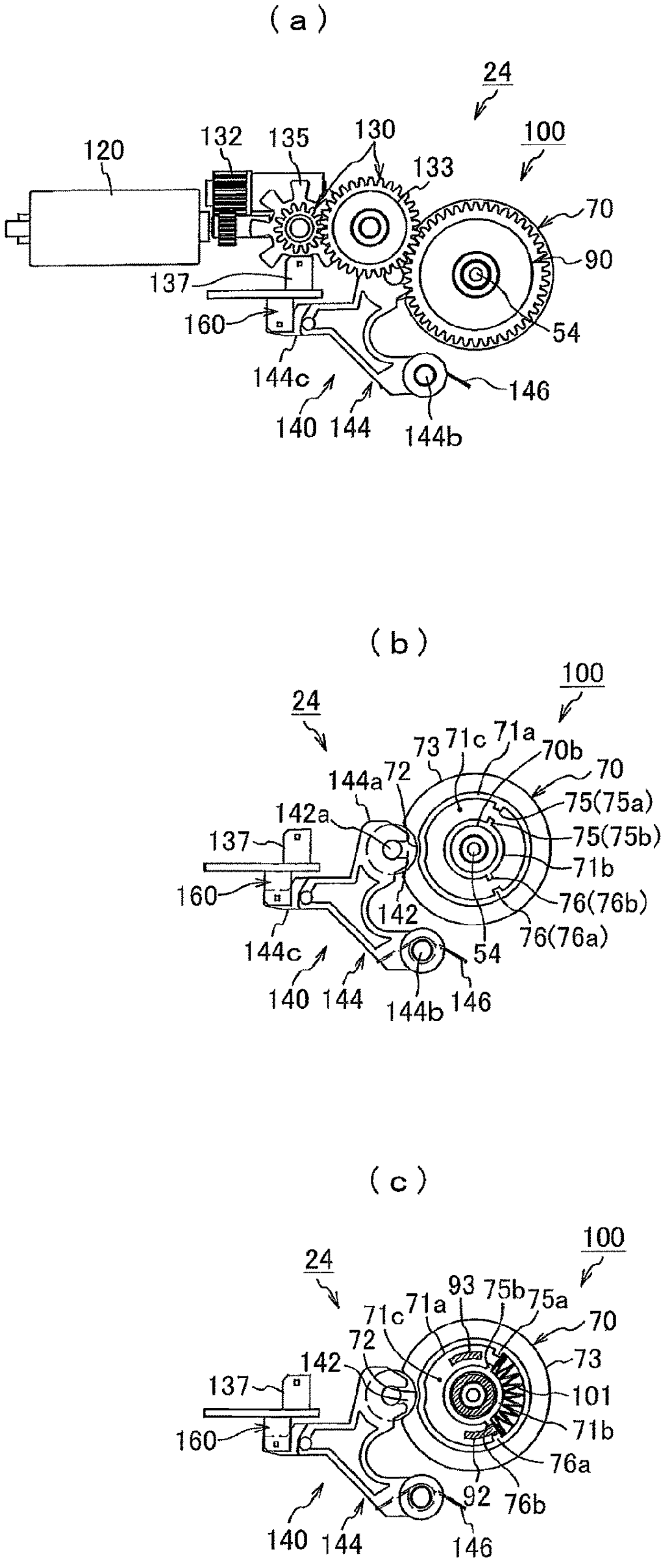
FIGS. 12(*a*), (*b*), and (*c*) are each a front elevation illustrating an example of an illegal-act preventing mechanism according to a second embodiment, a front elevation illustrating an assembled state of a rotary member and a rotation-posture detecting unit, and a front elevation illustrating a state with a part of a drive gear and a buffer member being added to (b).
Figure 13:
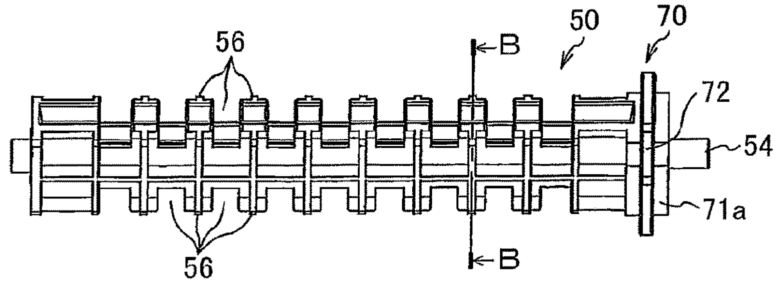
FIGS. 13(*a*) to (*d*) are each an explanatory diagram, a perspective view, a right-side view (with the buffer member) of (a), and a B-B sectional view of (a) illustrating a configuration of an opening/closing member.
Figure 13:
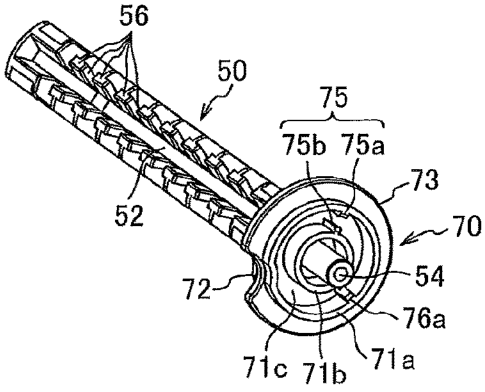
Figure 13:
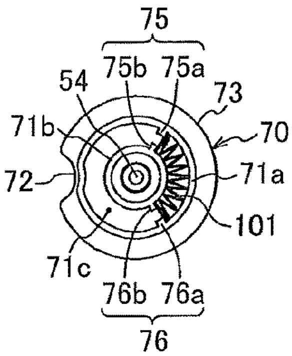
Figure 13:
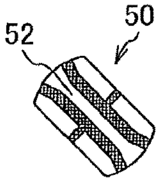
Figure 14:
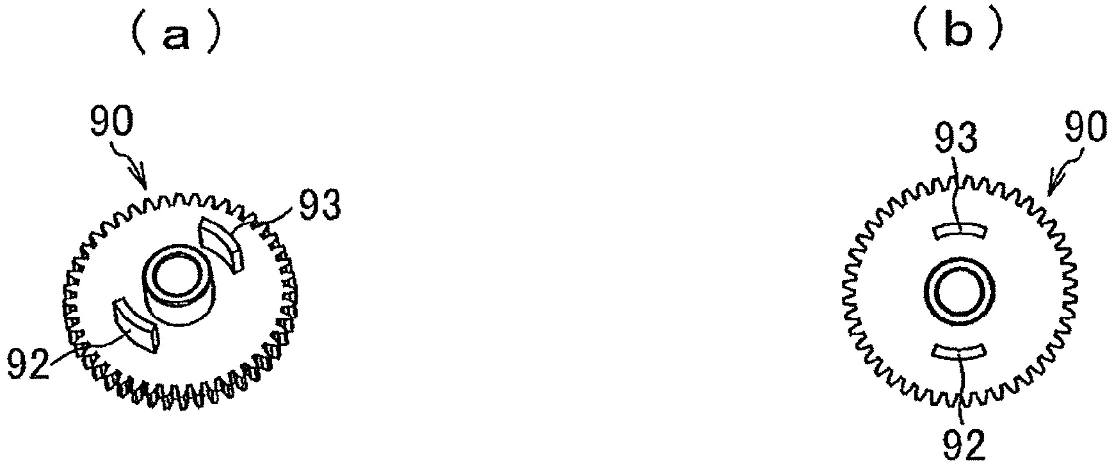
FIGS. 14(*a*) and (*b*) are each a perspective view of an inner side face and a side view of the drive gear.
Figure 15:
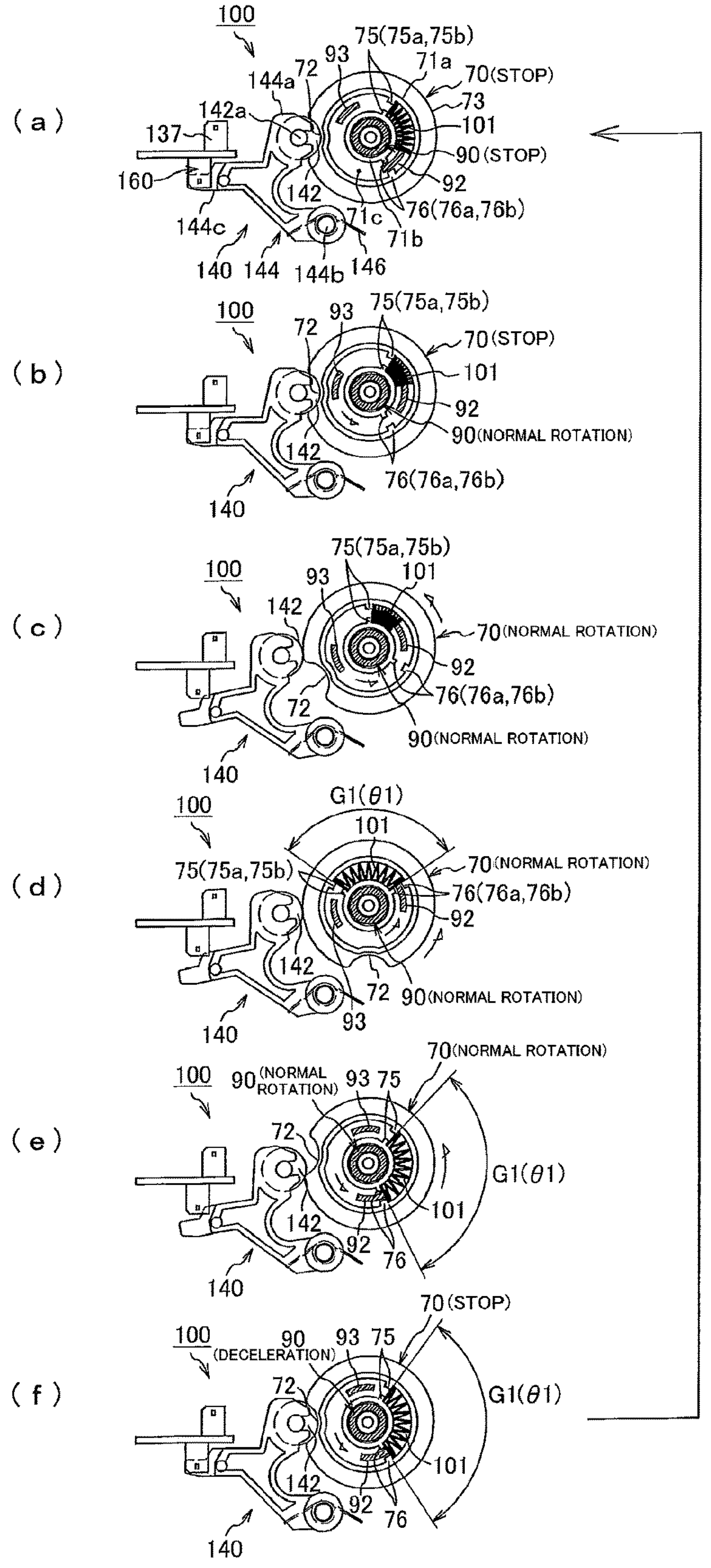
FIGS. 15(*a*) to (*f*) are explanatory diagrams of an operating procedure in the illegal-act preventing mechanism according to the second embodiment at the time of normal rotation of the opening/closing member.

FIGS. 12(*a*), (*b*), and (*c*) are each a front elevation illustrating an example of the illegal-act preventing mechanism according to the second embodiment, a front elevation illustrating an assembled state of a rotary member and a rotation-posture detecting unit, and a front elevation illustrating a state with a part of a drive gear and a buffer member being added to (b). FIGS. 13(*a*) to (*d*) are each an explanatory diagram, a perspective view, a right-side view (with the buffer member) of (a), and a B-B sectional view of (a) illustrating a configuration of an opening/closing member. FIGS. 14(*a*) and (*b*) are each a perspective view of an inner side face and a side view of a drive gear. FIGS. 15(*a*) to (*f*) are explanatory diagrams of an operating procedure in the illegal-act preventing mechanism at the time of normal rotation of an opening/closing member, and FIGS. 16(*a*) to (*f*) are explanatory diagrams of an operating procedure in the illegal-act preventing mechanism at the time of reverse rotation of the opening/closing member.

Parts identical to those in the first embodiment are denoted by like reference signs and explanations of redundant configurations and operations are omitted. That is, the illegal-act preventing mechanism according to the second embodiment is substantially identical to that according to the first embodiment except for the configuration of the drive transmission mechanism 100.

That is, the configuration, functions, and operations of the gear mechanism 130, the rotation-posture detecting unit 140, and the control unit 200 are identical to those according to the second embodiment.

The illegal-act preventing mechanism 24 is an illegal-act detecting and preventing mechanism that detects that illegal-act means U for pulling out a banknote is fixed to a banknote inserted from the inlet 12 and transported along the transport route 10, and prevents pullout of the banknote by the illegal-act means U.

The illegal-act preventing mechanism 24 according to the second embodiment is different from that of the first embodiment in the configuration of the drive transmission mechanism 100, particularly, configurations of the driven pieces 75 and 76 provided in the rotary member 70, configurations of the driving pieces 92 and 93 provided in the drive gear 90, arrangement of the buffer member 101, and the like. Particularly, the illegal-act preventing mechanism 24 of the second embodiment is characterized such that since the driven pieces 75 and 76 and the driving pieces 92 and 93 have a radial positional relationship deviated from each other, while the both pieces do not interfere (come into contact) with each other in a process of relative rotation, the respective driving pieces come into contact with only the buffer member 101 held between two pairs of driven pieces, to press the buffer member 101.

That is, the drive transmission mechanism 100 according to the second embodiment includes a first driven piece 75 (75*a*, 75*b*) being two protrusions provided on the lateral surface of the rotary member 70, a second driven piece 76 (76*a*, 76*b*) arranged at positions away from the first driven piece 75 by a predetermined distance in a clockwise direction, the buffer member (elastic member) 101 formed of a compression spring or the like, which is arranged between the first and second driven pieces 75 and 76 so as to be able to expand and contract, and the two driving pieces 92 and 93 as protrusions provided on the inner side face (a surface opposite to the rotary member) of the drive gear 90 to rotate the rotary member 70 intermittently by coming into contact with the buffer member 101 to press the buffer member 101 in a circumferential direction, in a process of relative rotation with respect to the respective driven pieces 75 and 76 (normal rotation, reverse rotation), via the buffer member 101 and the respective driven pieces 75 and 76.

The respective driven pieces 75 and 76 and the respective driving pieces 92 and 93 have a radial positional relationship in which the driving piece and the driven piece do not interfere (come into contact) with each other. That is, the respective driven pieces 75 and 76 are each configured by short driven pieces 75*a* and 76*a* provided in a protruding manner on an inner periphery of an annular convex portion 71*a* on an external surface of the rotary member, and short driven pieces 75*b* and 76*b* provided in a protruding manner on an outer periphery of a central convex portion 71*b* on the external surface of the rotary member to face the respective driven pieces 75*a* and 76*a*, respectively. Meanwhile, the respective driving pieces 92 and 93 are provided in a protruding manner in an arc-like shape at a radial position (a position corresponding to an intermediate position in the radial width of a recess 71*c*) so as to be able to pass through a radial gap between the driven pieces 75*a* and 75*b*, and a radial gap between the driven pieces 76*a* and 76*b*. Therefore, the respective driven pieces and the respective driving pieces do not interfere with each other in a process of moving relative to each other in the circumferential direction.

The first driving piece 92 comes into contact with one end of the buffer member 101 held between the driven pieces 75 and 76 to press the buffer member 101 at the time of normal rotation illustrated in FIG. 15, thereby to rotate the rotary member in a normal rotation direction via the driven piece 75, while compressing the buffer member 101 between the first driven piece 75 and the first driving piece 92. The second driving piece 93 comes into contact with the other end of the buffer member 101 held between the driven pieces 75 and 76 to press the buffer member 101 at the time of reverse rotation illustrated in FIG. 16, thereby to rotate the rotary member in a reverse rotation direction via the driven piece 76, while compressing the buffer member 101 between the second driven piece 76 and the second driving piece 93.

The following characteristic effects are obtained due to the above characteristic configurations.

That is, at the time of normal rotation, in each stage after home-out illustrated in FIGS. 15(*d*) and (*e*), a deceleration section G1 having a large circumferential length is formed between the first driven piece 75 and the first driving piece 92 due to the enlarging action of the buffer member 101. Therefore, the deceleration section G1 formed when the rotary member stops rotation has similarly a large circumferential length as illustrated in FIG. 15(*f*), and thus deceleration can be performed with a margin of time to prevent overrun.

Accordingly, there is no need to expect formation of a small deceleration section due to preceding rotation of the rotary member by increasing the speed at the time of home-in when the roller 142 fits in the depressed portion 72 from the outer periphery 73 of the rotary member.

As illustrated in FIG. 15(*f*), the circumferential gap G1 between the first driven piece 75 and the first driving piece 92 when the rotary member has stopped rotation becomes the deceleration section G1 of the drive gear. The drive gear 90 (the first driving piece 92) continues rotation within a range of the deceleration section by the inertia (by the own momentum) of the illegal-act preventing motor, with respect to the rotary member 70 (the first driven piece 75) stopped at an initial rotation position by being locked by the roller. That is, the inertial force of the drive gear decreases due to an attenuation action of the buffer member while the first driving piece 92 performs rotational transfer in the deceleration section while compressing the buffer member 101, and an impact force of the driving piece 92 at the time of pressing the driven piece 75 via the buffer member is alleviated. Due to the buffering action, the rotary member locked by the roller biased by the lever biasing member 146 can continuously maintain the stopped state at the initial rotation position during a period while the driving piece 92 performs rotational transfer in the deceleration section. Therefore, the opening/closing member 50 is reliably positioned so that the guide slit 52 is at the initial rotation position to open the transport route.

Also in the present embodiment, an angular range of the deceleration section formed when there is the buffer member 101 has a function of enlarging the distance between the driving piece and the driven piece by the buffer member. Therefore, it is obvious that the deceleration section formed when there is the buffer member is larger than the deceleration section formed when there is no buffer member. Since the deceleration section increases, deceleration becomes possible with a margin of time, and an impact applied to the driven piece can be diminished significantly.

Further, there is another advantage in the second embodiment such that a wide deceleration section can be ensured not only at the time of normal rotation but also at the time of reverse rotation by using one common buffer member 101, to prevent overrun.

The control procedure for illegal-act detecting and illegal-act preventing operation in the illegal-act preventing mechanism 24 according to the second embodiment is identical to the control procedure according to the first embodiment explained based on the flowchart of FIG. 9, and therefore redundant explanations thereof are omitted.

Operation of Illegal-Act Preventing Mechanism According to Second Embodiment

Next, a rotation-posture control procedure of the opening/closing member in the illegal-act preventing mechanism according to the second embodiment is described with reference to FIG. 15, FIG. 16, and FIG. 11.

FIGS. 15(*a*) to (*f*) are explanatory diagrams illustrating the rotation-posture control procedure of the opening/closing member at the time of normal rotation of the illegal-act preventing motor in the illegal-act preventing mechanism according to the second embodiment. FIG. 11 is a flowchart illustrating an operating procedure for rotating the opening/closing member n times, and is a subroutine corresponding to Step 108 in the flowchart in FIG. 9.

In FIG. 15(*a*), the guide slit 52 of the opening/closing member 50 is at an initial rotation position and in an opened state (a standby state) where it is permitted that a banknote P passes through the guide slit. In the standby state, since the detected portion 144*c* of the lever is being detected by the home-position detecting sensor 160, the illegal-act preventing motor 120 is stopped. Since the roller 142 biased by a spring completely fits in the depressed portion 72 of the rotary member, the rotary member 70 stops rotation. At this time, Step 130 in FIG. 11 becomes YES, and it is detected that the opening/closing member is at the initial rotation position.

Further, in the standby state in FIG. 15(*a*), the first driving piece 92 of the drive gear is stopped in a state of lightly compressing the buffer member 101 between the first driving piece 92 and the first driven piece 75. However, at this time, an elastic force large enough to detach the roller 142 from the depressed portion is not generated in the buffer member.

Next, as illustrated at Steps 101 to 105 in FIG. 9, when it is detected that a banknote P inserted from the inlet 12 and detected to be a genuine banknote by the optical recognition sensor 18 passes through the illegal-act preventing mechanism 24 and stored in the stacker on a downstream side, the illegal-act preventing motor 120 is rotated n times as illustrated at Step 108. FIG. 15(*b*) illustrates a normal-rotation start state at this point in time.

That is, in the normal-rotation start state (FIG. 9: Step 131) in FIG. 15(*b*), since the drive gear 90 starts rotation ahead of the rotary member being in a stopped state, the buffer member 101 is strongly compressed between the first driven piece 92 and the first driving piece 75. When the compressed state of the buffer member 101 reaches a marginal state to increase the elastic force, a pressing force transmitted from the first driving piece 92 to the first driven piece 75 via the buffer member increases. Therefore, the rotary member starts normal rotation against the biasing force of the lever biasing member 146. When the rotary member starts normal rotation, the depressed portion 72 starts rotational transfer with respect to the roller 142, and as illustrated sequentially in (c) and (d), the roller is displaced in the outer diameter direction and withdraws from the depressed portion (home-out), and moves onto the outer peripheral edge 73 to start movement. The buffer member continuously maintains the strongly compressed state until the roller withdraws from the depressed portion, and after withdrawal illustrated in (c), expands to form a wide deceleration section G1.

The rotation-posture detecting unit 140 continuously detects whether the opening/closing member has returned to the initial rotation position during this period (Step 132).

After the roller has withdrawn from the depressed portion, as illustrated in (d) and (e), since the buffer member 101 is in a largely expanded state, the deceleration section G1 having a large circumferential length (the angle θ1) is formed between the first driven piece 75 and the first driving piece 92.

After the drive gear 90, the buffer member 101, and the rotary member 70 integrally rotate in the normal rotation direction to become a home-in state illustrated in (e) and (f), transmission of the driving force from the motor 120 to the first driving piece 92 is blocked in a state with the large deceleration section G1 indicated by the angle θ1 in (f) being left between the first driving piece 92 and the first driven piece 75. Thereafter, the first driving piece 92 continues to rotate in the normal rotation direction by the inertia. In the normal rotation process, the first driving piece 92 compresses the buffer member, while gradually decelerating by the buffering action due to squeezing of the buffer member 101, and can stop without applying an impact to the first driven piece 75. Therefore, a large deceleration section G1 formed at a point in time when the motor stops can be ensured, and further, in combination with the buffering action of the buffer member, it can be prevented that the driven piece is pressed with an excessive force to cause overrun.

Although the angle θ1 of the deceleration section G1 in (d) and (e) and the angle θ1 of the deceleration section G1 in (f) are drawn to be constant in the drawings, the angle is not always constant, and the angle θ1 during deceleration in (f) may be shorter than the angle θ1 in (d) and (e).

Since overrun of the rotary member is resolved, the guide slit 52 of the opening/closing member 50 can stop at an initial rotation position at all times, and the risk of occurrence of jam of banknotes newly transported in the transport route can be eliminated. Further, a resolving operation of the overrun by reversely rotating the motor 120 is not required, thereby enabling to prevent deterioration in the durability of the driving components including the motor, while preventing a decrease in the processing speed.

Next, as described in the first embodiment, there may be such a specification that illegal-act means is reeled off at the time of rotating the opening/closing member in a reverse direction (clockwise direction) in the same banknote transport device 1, not only at the time of normal rotation. Therefore, a configuration that enables reeling off of illegal-act means at the time of reverse rotation in one drive transmission mechanism 100 is also explained.

Figure 16:
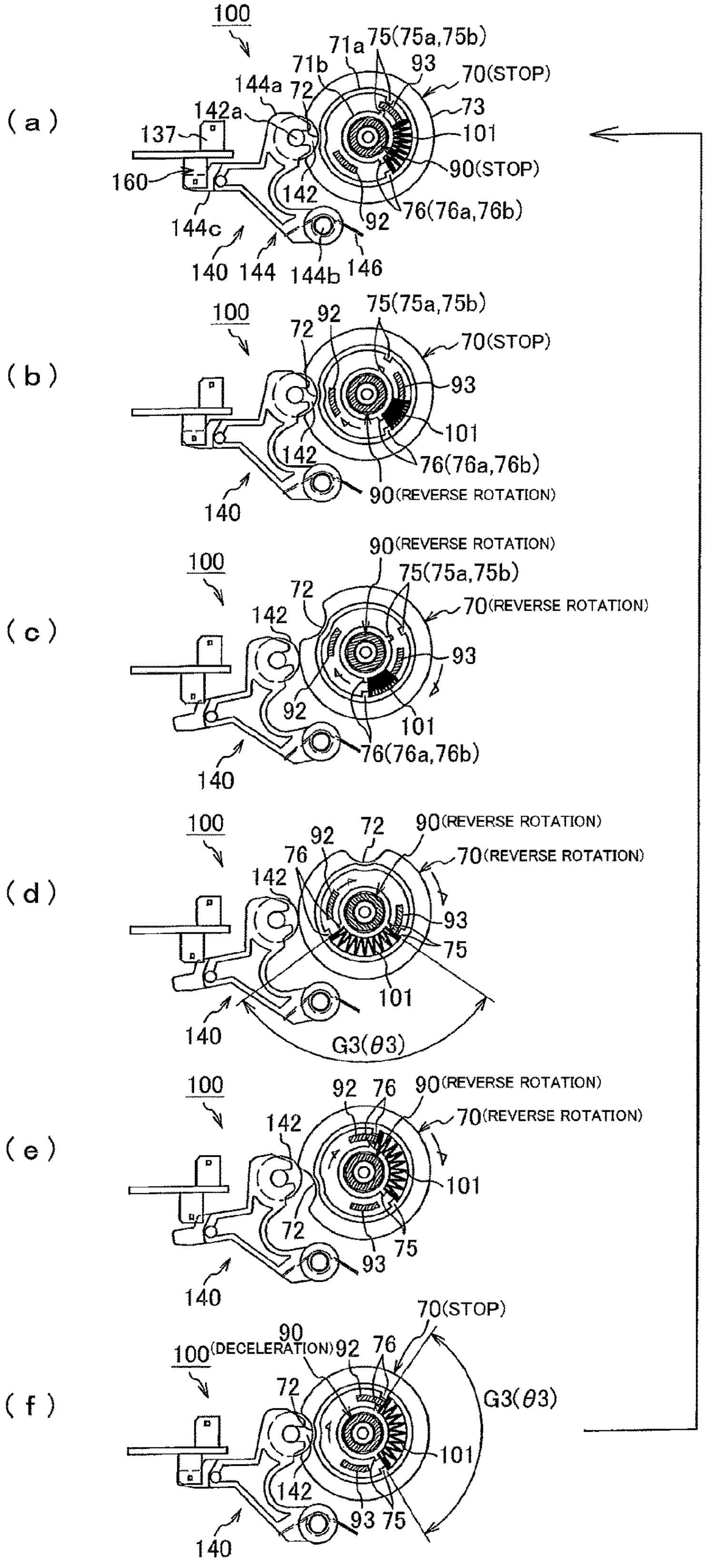
FIGS. 16(*a*) to (*f*) are explanatory diagrams of an operating procedure in the illegal-act preventing mechanism according to the second embodiment at the time of reverse rotation of the opening/closing member.

That is, FIGS. 16(*a*) to (*f*) are explanatory diagrams illustrating a reverse-rotation operating procedure of the illegal-act preventing mechanism according to the second embodiment.

FIG. 16(*a*) illustrates a state where the opening/closing member 50 is waiting for insertion of a banknote, as in FIG. 15(*a*).

In the standby state in FIG. 16(*a*), while the second driving piece 93 of the drive gear is pressing the buffer member 101 with the second driven piece 76, the first driving piece 92 is at a position away from the buffer member 101.

Subsequently, when the illegal-act preventing motor 120 starts reverse rotation in (b), the second driving piece 93 starts to press the second driven piece 76 being in a stopped state in the reverse rotation direct on (clockwise direction) via the buffer member, and as illustrated in (c), the roller 142 withdraws from the depressed portion 72 (home-out) and moves onto the outer peripheral edge 73. In (b) and (c), since the buffer member is compressed with a strong force, the force of the second driving piece 93 is transmitted to the second driven piece 76.

By continuing the reverse rotation further, in (d) and (e) after home-out, the buffer member expands widely, and as a result, the rotary member is in a state of being ahead of the drive gear, to form a wide deceleration section G3.

In (f), reverse rotation proceeds further and the roller homes in to the depressed portion, to block transmission of the driving force to the drive gear 90. At a point in time when the roller homes in, a wide deceleration section G3 has been already ensured between the second driven piece 76 and the second driving piece 93 by the expanding force of the buffer member 101. Since the second driving piece starts deceleration from this separated position, the second driving piece can perform sufficient deceleration. The mechanism of resolving the overrun by the presence of the deceleration section G3 and the advantage thereof are the same as those at the time of normal rotation illustrated in FIG. 15.

Illegal-Act Preventing Mechanism: Third Embodiment

Basic Configuration

An illegal-act preventing mechanism (drive transmission mechanism) according to a third embodiment is described with reference to FIG. 17 to FIG. 21.

Parts identical to those in the second embodiment are denoted by like reference signs and explanations of redundant configurations and operations are omitted. That is, the illegal-act preventing mechanism according to the third embodiment is substantially identical to that according to the second embodiment except for the configuration of the drive transmission mechanism 100. That is, the configuration, functions, and operations of the gear mechanism 130, the rotation-posture detecting unit 140, and the control unit 200 are identical to those according to the second embodiment.

Figure 17:
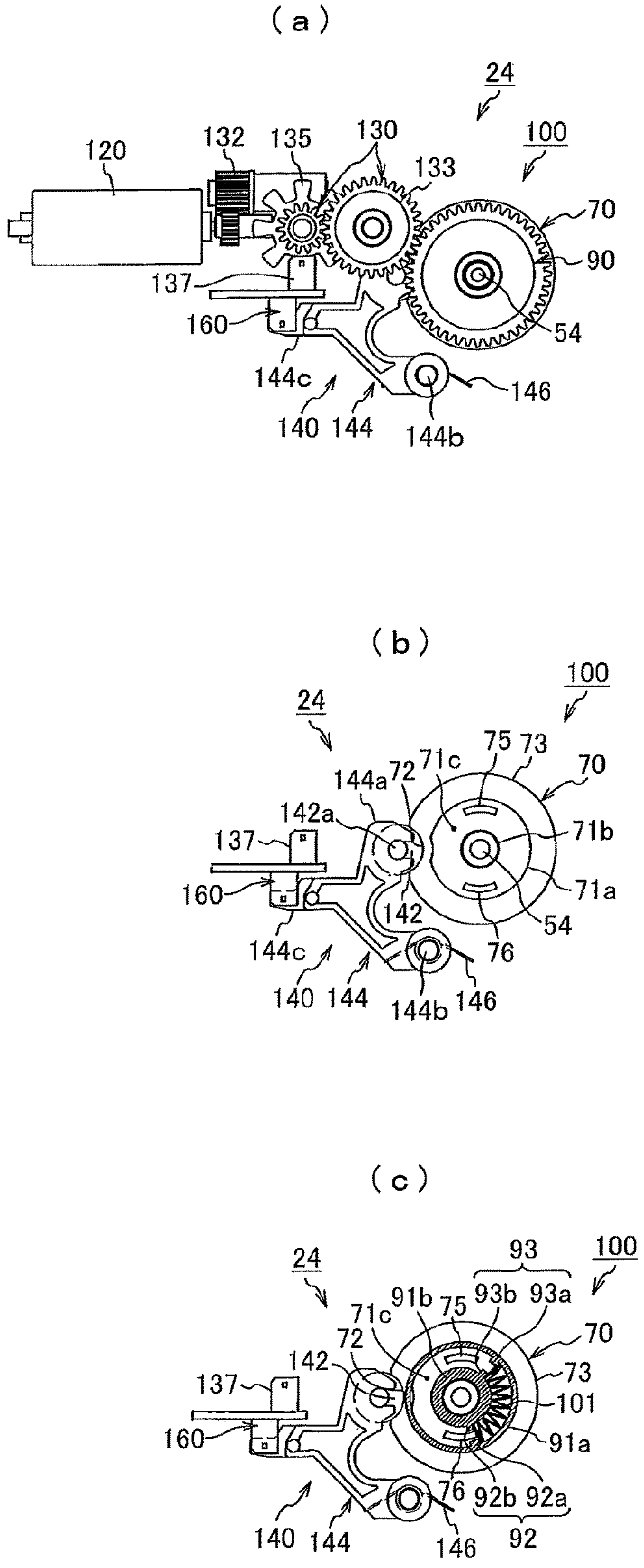
FIGS. 17(*a*), (*b*), and (*c*) are each a front elevation illustrating an example of an illegal-act preventing mechanism according to a third embodiment, a front elevation illustrating an assembled state of a rotary member and a rotation-posture detecting unit, and a front elevation illustrating a state with a part of a drive gear and a buffer member being added to (b).
Figure 18:
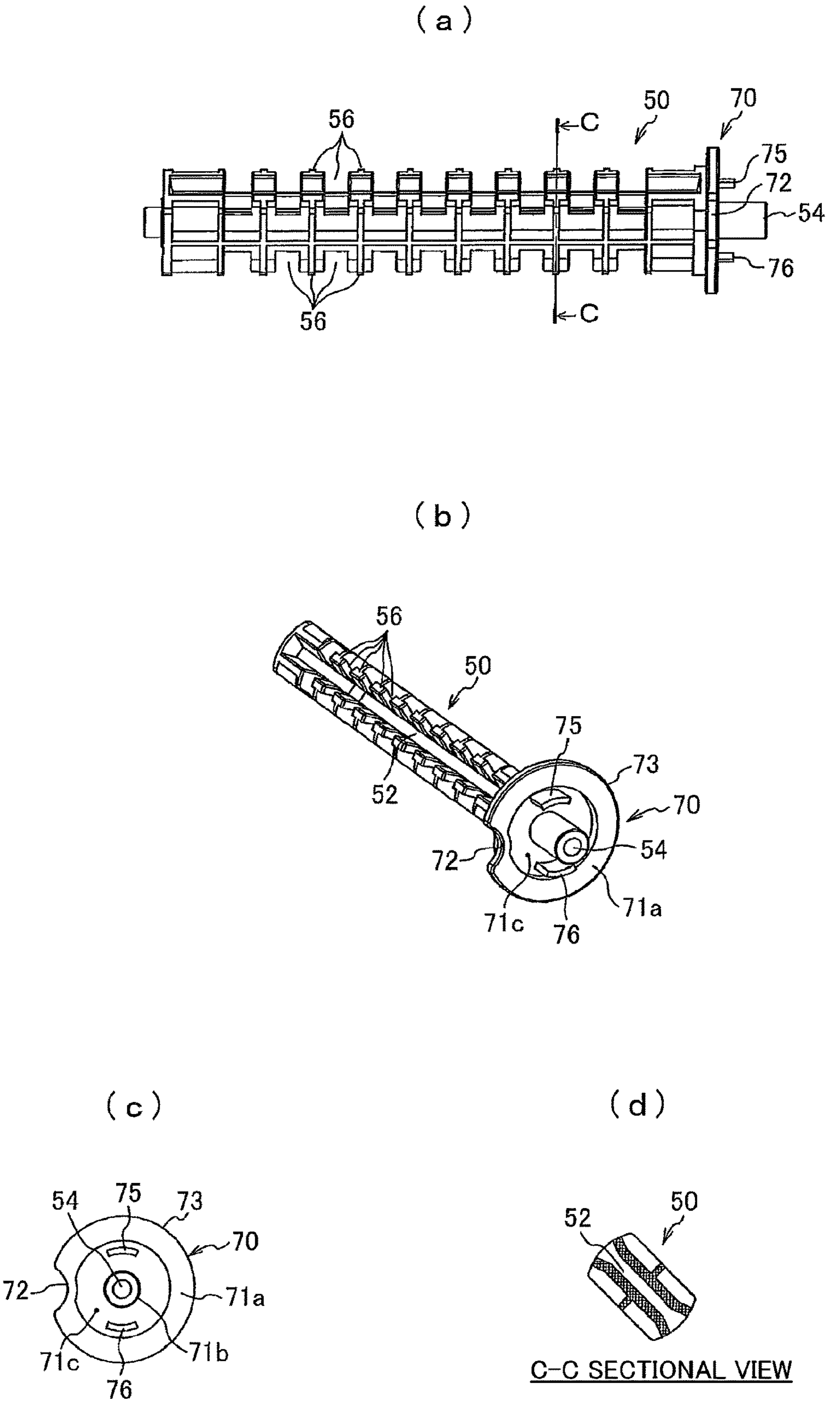
FIGS. 18(*a*) to (*d*) are each an explanatory diagram, a perspective view, a right-side view of (a), and a C-C sectional view of (a) illustrating a configuration of an opening/closing member.
Figure 19:
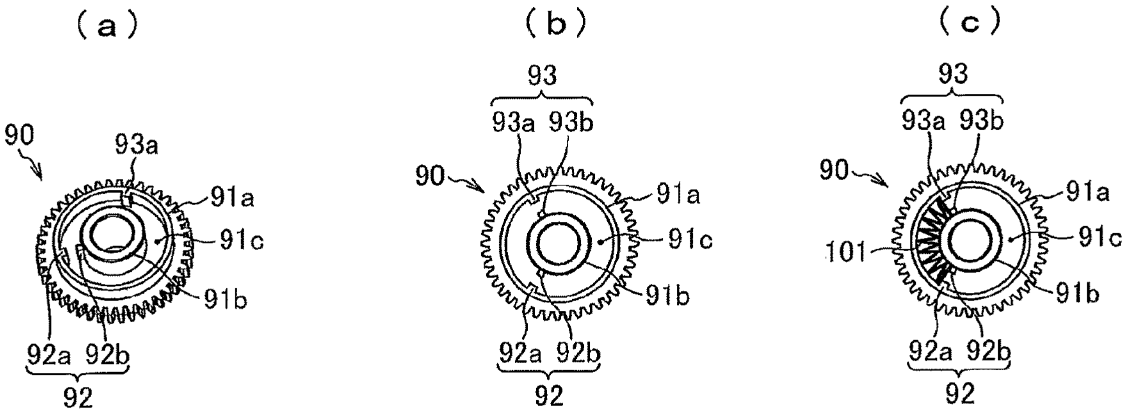
FIGS. 19(*a*), (*b*), and (*c*) are each a perspective view of an inner side face and a side view of the drive gear, and a side view with the buffer member.
Figure 20:
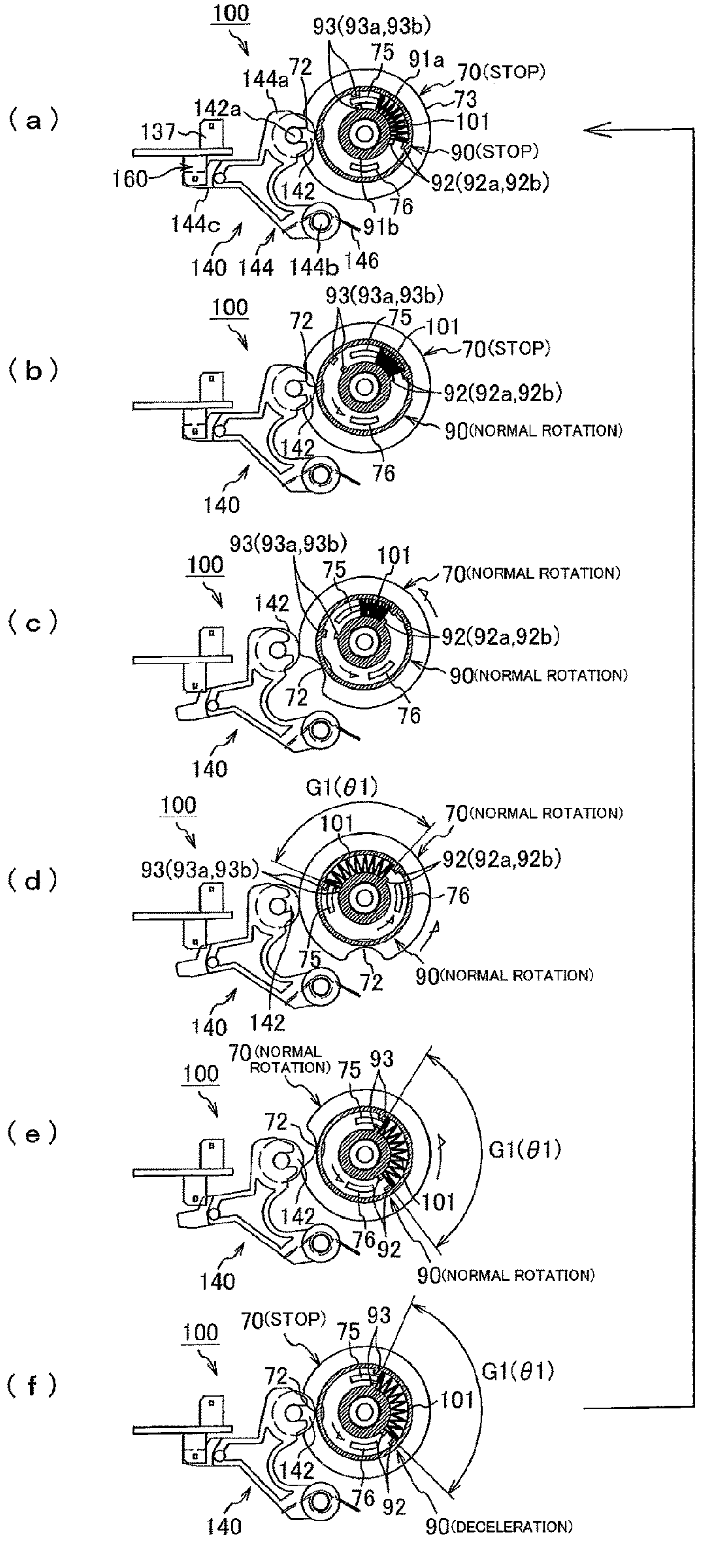
FIGS. 20(*a*) to (*f*) are explanatory diagrams of an operating procedure at the time of normal rotation of the opening/closing member according to the third embodiment.

FIGS. 17(*a*), (*b*), and (*c*) are each a front elevation illustrating an example of the illegal-act preventing mechanism according to the third embodiment, a front elevation illustrating an assembled state of a rotary member and a rotation-posture detecting unit, and a front elevation illustrating a state with a part of a drive gear and a buffer member being added to (b). FIGS. 18(*a*) to (*d*) are each an explanatory diagram, a perspective view, a right-side view of (a), and a C-C sectional view of (a) illustrating a configuration of an opening/closing member. FIGS. 19(*a*), (*b*), and (*c*) are each a perspective view of an inner side face and a side view of the drive gear, and a side view with the buffer member. FIGS. 20(*a*) to (*f*) are explanatory diagrams of an operating procedure in the illegal-act preventing mechanism at the time of normal rotation of the opening/closing member, and FIGS. 21(*a*) to (*f*) are explanatory diagrams of an operating procedure at the time of reverse rotation of the opening/closing member.

The illegal-act preventing mechanism 24 according to the third embodiment is a modification of the second embodiment, and is different from that of the second embodiment in the configuration of the drive transmission mechanism 100, particularly, configurations of the driven pieces 75 and 76 provided in the rotary member 70, configurations of the driving pieces 92 and 93 provided in the drive gear 90, arrangement of the buffer member 101, and the like.

Specifically, the driven pieces 75 and 76 are long and thin arc-like protrusions provided at an intermediate position in the radial width of the recess 71*c* on the lateral surface of the rotary member, and have a positional relationship in which the driven pieces 75 and 76 do not interfere with the respective driving pieces 92 and 93 at the time of relative rotation.

Meanwhile, the driving pieces 92 and 93 are each configured by driving pieces 92*a* and 93*a* provided in a protruding manner on an inner periphery of an external annular convex portion 91*a* on an internal surface of the drive gear, and driving pieces 92*b* and 93*b* provided in a protruding manner on an outer periphery of a central convex portion 91*b* on the internal surface of the drive gear, so as to face each of the driving pieces 92*a* and 93*a*, having a predetermined passage gap therebetween. Respective driven pieces 75 and 76 can pass through the passage gap in a circumferential direction. Further, on the contrary to the second embodiment, the buffer member 101 is arranged between the driving pieces 92 and 93, and contracts in a circumferential gap between the driving pieces 92 and 93 by being relatively pressed by one of the driven pieces 75 and 76 at the time of normal rotation and at the time of reverse rotation.

The drive transmission mechanism is configured such that the driven piece and the driving piece do not interfere (come into contact) with each other in a process of relative rotation, since the driven piece and the driving piece have a radial positional relationship deviated from each other. Meanwhile, the driven piece enters into the passage gap to come into contact with only the buffer member held between the two pairs of driving pieces to relatively press the buffer member.

That is, the drive transmission mechanism 100 according to the third embodiment includes the first driven piece 75 being a protrusion provided on the lateral surface of the rotary member, the second driven piece 76 being a protrusion arranged at a position away from the first driven piece by a predetermined distance in a clockwise direction, and the driving pieces 92 and 93 that are provided in a protruding manner with a positional relationship in which a circumferential position is different from each other on an inner side face (a surface opposite to the rotary member) of the drive gear 90, to hold the buffer member 101 formed of an elastic member such as a compression spring so as to be able to expand and contract, and intermittently rotate the respective driven pieces 75 and 76 (the rotary member 70) via the buffer member, in a process of rotational transfer (normal rotation, reverse rotation) relative to the respective driven pieces 75 and 76.

At the time of normal rotation illustrated in FIG. 20, the first driving piece 92 comes into contact with one end of the buffer member 101 held between the first driving piece 92 and the second driving piece 93 to press the buffer member 101, thereby rotating the rotary member in a normal rotation direction via the first driven piece 75, while compressing the buffer member 101 between the first driving piece 92 and the first driven piece 75. At the time of reverse rotation illustrated in FIG. 21, the second driving piece 93 rotates the rotary member in a reverse rotation direction via the second driven piece 76, while compressing the buffer member 101, held between the first driving piece 92 and the second driving 93, between the second driving piece 93 and the second driven piece 76.

In other words, the drive transmission mechanism 100 according to the third embodiment includes the two driven pieces 75 and 76 provided in the rotary member, and the two driving pieces 92 and 93 on the drive gear side having a radial positional relationship so as not to interfere with each driven piece. The buffer member 101 is arranged in a circumferential gap formed between the respective driving pieces 92 and 93, and at the time of normal rotation, the buffer member 101 is compressed between the first driving piece 92 and the first driven piece 75 to bias the first driven piece 75 in the normal rotation direction. Further, at the time of reverse rotation, the buffer member 101 is compressed between the second driving piece 93 and the second driven piece 76 to bias the second driven piece 76 in the reverse rotation direction.

In each stage at the time of normal rotation illustrated in FIGS. 20(*d*) and (*e*), a deceleration section G1 having a large circumferential length is formed between the first driven piece 75 and the first driving piece 92 due to an expanding action of the buffer member 101. Therefore, as illustrated in FIG. 20(*f*), the deceleration section G1 formed at a point in time when the rotary member stops has similarly a large circumferential length, thereby enabling to prevent overrun by performing deceleration with a margin of time.

Figure 21:
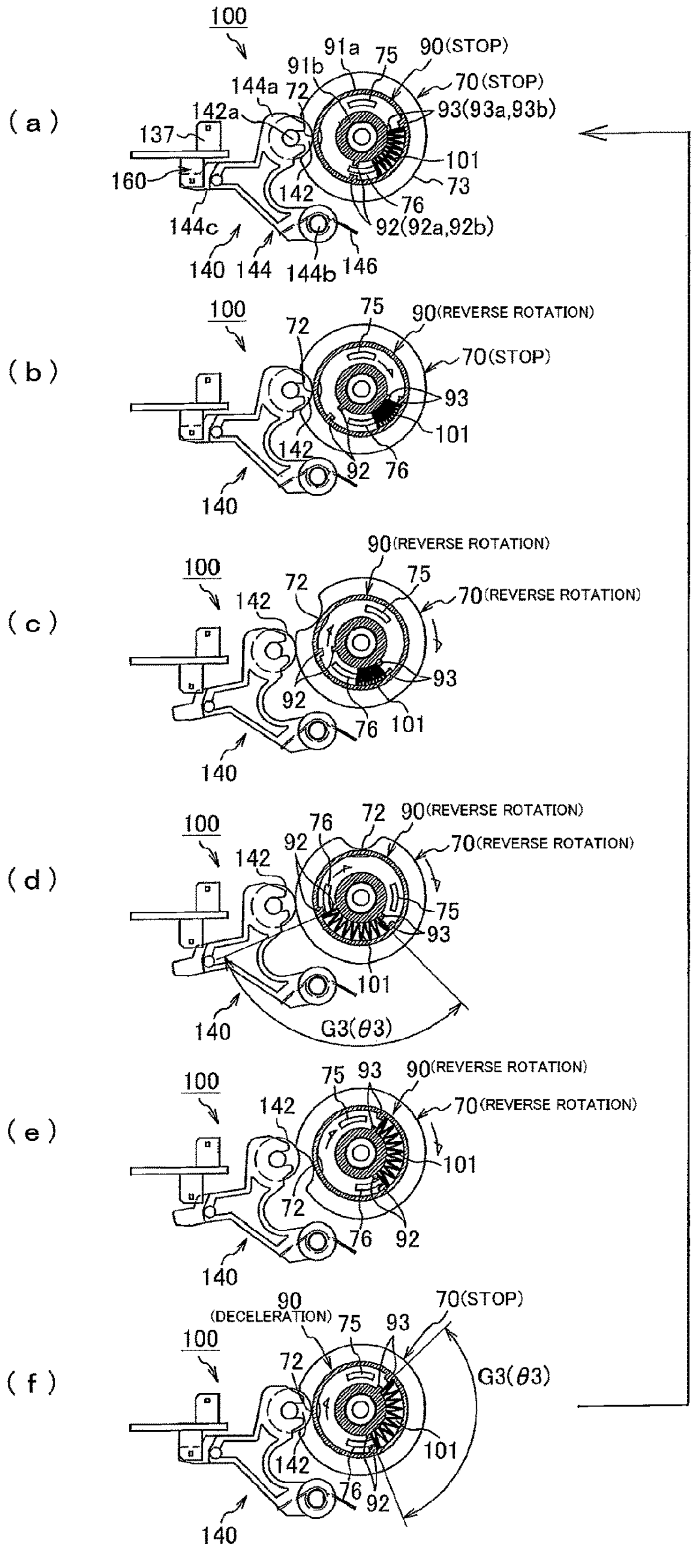
FIGS. 21(*a*) to (*f*) are explanatory diagrams of an operating procedure at the time of reverse rotation of the opening/closing member according to the third embodiment.

In each stage at the time of reverse rotation illustrated in FIGS. 21(*d*), (*e*), and (*f*), a large deceleration section G3 can be similarly formed.

The principle that the opening/closing member 50 can return to an initial rotation position by resolving overrun by cooperation of the deceleration sections G1 and G3 and the attenuation action of the buffer member is the same as that of the second embodiment described above.

The control procedure for illegal-act detecting and illegal-act preventing operation in the illegal-act preventing mechanism 24 according to the third embodiment is identical to the control procedure according to the first embodiment explained based on the flowchart of FIG. 9, and therefore redundant explanations thereof are omitted.

Operation of Illegal-Act Preventing Mechanism According to Third Embodiment

Next, a rotation-posture control procedure of the opening/closing member in the illegal-act preventing mechanism (drive transmission mechanism) according to the third embodiment is described with reference to FIG. 20 and FIG. 21. The flowchart in FIG. 11 is also referred to.

FIGS. 20(*a*) to (*f*) are explanatory diagrams illustrating the rotation-posture control procedure of the opening/closing member at the time of normal rotation of the illegal-act preventing motor in the illegal-act preventing mechanism according to the third embodiment.

FIG. 20(*a*) illustrates the same standby state as that of FIG. 15(*a*) according to the second embodiment.

In the normal-rotation start state (Step 131) in (b), since the drive gear 90 starts rotation ahead of the rotary member being in a stopped state, the buffer member 101 is strongly compressed between the first driving piece 92 and the first driven piece 75. When the compressed state of the buffer member 101 reaches a marginal state to increase the elastic force, the rotary member starts normal rotation against the biasing force of the lever biasing member 146. When the rotary member starts normal rotation, as illustrated sequentially in (c) and (d), the roller is displaced in the outer diameter direction and withdraws from the depressed portion (home-out), and moves onto the outer peripheral edge 73 to continue movement.

The rotation-posture detecting unit 140 continuously detects whether the opening/closing member has returned to the initial rotation position during this period (Step 132).

After the roller has withdrawn from the depressed portion, as illustrated in (d) and (e), since the buffer member 101 is in an expanded state, a deceleration section G1 having a sufficiently large circumferential length (the angle θ1) is formed between the first driven piece 75 and the first driving piece 92.

Subsequently, in the home-in state illustrated in (f), since transmission of the driving force from the motor 120 to the first driving piece 92 is blocked in a state with the large deceleration section G1 indicated by the angle θ1 in (f) being left between the first driving piece 92 and the first driven piece 75, thereafter, the first driving piece 92 continues to rotate in the normal rotation direction by the inertia. In the normal rotation process, the first driving piece 92 compresses the buffer member, while gradually decelerating, and can stop without applying an impact to the first driven piece 75. Therefore, a large deceleration section G1 formed at a point in time when the motor stops can be ensured, and further, in combination with the buffering action of the buffer member, occurrence of overrun because the driven piece is pressed with an excessive force can be prevented.

FIGS. 21(*a*) to (*f*) are explanatory diagrams illustrating a reverse-rotation operating procedure of the illegal-act preventing mechanism according to the third embodiment.

In the standby state in FIG. 21(*a*), the drive gear 90 and the rotary member 70 have stopped rotation.

When the illegal-act preventing motor 120 starts reverse rotation in (b), the second driving piece 93 starts to press the second driven piece 76 being in a stopped state in a reverse rotation direction (clockwise direction) via the buffer member, and as illustrated in (c), the roller 142 withdraws from the depressed portion 72 (home-out) and moves onto the outer peripheral edge 73. In (b) and (c), since the buffer member is compressed with a strong force, the force of the second driving piece 93 is transmitted to the second driven piece 76.

By continuing the reverse rotation further, in (d) and (e), the buffer member expands widely, and as a result, the rotary member is in a state of being ahead of the drive gear, to form a wide deceleration section G3.

In (f), the roller is in a home-in state in the depressed portion, to block transmission of the driving force to the drive gear 90. At this point in time, a wide deceleration section G3 has been already ensured between the second driven piece 76 and the second driving piece 93 by the expanding force of the buffer member 101. Since transmission of the driving force from the motor 120 to the second driving piece 93 is blocked in a state with the large deceleration section G3 being left between the second driving piece and the second driven piece, thereafter, the second driving piece continues to rotate in a reverse rotation direction by the inertia. The inertia is diminished by the buffering action of the buffer member being in a sufficiently expanded state, thereby enabling to prevent occurrence of overrun effectively.

Illegal-Act Preventing Mechanism: Fourth Embodiment

Basic Configuration

An illegal-act preventing mechanism according to a fourth embodiment is described with reference to FIG. 22 to FIG. 26.

Figure 22:
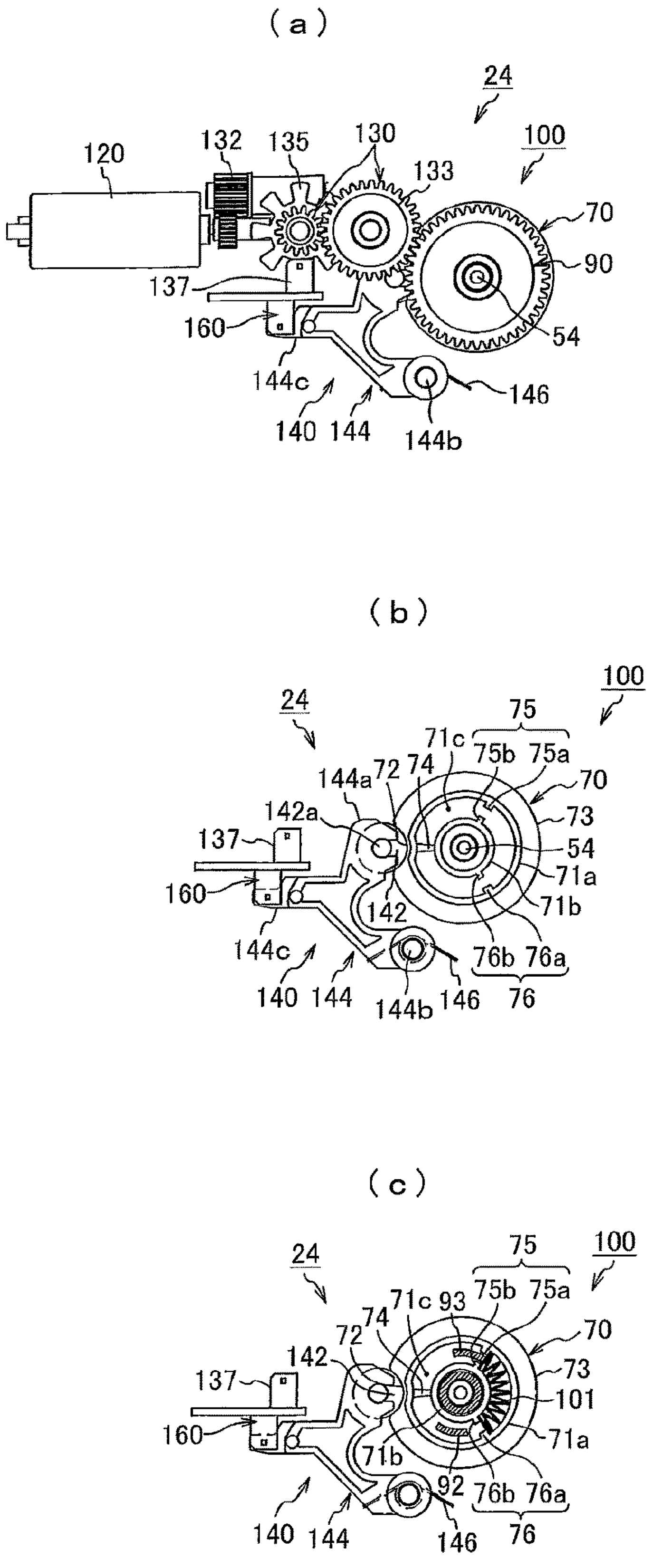
FIGS. 22(*a*), (*b*), and (*c*) are each a front elevation illustrating an example of an illegal-act preventing mechanism according to a fourth embodiment, a front elevation illustrating an assembled state of a rotary member and a rotation-posture detecting unit, and a front elevation illustrating a state with a part of a drive gear and a buffer member being added to (b).
Figure 23:
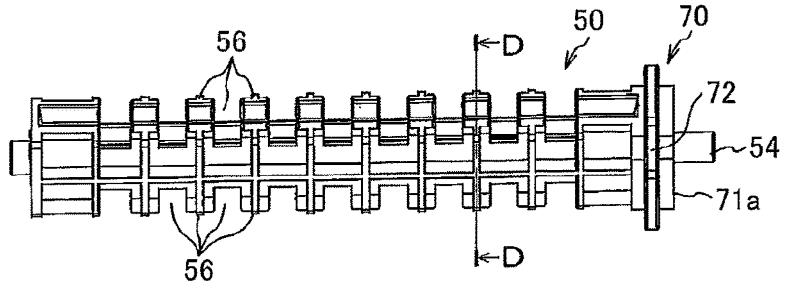
FIGS. 23(*a*) to (*d*) are each an explanatory diagram, a perspective view, a right-side view (with the buffer member) of (a), and a D-D sectional view of (a) illustrating a configuration of an opening/closing member.
Figure 23:
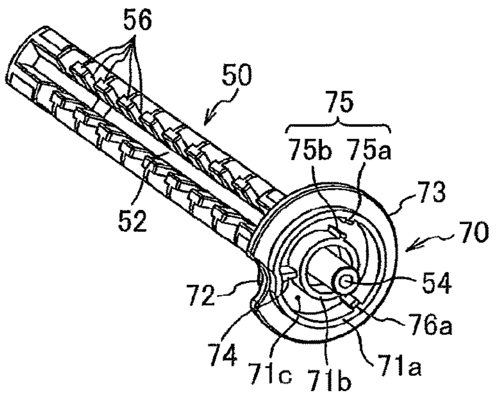
Figure 23:
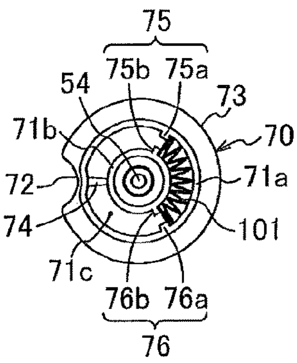
Figure 23:
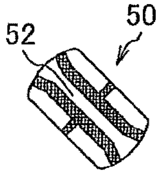
Figure 24:
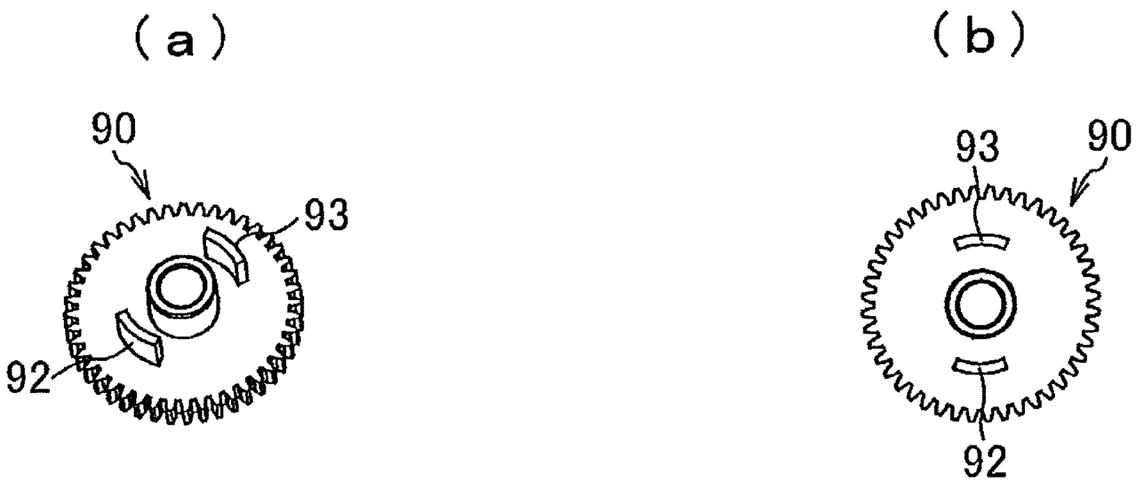
FIGS. 24(*a*) and (*b*) are each a perspective view of an inner side face and a side view of the drive gear.
Figure 25:
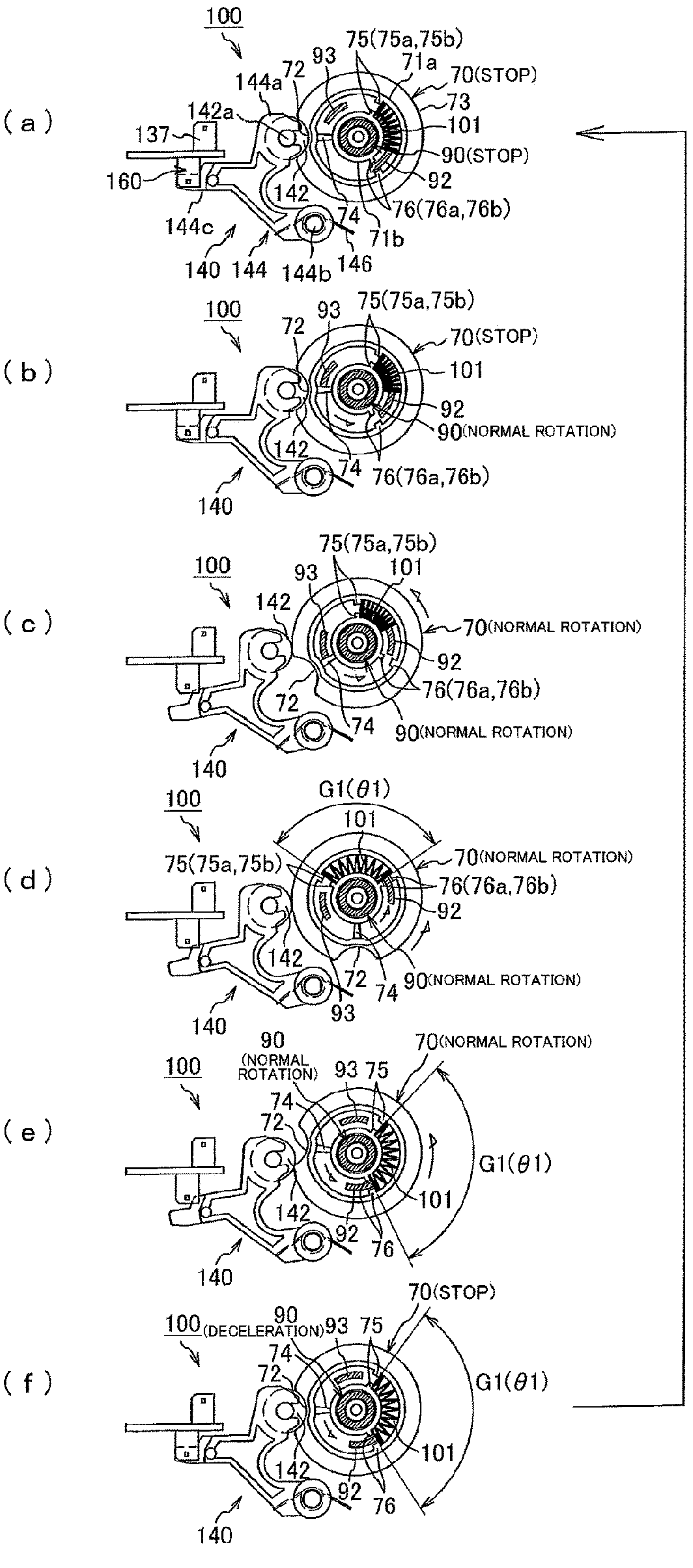
FIGS. 25(*a*) to (*f*) are explanatory diagrams of an operating procedure in the illegal-act preventing mechanism at the time of normal rotation of the opening/closing member according to the fourth embodiment.

FIGS. 22(*a*), (*b*), and (*c*) are each a front elevation illustrating an example of the illegal-act preventing mechanism according to the fourth embodiment, a front elevation illustrating an assembled state of a rotary member and a rotation-posture detecting unit, and a front elevation illustrating a state with a part of a drive gear and a buffer member being added to (b). FIGS. 23(*a*) to (*d*) are each an explanatory diagram, a perspective view, a right-side view (with the buffer member) of (a), and a D-D sectional view of (a) illustrating a configuration of an opening/closing member. FIGS. 24(*a*) and (*b*) are each a perspective view of an inner side face and a side view of the drive gear. FIGS. 25(*a*) to (*f*) are explanatory diagrams of an operating procedure in the illegal-act preventing mechanism at the time of normal rotation of the opening/closing member, and FIGS. 26(*a*) to (*f*) are explanatory diagrams of an operating procedure in the illegal-act preventing mechanism at the time of reverse rotation of the opening/closing member.

Parts identical to those in the above embodiments are denoted by like reference signs and explanations of redundant configurations and operations are omitted. That is, the illegal-act preventing mechanism according to the fourth embodiment is substantially identical to that according to the above embodiments except for the configuration of the drive transmission mechanism 100.

The drive transmission mechanism 100 according to the fourth embodiment has a configuration characterized such that the driven piece 74 according to the first embodiment (the interference-type driven piece=being directly pressed by the driving piece) is added to the rotary member 70 according to the second embodiment having only the driven pieces 75 and 76 (non-interference-type driven pieces=holding the buffer member without being directly pressed by the driving piece). The two driving pieces 92 and 93 directly press the driven piece (the third driven piece) 74 respectively at the time of normal rotation and at the time of reverse rotation. Further, the buffer member 101 is arranged between the driven pieces 75 and 76 as in the second embodiment.

Figure 26:
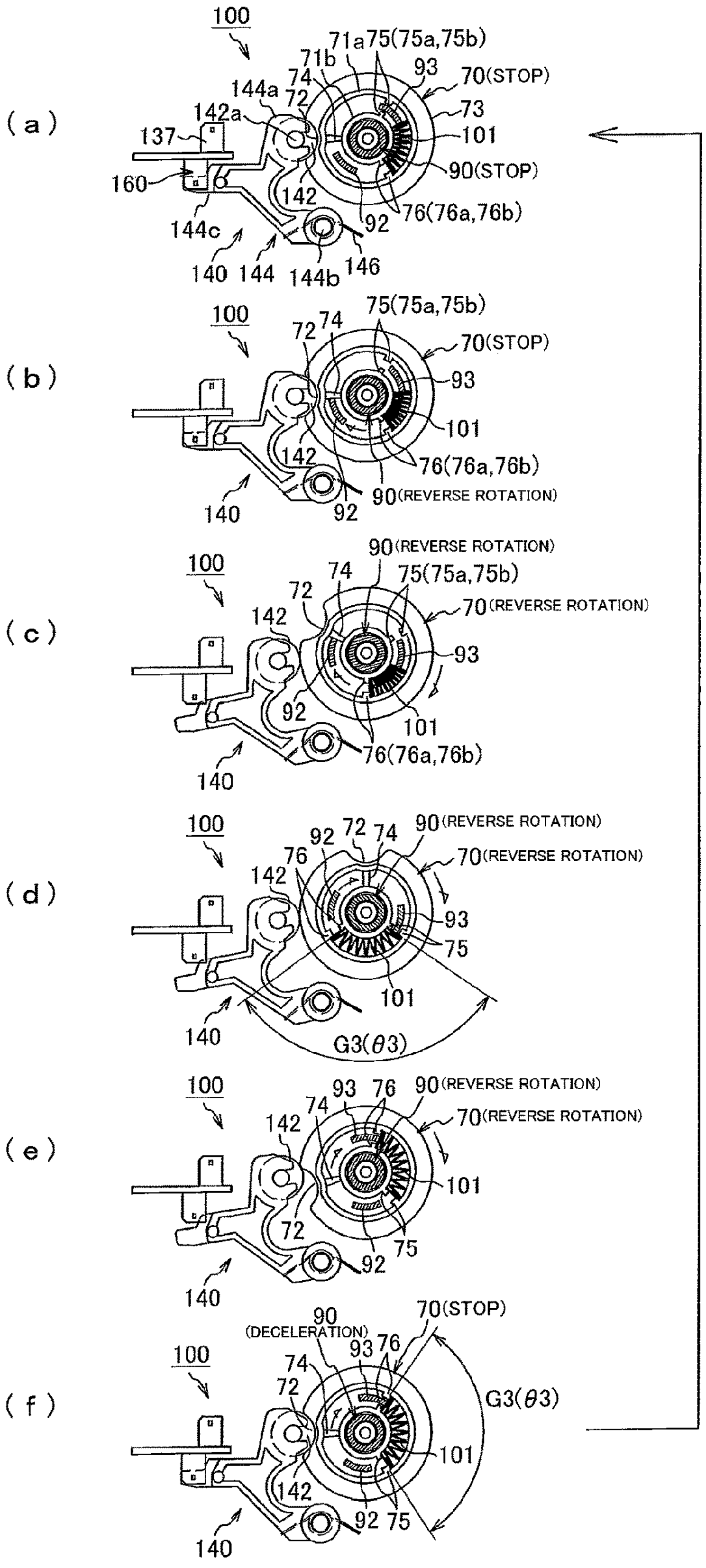
FIGS. 26(*a*) to (*f*) are explanatory diagrams of an operating procedure in the illegal-act preventing mechanism at the time of reverse rotation of the opening/closing member according to the fourth embodiment.

At the time of normal rotation of the drive gear, the second driving piece 93 that does not come into contact with the buffer member comes in direct contact with the driven piece 74 to press the driven piece, thereby reliably realizing home-out at a predetermined fixed timing as illustrated in FIGS. 25(*b*) and (*c*). At the time of reverse rotation of the drive gear, the first driving piece 92 that does not come into contact with the buffer member comes in direct contact with the driven piece 74 to press the driven piece, thereby reliably realizing home-out at a predetermined fixed timing as illustrated in FIGS. 26(*b*) and (*c*).

As in the first embodiment, the driven piece 74 that is pressed by coming into contact with the driving piece is arranged so as to block the moving route of each of the driving pieces 92 and 93 by extending from an inner periphery of the annular convex portion 71*a*, which corresponds to an internal side of a fitting recess, to a central portion of the rotary member. That is, the driven piece 74 is pressed by the second driving piece 93 to rotate the rotary member in the normal rotation direction in an initial stage (FIGS. 25(*b*) and (*c*)) in which the drive gear starts normal rotation, and is pressed by the first driving piece 92 to rotate the rotary member in the reverse rotation direction in an initial stage (FIGS. 26(*b*) and (*c*)) in which the drive gear starts reverse rotation. The driven piece 74 only contributes to realization of home-out in which the roller withdraws from the depressed portion at the time of normal rotation and at the time of reverse rotation, and after the home-out, since the rotary member moves ahead of the drive gear due to the expanding force of the buffer member, the driven piece 74 is in a state away from the respective driving pieces 93 and 92.

As in the second embodiment, since the respective driven pieces 75 (75*a*, 75*b*), 76 (76*a*, 76*b*), and the respective driving pieces 92 and 93 have a radial positional relationship deviated from each other, the both pieces do not interfere (come into contact) with each other in a process in which the driving piece rotates relative to the driven piece. Meanwhile, the driving pieces 92 and 93 are configured such that when one driving piece is pressing the buffer member 101, the other driving piece presses the driven piece 74.

That is, the drive transmission mechanism 100 according to the fourth embodiment includes the two non-interference-type driven pieces 75 and 76 provided in the rotary member 70 at a different circumferential position from each other, the one interference-type driven piece (the third driven piece) 74, and the two driving pieces 92 and 93 arranged at a different circumferential position from each other and having a positional relationship with respect to the driven pieces in which the driving piece does not interfere with the two non-interference-type driven pieces 75 and 76, but interferes with the interference-type driven piece 74. At the time of normal rotation of the drive gear, the other driving piece 93 comes into contact with and presses the interference-type driven piece 74, and at the time of reverse rotation, the one driving piece 92 comes into contact with and presses the interference-type driven piece 74. The buffer member 101 is arranged between the two non-interference-type driven pieces 75 and 76, and when the drive gear rotates in the reverse rotation direction, the buffer member 101 biases the one driven piece 75 in the reverse rotation direction, while being compressed between the one driving piece 92 and the one driven piece 75. When the drive gear rotates in the normal rotation direction, the buffer member 101 biases the other driven piece 76 in the reverse rotation direction, while being compressed between the other driving piece 93 and the other driven piece 76.

In the present specification, the interference-type driven piece refers to a driven piece (74) having a positional relationship in which the driven piece interferes with any one of the driving pieces in a process in which the drive gear rotates relative to the rotary member. The non-interference-type driven piece refers to a driven piece (75, 76) having a positional relationship in which the driven piece does not interfere with any of the driving pieces in the process in which the drive gear rotates relative to the rotary member.

When the drive gear rotates in a normal rotation direction, the buffer member 101 is pressed by the first driving piece 92 in the counter-clockwise direction to bias the first driven piece 75 in the normal rotation direction, while being compressed between the first driven piece 75 and the first driving piece 92. Since the first driving piece 92 approaches the first driven piece 75 while compressing the buffer member, the second driving piece 93 approaches the driven piece 74, and starts to press the driven piece 74 after coming into contact with the driven piece 74. Further, when the drive gear rotates in the reverse rotation direction, the buffer member 101 is pressed by the second driving piece 93 in the clockwise direction to bias the second driven piece 76 in the reverse rotation direction, while being compressed between the second driven piece 76 and the second driving piece 93. Since the second driving piece 93 approaches the second driven piece 76 while compressing the buffer member, the first driving piece 92 approaches the driven piece 74, and starts to press the driven piece 74 after coming into contact with the driven piece 74.

In other words, in the present embodiment, when one driving piece is compressing the buffer member, the other driving piece has a function to press the driven piece 74, and in the contrary, when the other driving piece is compressing the buffer member, the one driving piece has a function to press the driven piece 74.

That is, in the present embodiment, it is either one of the driving pieces 92 and 93 that directly presses the driven piece 74 to rotate the rotary member in the normal rotation direction or in the reverse rotation direction. The buffer member functions as buffer means that decelerates the drive gear after the rotary member has stopped at the initial rotation position, other than the function to press the rotary member via any one of the driven pieces 75 and 76 in a previous stage in which the driven piece 74 is directly driven.

The drive transmission mechanism 100 according to the fourth embodiment resolves the following problems in the first and second embodiments in which the rotary member is rotated only by the driving force via the buffer member.

That is, the drive transmission mechanism 100 according to the first embodiment has a configuration in which the buffer member 101 comes into contact with the driven piece 74 to press the driven piece 74, while being compressed between the first driving piece 92 and the driven piece 74. Therefore, the timing of the behavior of once detaching the roller from the depressed portion by pressing the driven piece 74 and fitting the roller again in the depressed portion after circling, and the timing of fitting the roller again in the depressed portion depend on uncertain factors of a compressed amount (elastic force) of the buffer member. That is, it is uncertain that the roller starts to withdraw from the depressed portion at a point in time after the drive gear rotates by how much angle, and thereafter, fits in the depressed portion again at which timing, thereby causing variations. The same is also true in the second embodiment. Particularly, when the durability of the buffer member deteriorates, the degree of variation increases.

Meanwhile, in the fourth embodiment, by adopting a configuration in which the interference-type driven piece is directly pressed by the driving piece without via the buffer member, the rotation angle and the timing of the drive gear for the roller to start withdrawal from the depressed portion, and the rotation angle and the timing of the drive gear for the roller to fit in the depressed portion again can be solely determined, thereby enabling to prevent variations. That is, the driving piece and the driven piece are both rigid bodies and one component, and a buffer member is not present therebetween. Therefore, the position and the angle at which the driving piece starts to press the driven piece can be solely determined, and when the drive gear rotates to a predetermined angle, rotation of the rotary member is started reliably. Further, since the deceleration section formed after the drive gear starts rotation from the state with the illegal-act preventing motor being stopped can be set long due to the presence of the buffer member, occurrence of overrun can be prevented efficiently.

The control procedure for illegal-act detecting and illegal-act preventing operation in the illegal-act preventing mechanism 24 according to the fourth embodiment is identical to the control procedure according to the first embodiment explained based on the flowchart of FIG. 9, and therefore redundant explanations thereof are omitted.

Operation of Illegal-Act Preventing Mechanism According to Fourth Embodiment

Next, a rotation-posture control procedure of the opening/closing member in the illegal-act preventing mechanism (drive transmission mechanism) according to the fourth embodiment is described with reference to FIG. 25 and FIG. 26.

FIGS. 25(*a*) to (*f*) are explanatory diagrams of the rotation-posture control procedure of the opening/closing member at the time of normal rotation of the illegal-act preventing motor in the illegal-act preventing mechanism according to the fourth embodiment. The rotation-posture control procedure is described, with reference to the flowchart illustrating the operating procedure for rotating the opening/closing member n times in FIG. 11, and the flowchart in FIG. 9.

Operating procedures corresponding to those of the above embodiments and redundant explanations thereof are omitted as appropriate.

In the standby state in FIG. 25(*a*), the rotary member 70 stops rotation, and the opening/closing member is at an initial rotation position.

In FIG. 25(*a*), the first driving piece 92 of the drive gear proceeds beyond the second driven piece 76 to come into contact with the buffer member 101, and stops in a state of pressing the buffer member between the first driven piece 75 and the first driving piece 92. At this time, an elastic force large enough for detaching the roller 142 from the depressed portion 72 has not been generated in the buffer member 101. Further, the second driving piece 93 at a position away from the first driving piece 92 by 180 degrees is positioned between the first driven piece 75 and the driven piece (the third driven piece) 74, but does not come into contact with the driven piece 74.

Next in the normal-rotation start state (Step 131), since the drive gear 90 starts normal rotation ahead of the rotary member being in a stopped state, the buffer member 101 starts to be strongly compressed between the first driven piece 75 and the first driving piece 92. The first driven piece 75 is pressed due to an increase of the elastic force by compression of the buffer member 101. However, before the rotary member starts rotation due to the pressing force from the buffer member, the second driving piece 93 first comes into contact with the driven piece 74 and starts to press the driven piece 74, thereby starting to rotate the rotary member. That is, a positional relationship of the second driving piece 93 with respect to the driven piece 74 and the first driven piece 75 is set such that before the buffer member pressed in and compressed by the first driving piece 92 starts to rotate the rotary member via the first driven piece 75, the second driving piece 93 starts to come into contact with the driven piece 74 and starts to press the driven piece 74.

After the depressed portion 72 starts rotation with respect to the roller 142, and as sequentially illustrated in (c) and (d), the roller is displaced in an outer diameter direction and withdraws from the depressed portion (home-out), the roller moves onto the outer peripheral edge 73 and continues to move while rolling.

The rotation-posture detecting unit 140 continuously detects whether the opening/closing member has returned to the initial rotation position during this period (Step 132).

After the roller has withdrawn from the depressed portion, as illustrated in FIGS. 25(*d*) and (*e*), since the buffer member 101 is in a largely expanded state, the deceleration section G1 having a sufficiently large circumferential length (the angle θ1) is formed between the first driven piece 75 and the first driving piece 92. Further, after the depressed portion has been detached from the roller (home-out), since the rotary member moves in the normal rotation direction ahead of the drive gear due to the expanding force of the buffer member, the second driving piece 93 is away from the driven piece 74. That is, it is only at the time of home-out that the second driving piece 93 comes into contact with and presses the driven piece 74, and the rotation angle and the required time (timing) of the drive gear from start of normal rotation to home-out have fixed and constant values at all times without being affected by the behavior of the buffer member.

When the drive gear 90, the buffer member 101, and the rotary member 70 integrally continue normal rotation, the roller relatively moves along the outer peripheral edge of the rotary member, and becomes a state illustrated in (e).

Subsequently, in the home-in state illustrated in (f), the first driving piece 92 of the drive gear starts to decelerate at the position illustrated in the drawing. The circumferential gap G1 between the first driven piece 75 and the first driving piece 92 at a point in time when the rotary member stops rotation becomes the deceleration section G1 of the drive gear. Since transmission of the driving force from the motor 120 is blocked in a state with a large deceleration section G1 indicated by the angle θ1 in (f) being left between the first driving piece 92 and the first driven piece 75, thereafter, the first driving piece 92 continues to rotate in the normal rotation direction by the inertia. The effect of preventing overrun of the rotary member by the buffering action due to squeezing of the buffer member 101 and the effect of resolving overrun are the same as those in the respective embodiments described above.

Also in the present embodiment, the angular range of the deceleration section formed when there is the buffer member 101 has a function of enlarging the distance between the driving piece and the driven piece by the buffer member. Therefore, it is obvious that the deceleration section formed when there is the buffer member 101 is larger than the deceleration section formed when there is no buffer member. Since the deceleration section increases, deceleration becomes possible with a margin of time, and an impact applied to the driven piece can be diminished significantly.

Next, FIGS. 26(*a*) to (*f*) are explanatory diagrams illustrating a reverse-rotation operating procedure of the illegal-act preventing mechanism according to the fourth embodiment. The reverse-rotation operating procedure is described also with reference to the flowchart in FIG. 11 at the time of normal rotation according to the first embodiment.

FIG. 26(*a*) illustrates the same standby state as in FIG. 25(*a*).

In the standby state in FIG. 26(*a*), while the second driving piece 93 of the drive gear is at a position lightly pressing the second driven piece 76 via the buffer member 101, the first driving piece 92 is at a position away from the buffer member 101 and does not come into contact with the driven piece 74.

Next, in the reverse-rotation start state (Step 131) in (b), since the drive gear 90 starts reverse rotation ahead of the rotary member, the buffer member 101 is started to be strongly compressed between the second driving piece 93 and the second driven piece 76. Before the rotary member starts reverse rotation due to the elastic force of the buffer member 101, the first driving piece 92 first comes into contact with the driven piece 74 to start to press the driven piece 74, thereby starting to rotate the rotary member in the reverse rotation direction. That is, the positional relationship of the first driving piece 92 with respect to the driven piece 74 and the second driven piece 76 is set such that before the buffer member pressed in and compressed by the second driving piece 93 starts to rotate the rotary member via the second driven piece 76, the first driving piece 92 starts to come into contact with the driven piece 74 and starts to press the driven piece 74.

As sequentially illustrated in (c) and (d), after the roller is displaced in the outer diameter direction and withdraws from the depressed portion (home-out), the roller moves onto the outer peripheral edge 73 and continues to move while rolling.

The rotation-posture detecting unit 140 continuously detects whether the opening/closing member has returned to the initial rotation position during this period (Step 132).

By continuing the reverse rotation further, in (d) and (e), the buffer member expands widely, and as a result, the rotary member is in a state of being ahead of the drive gear, to form a wide deceleration section G3.

In (f), the roller is in the home-in state in the depressed portion to block transmission of the driving force to the drive gear 90. At a point in time of home-in, the wide deceleration section G3 has been already ensured between the second driven piece 76 and the second driving piece 93 by the expanding force of the buffer member 101. The second driving piece can perform sufficient deceleration because of starting deceleration from the separated position. The effect of preventing overrun because a wide deceleration section is formed and the effect of resolving overrun are the same as those in the case of normal rotation.

Further, since it is only at the time of home-out that the first driving piece 92 comes into contact with and presses the driven piece 74, the rotation angle and the required time (timing) of the drive gear from start of reverse rotation to home-out have fixed and constant values at all times without being affected by the behavior of the buffer member.

Illegal-Act Preventing Mechanism: Fifth Embodiment

Basic Configuration

An illegal-act preventing mechanism according to a fifth embodiment is described with reference to FIG. 27 to FIG. 31.

Parts identical to those in the above embodiments are denoted by like reference signs and explanations of redundant configurations and operations are omitted. That is, the illegal-act preventing mechanism according to the fifth embodiment is substantially identical to that according to the above embodiments except for the configuration of the drive transmission mechanism 100.

Figure 27:
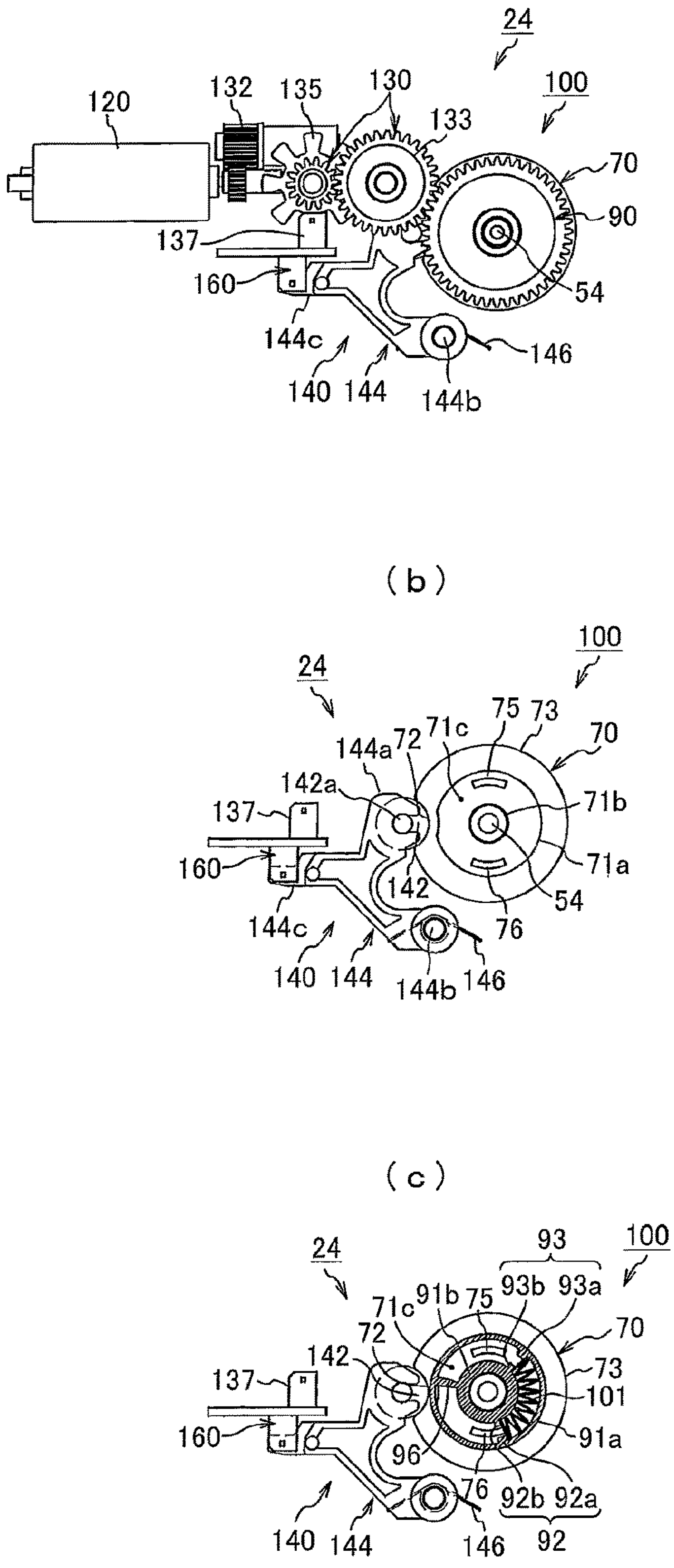
FIGS. 27(*a*), (*b*), and (*c*) are each a front elevation illustrating an example of an illegal-act preventing mechanism according to a fifth embodiment, a front elevation illustrating an assembled state of a rotary member and a rotation-posture detecting unit, and a front elevation illustrating a state with a part of a drive gear and a buffer member being added to (b).
Figure 28:
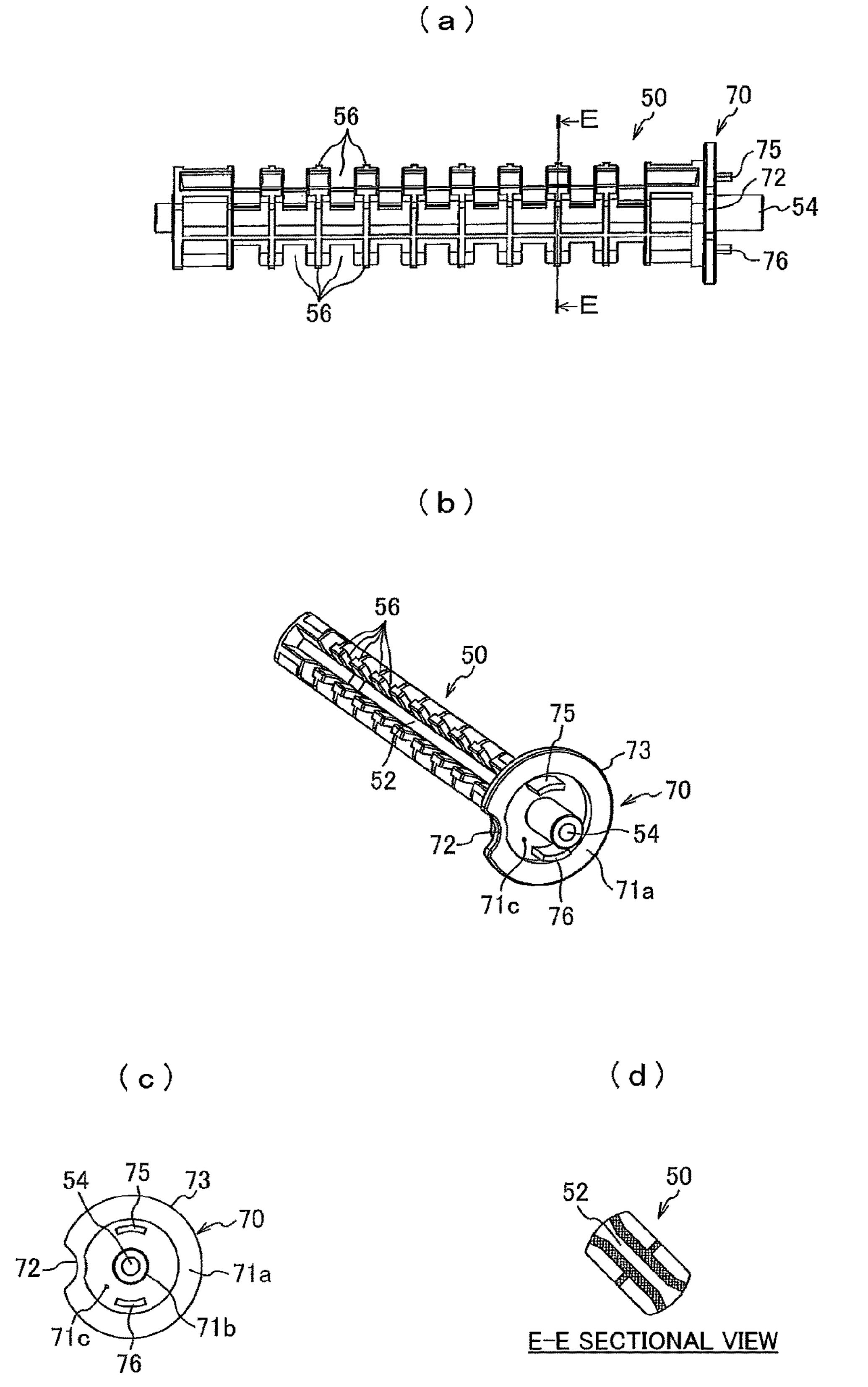
FIGS. 28(*a*) to (*d*) are each an explanatory diagram, a perspective view, a right-side view of (a), and an E-E sectional view of (a) illustrating a configuration of an opening/closing member.
Figure 29:
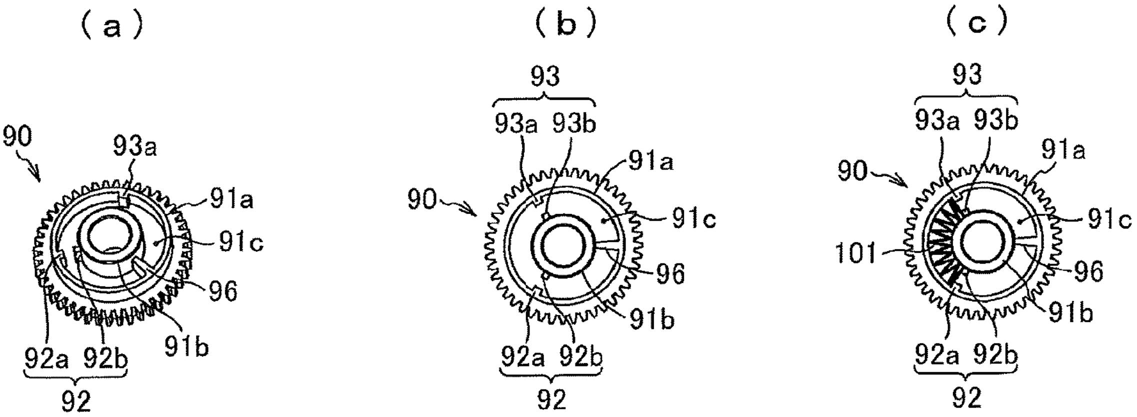
FIGS. 29(*a*), (*b*), and (*c*) are each a perspective view of an inner side face and a side view of the drive gear, and a side view added with the buffer member.
Figure 30:
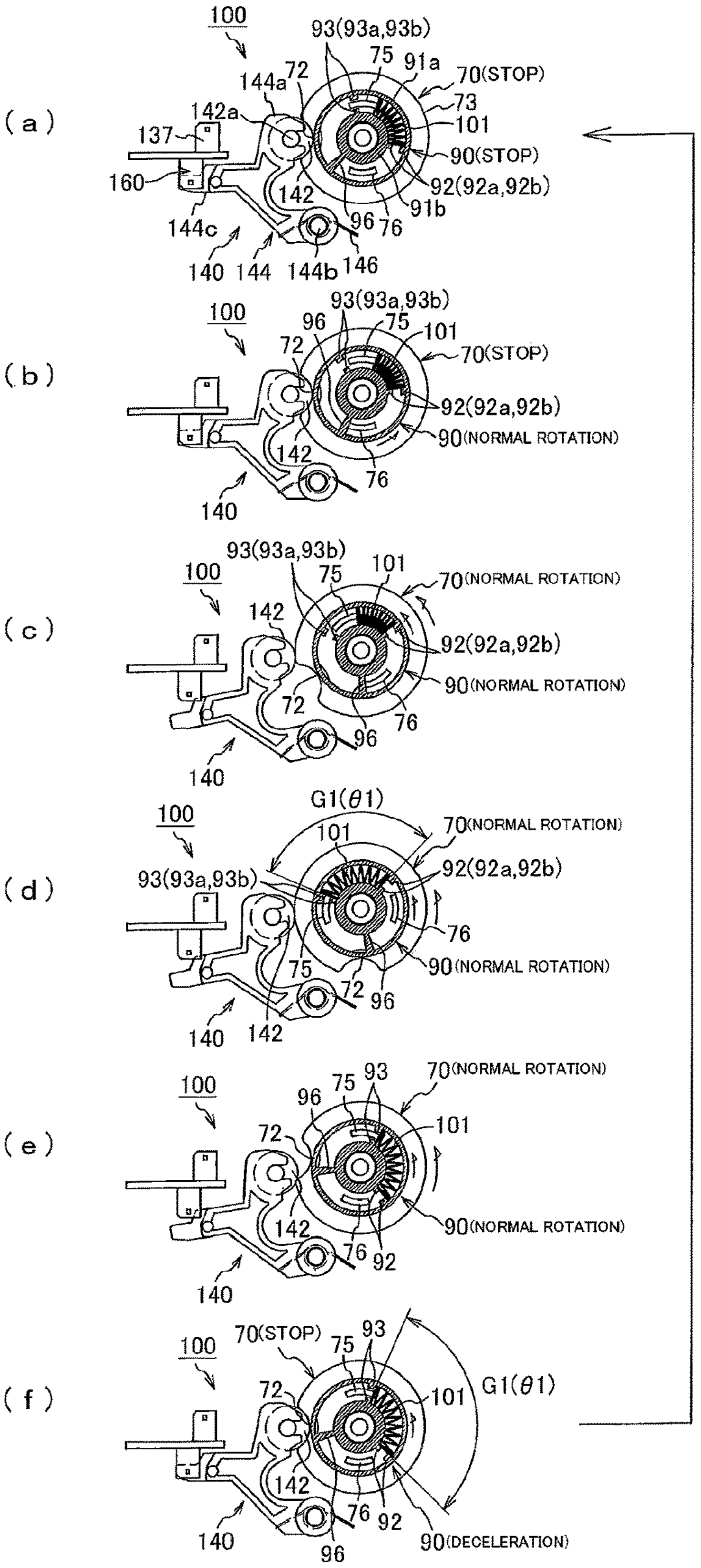
FIGS. 30(*a*) to (*f*) are explanatory diagrams of an operating procedure in the illegal-act preventing mechanism at the time of normal rotation of the opening/closing member according to the fifth embodiment.

FIGS. 27(*a*), (*b*), and (*c*) are each a front elevation illustrating an example of the illegal-act preventing mechanism according to the fifth embodiment, a front elevation illustrating an assembled state of a rotary member and a rotation-posture detecting unit, and a front elevation illustrating a state with a part of a drive gear and a buffer member being added to (b). FIGS. 28(*a*) to (*d*) are each an explanatory diagram, a perspective view, a right-side view of (a), and an E-E sectional view of (a) illustrating a configuration of an opening/closing member. FIGS. 29(*a*), (*b*), and (*c*) are each a perspective view of an inner side face and a side view of the drive gear, and a side view added with a buffer member. FIGS. 30(*a*) to (*f*) are explanatory diagrams of an operating procedure in the illegal-act preventing mechanism at the time of normal rotation of the opening/closing member, and FIGS. 31(*a*) to (*f*) are explanatory diagrams of an operating procedure in the illegal-act preventing mechanism at the time of reverse rotation of the opening/closing member.

The drive transmission mechanism 100 according to the fifth embodiment has a configuration combining the third embodiment and the fourth embodiment.

Specifically, the driven pieces 75 and 76 are long and thin arc-like protrusions provided at an intermediate position in the radial width of the recess 71*c* on the external surface of the rotary member as in the third embodiment, and have a positional relationship in which the driven pieces 75 and 76 do not interfere with the respective driving pieces 92 and 93 at the time of relative rotation with the drive gear.

Meanwhile, the driving pieces 92 and 93 are each configured by the driving pieces 92*a* and 93*a* provided in a protruding manner on the inner periphery of the external annular convex portion 91*a* on the internal surface of the drive gear, and the driving pieces 92*b* and 93*b* provided in a protruding manner on the outer periphery of the central convex portion 91*b* on the internal surface of the drive gear so as to face each other with a predetermined passage gap therebetween. The respective driven pieces 75 and 96 can pass through the passage gap relatively in the circumferential direction. Further, the buffer member 101 is arranged between the driving pieces 92 and 93, and expands and contracts in the circumferential gap between the driving pieces 92 and 93.

The driven pieces 75 and 76 have a function of coming into contact with the buffer member and compressing the buffer member by relatively entering into the respective passage gaps.

It is configured such that since the radial positional relationship between the driven pieces 75 and 76 and the driving pieces 92 and 93 is deviated from each other, while the both pieces do not interfere (come into contact) with each other in the process of relative rotation, the driven pieces 75 and 76 come into contact with the buffer member 101 held between the two driving pieces 92 and 93 to press the buffer member 101. Further, the respective driven pieces 75 and 76 are pressed by the single interference-type driving piece (a third driving piece) 96 at the time of normal rotation and at the time of reverse rotation of the drive gear, thereby rotating the rotary member in the normal rotation direction and the reverse rotation direction.

That is, the interference-type driving piece 96 that interferes with each of the driven pieces 75 and 76 is arranged across an external annular convex portion 91*a* and the central convex portion 91*b*, at a portion with the same distance from each of the driving pieces 92 and 93 on an inner side face of the drive gear. At the time of normal rotation of the drive gear, one driving piece 92 biases the driven piece 75 while compressing the buffer member 101 between the one driven piece 75 and the driving piece 92, and the interference-type driving piece 96 comes into contact with and presses the other driven piece 76. Further, at the time of reverse rotation of the drive gear, the other driving piece 93 biases the driven piece 76 while compressing the buffer member 101 between the other driven piece 76 and the driving piece 93, and the interference-type driving piece 96 comes into contact with and presses the one driven piece 75.

That is, the drive transmission mechanism 100 according to the fifth embodiment includes the two driven pieces 75 and 76 provided in the rotary member at a different circumferential position from each other, the two driving pieces 92 and 93 arranged in the drive gear at a different circumferential position from each other and having a positional relationship with respect to the two driven pieces 75 and 76 so as not to interfere with the driven piece, and the interference-type driving piece (the third driving piece) 96 having a positional relationship so as to interfere with the respective driven pieces 75 and 76. At the time of normal rotation illustrated in FIGS. 30, the interference-type driving piece 96 comes into contact with and presses the other driven piece 76, and at the time of reverse rotation illustrated in FIGS. 31, the interference-type driving piece 96 comes into contact with and presses the one driven piece 75. The buffer member 101 is arranged between the two driving pieces 92 and 93, and when the drive gear rotates in a normal rotation direction, biases the one driven piece 75 in the reverse rotation direction while being compressed between the one driving piece 92 and the one driven piece 75, and when the drive gear rotates in the reverse rotation direction, biases the other driven piece 76 in the reverse rotation direction while being compressed between the other driving piece 93 and the other driven piece 76.

Since the interference-type driving piece 96 directly comes into contact with and presses the second driven piece 76 without via the buffer member 101, the rotary member 70 is driven in a normal rotation direction in the process of normal rotation of the drive gear 90. When the drive gear rotates in a reverse rotation direction, the interference-type driving piece 96 directly comes into contact with and presses the first driven piece 75 without via the buffer member 101, thereby driving the rotary member 70 in the reverse rotation direction.

In each stage in FIGS. 30(*d*) and (*e*), the deceleration section G1 having a large circumferential length is formed between the first driving piece 92 and the first driven piece 75 due to the expanding action of the buffer member 101. Therefore, as illustrated in FIG. 30(*f*), the deceleration section G1 formed at a point in time when the rotary member stops has similarly a large circumferential length, thereby enabling to prevent overrun by performing deceleration with a margin of time.

The principle that the opening/closing member 50 can return to the initial rotation position by resolving overrun by cooperation of the deceleration section G1 and the attenuation action of the buffer member is the same as that of the respective embodiments described above.

The control procedure for illegal-act detecting and illegal-act preventing operation in the illegal-act preventing mechanism 24 according to the fifth embodiment is identical to the control procedure according to the first embodiment explained based on the flowchart of FIG. 9, and therefore redundant explanations thereof are omitted.

Operation of Illegal-Act Preventing Mechanism According to Fifth Embodiment

Next, a rotation-posture control procedure of the opening/closing member in the illegal-act preventing mechanism (drive transmission mechanism) according to the fifth embodiment is described with reference to FIG. 30 and FIG. 31. The flowchart in FIG. 11 is also referred to.

FIGS. 30(*a*) to (*f*) are explanatory diagrams of the rotation-posture control procedure of the opening/closing member at the time of normal rotation of the illegal-act preventing motor in the illegal-act preventing mechanism according to the fifth embodiment. Each of the drawings of FIGS. 30(*a*) to (*f*) correspond to respective drawings of (a) to (f) in each of the embodiments described above, and therefore redundant explanations thereof are omitted.

In the standby state in FIG. 30(*a*), the rotary member 70 has stopped rotation.

In the standby state in FIG. 30(*a*), the first driving piece 92 of the drive gear lightly compresses the buffer member 101 between the first driving piece 92 and the first driven piece 75. The interference-type driving piece 96 is in a non-contact state with any driven piece.

In the normal-rotation start state (Step 131) in (b), the buffer member 101 is strongly compressed between the first driving piece 92 and the first driven piece 75, and the interference-type driving piece 96 presses the second driven piece 76, to start normal rotation of the rotary member. When the rotary member starts normal rotation, as illustrated sequentially in (c) and (d), the roller homes out from the depressed portion, and moves onto the outer peripheral edge 73 to continue moving. The first driven piece 75 is not driven by a pressure from the compressed buffer member, but is driven solely by a pressing force from the interference-type driving piece 96.

The rotation-posture detecting unit 140 continuously detects whether the opening/closing member has returned to the initial rotation position during this period (Step 132).

After the roller has withdrawn from the depressed portion, as illustrated in (d) and (e), since the buffer member 101 is in an expanded state, the deceleration section G1 having a sufficiently large circumferential length (the angle θ1) is formed between the first driven piece 75 and the first driving piece 92. At the point of (d), the interference-type driving piece 96 and the second driven piece 76 have been already parted from each other, and transmission of the driving force is not being performed.

Subsequently, in the home-in state illustrated in (f), the driving piece 92 starts deceleration at a position illustrated in the drawing. That is, since transmission of the driving force from the motor 120 to the first driving piece 92 is blocked in a state with the large deceleration section G1 indicated by the angle θ1 in (f) being left between the first driving piece 92 and the first driven piece 75, thereafter, the first driving piece 92 continues to rotate in the normal rotation direction by the inertia. In the normal rotation process, the first driving piece 92 compresses the buffer member, while gradually decelerating by the buffering action due to squeezing of the buffer member 101, and can stop without applying an impact to the first driven piece 75. Therefore, the large deceleration section G1 formed at a point in time when the motor 120 stops can be ensured, and further, in combination with the buffering action of the buffer member, it can be prevented that the driven piece is pressed with an excessive force to cause overrun.

Figure 31:
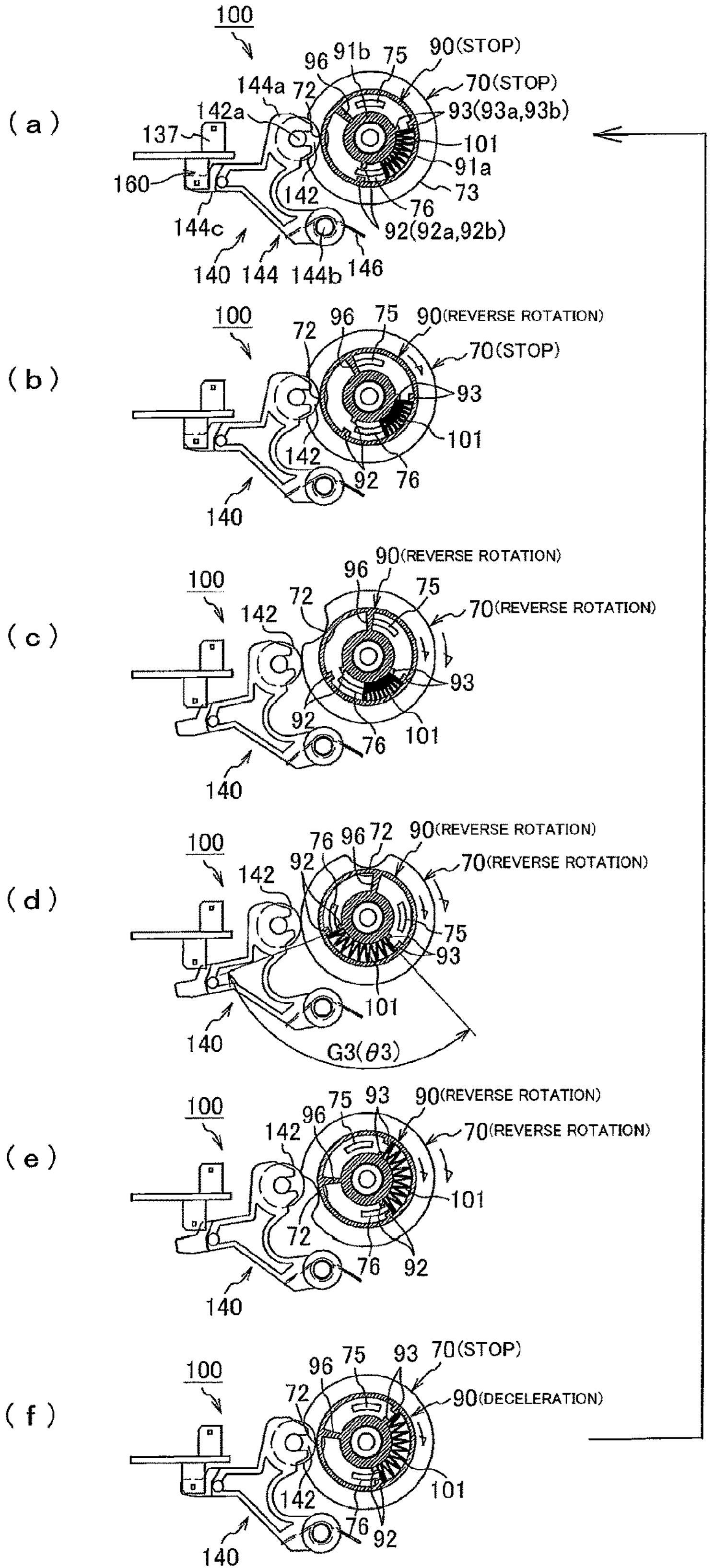
FIGS. 31(*a*) to (*f*) are explanatory diagrams of an operating procedure at the time of reverse rotation of the opening/closing member according to the fifth embodiment.

Next, FIGS. 31(*a*) to (*f*) are explanatory diagrams of a reverse-rotation operating procedure of the illegal-act preventing mechanism according to the fifth embodiment.

In FIG. 31(*a*), the rotary member 70 has stopped rotation.

In the standby state in (a), the second driving piece 93 of the drive gear lightly compresses the buffer member 101 between the second driving piece 93 and the second driven piece 76. The interference-type driving piece 96 is in a non-contact state with any driven piece.

In the reverse-rotation start state (Step 131) in (b), the buffer member 101 is strongly compressed between the second driving piece 93 and the second driven piece 76, and the interference-type driving piece 96 presses the first driven piece 75 in a clockwise direction, and thus the rotary member starts reverse rotation. When the rotary member starts reverse rotation, as illustrated sequentially in (c) and (d), the roller withdraws from the depressed portion (home-out), and moves onto the outer peripheral edge 73 to continue moving. The second driven piece 76 is not driven solely by the pressure from the compressed buffer member, but is driven by the pressing force from the interference-type driving piece 96.

After the roller has withdrawn from the depressed portion, as illustrated in (d) and (e), since the buffer member 101 is in an expanded state, the deceleration section G3 having a sufficiently large circumferential length (an angle θ3) is formed between the second driven piece 76 and the second driving piece 93. At the point of (d), the interference-type driving piece 96 and the first driven piece 75 have been already parted from each other, and transmission of the driving force is not being performed.

Regarding FIGS. 31(*e*) and (*f*), since only the rotation direction is reversed from the case of normal rotation illustrated in FIGS. 30(*a*) and (*f*), explanations thereof are omitted.

Summary of Configurations, Actions, and Effects of Present Invention

The illegal-act detecting mechanism 24 according to the first invention is means for detecting that illegal-act means U is attached to a banknote P transported along the transport route 10. The illegal-act preventing mechanism 24 includes the opening/closing member 50 that permits passage of a paper sheet at an initial rotation position, and blocks passage of the paper sheet at a non-initial rotation position deviated from the initial rotation position, the rotary member 70 that integrally rotates with the opening/closing member, the driving member 90 for driving the opening/closing member, which is arranged opposite to the rotary member and pivotally supported so as to be able to rotate relative to the rotary member, and the drive transmission mechanism 100 that intermittently transmits a driving force from the driving member to the rotary member. The drive transmission mechanism includes at least one driven piece provided in the rotary member 70, at least one driving piece that is provided in the driving member 90 and intermittently drives and rotates the rotary member by pressing the driven piece directly or indirectly in a circumferential direction in a process of rotational transfer relative to the driven piece, and the buffer member 101 that biases the driven piece and the driving piece in a direction away from each other.

The illegal-act detecting mechanism 24 according to the first invention corresponds to the first to fifth embodiments.

The illegal-act detecting mechanism 24 is means for reeling off illegal-act means such as a line material or a tape fixed to a paper sheet by rotating the opening/closing member 50 after the paper sheet has passed through the slit 52 provided in the opening/closing member 50 and physically detecting the illegal-act means, to prevent pullout of the paper sheet by using the illegal-act means. As the configuration of the opening/closing member, the slit is not essential, and the opening/closing member itself having no silt may open or close a passage, or a notch may be provided in the opening/closing member instead of the slit.

When it is set such that at the time of standby of the opening/closing member, the slit 52 is in an open state to permit passage of a paper sheet, if the opening/closing member overruns at the time of previous rotation and cannot stop at the position at which the slit is opened (initial rotation position), the paper sheet causes paper jam to inhibit a smooth and speedy operation.

As a method of preventing overrun, if the opening/closing member is reversely rotated and returned to the initial rotation position, or the motor is PWM-controlled, the processing time increases and the durability of components deteriorates.

On the other hand, in a configuration in which the driving member 90 is assembled to the rotary member 70 that is integrally formed with the opening/closing member 50 so as to be able to rotate relative to the rotary member, and a driven piece provided in the rotary member is driven intermittently by a driving piece provided on the side of the driving member 90 at a predetermined timing, the motor is stopped after the rotary member rotates n times and has returned to the initial rotation position. In this case, it is possible to ensure a deceleration section for decelerating the driving piece of the driving member having a momentum with respect to the driven piece of the rotary member that has stopped first. However, since the deceleration section is too small, the driving piece collides with the driven piece to cause overrun. Therefore, there are problems such as delay in the processing time for the rotary member to return to the initial rotation position by reverse rotation, and deterioration in the durability of the motor.

To prevent overrun when the opening/closing member having rotated n times stops at the initial rotation position, if the motor 120 is stopped to apply a brake ahead of the time before the rotary member reaches the initial rotation position (before the rotary member rotates 360 degrees), it becomes difficult to decide a braking timing. If the braking timing to stop the rotary member is too early, the driving piece comes into contact with the driven piece due to too much deceleration to stop the driving piece before moving the driven piece to the initial rotation position, thereby causing unfinished rotation (stoppage in a state with the rotation angle not reaching 360 degrees). It is difficult in practice to resolve such a problem because of the part accuracy for each paper sheet transport device, and variations in the assembly accuracy, and it is difficult to set a braking timing individually. Further, variations occur in the operation of the illegal-act preventing mechanism due to a difference in a temperature environment at a place where the paper sheet transport device is installed. For example, in a low temperature environment of 0 degree, an operation becomes slow and is likely to stop, and in a high temperature environment of 60 degrees, the durability of a small motor for which 500,000 operations are required is likely to decrease as compared with a normal temperature environment. It has been difficult to handle such problems by fine software control.

Further, when it is required to rotate the opening/closing member 50 twice or more every time one banknote passes for preventing an illegal act, the number of rotations required for the small motor becomes 1,000,000 rotations or more. If the motor is reversely rotated to correct the stop position after occurrence of overrun, the small motor will be rotated even more number of times.

On the other hand, according to the present invention, by a simple improvement of adding and arranging the buffer member 101 that biases the driven piece of the rotary member 70 and the driving piece of the driving member 90 in a direction away from each other, the deceleration section can be enlarged, and occurrence of overrun can be reliably prevented without requiring reverse rotation and complicated software control, and deterioration in the durability of the small motor can be prevented.

In line with the embodiments, the drive gear 90 (driving piece) continues to rotate within a range of a deceleration section by the inertia (by the own momentum) of the illegal-act preventing motor with respect to the rotary member 70 (driven piece) having stopped at an initial rotation position by being locked by the roller 142 after rotation of 360 degrees. That is, while the driving piece performs rotational transfer in the deceleration section while compressing the buffer member 101, the inertial force of the drive gear decreases due to the attenuation action of the buffer member, to alleviate the impact force when the driving piece presses the driven piece via the buffer member. Due to the buffering action, the rotary member locked by the roller can continuously maintain the stopped state at the initial rotation position, during a period in which the driving piece performs rotational transfer in the deceleration section. Therefore, the opening/closing member 50 is reliably positioned so that the guide slit 52 is at the initial rotation position.

The drive transmission mechanism 100 can prevent overrun not only at the time of normal rotation but also at the time of reverse rotation of the opening/closing member.

The illegal-act preventing mechanism 24 according to the second invention is characterized such that the driving pieces 92 and 93 and the driven pieces 75 and 76 have a radial positional relationship in which the driving piece and the driven piece do not interfere with each other, and one of the two driven pieces 75 and 76 at a different circumferential position from each other (for example, 75) and one of the driving pieces (for example, 92) press the buffer member 101 therebetween, which is arranged between the two driving pieces 92 and 93 at a different circumferential position from each other, and the other driven piece (for example, 76) and the other driving piece (for example, 93) press the buffer member therebetween.

The illegal-act preventing mechanism according to the second invention corresponds to the third and fifth embodiments.

The buffer member 101 may be arranged at any portion of the driving member and the rotary member, so long as the buffer member has a function of biasing the driving member and the rotary member away from each other in the circumferential direction. In this example, the buffer member is arranged between the two driving pieces 92 and 93 arranged away from each other. The driven pieces 75 and 76 advance or retreat relative to the buffer member to press the buffer member between the driving piece and the driven piece.

The drive transmission mechanism 100 can prevent overrun not only at the time of normal rotation but also at the time of reverse rotation of the opening/closing member.

The illegal-act preventing mechanism 24 according to the third invention is provided with the interference-type driving piece 96 that directly presses the driven pieces 75 and 76 in the driving member.

The third invention corresponds to the fifth embodiment.

Since the respective driven pieces are directly driven by the interference-type driving piece 96 being a rigid body, without via the buffer member whose behavior is not stable, a return timing can be set solely in a process in which the opening/closing member starts rotation from the initial rotation position, and after rotation is performed for 360 degrees, the opening/closing member returns to the initial rotation position again. Accordingly, stability of the rotation operation of the opening/closing member for illegal-act detection and illegal-act prevention can be improved.

The drive transmission mechanism 100 can prevent overrun not only at the time of normal rotation but also at the time of reverse rotation of the opening/closing member.

The illegal-act preventing mechanism 24 according to the fourth invention is characterized such that the driving pieces 92 and 93 and the driven pieces 75 and 76 have a radial positional relationship in which the driving piece and the driven piece do not interfere with each other, and one of the two driving pieces at a different circumferential position from each other (for example, 92) and one of the driven pieces (for example, 75) press the buffer member 101 therebetween, which is arranged between the two driven pieces at a different circumferential position from each other, and the other driving piece (for example, 93) and the other driven piece (for example, 76) press the buffer member therebetween.

The illegal-act preventing mechanism 24 according to the fourth invention corresponds to the second and fourth embodiments.

The buffer member 101 may be arranged at any portion of the driving member and the rotary member, so long as the buffer member has a function of biasing the driving member and the rotary member away from each other in the circumferential direction. In this example, the buffer member is arranged between the two driven pieces 75 and 76 arranged away from each other. The driving pieces 92 and 93 advance or retreat relative to the buffer member to press the buffer member between the driving piece and the driving piece.

The drive transmission mechanism 100 can prevent overrun not only at the time of normal rotation but also at the time of reverse rotation of the opening/closing member.

The illegal-act preventing mechanism 24 according to the fifth invention includes the interference-type driven piece 74 that is directly pressed by the driving pieces 92 and 93.

The fifth invention corresponds to the fourth embodiment.

Since the interference-type driven piece 74 is directly pressed by the respective driving pieces 92 and 93 being a rigid body, without via the buffer member whose behavior is not stable, a return timing can be set solely in the process in which the opening/closing member starts rotation from the initial rotation position, and after rotation is performed for 360 degrees, the opening/closing member returns to the initial rotation position again. Accordingly, stability of the rotation operation of the opening/closing member for illegal-act detection and illegal-act prevention can be improved.

The drive transmission mechanism 100 can prevent overrun not only at the time of normal rotation but also at the time of reverse rotation of the opening/closing member.

In the illegal-act preventing mechanism 24 according to the sixth invention, the buffer member 101 is arranged between one driven piece (75 or 76) and one driving piece (92 or 93), and comes in direct contact with one driven piece and presses the driven piece in a rotation direction, while being compressed between the one driving piece and the one driven piece at the time of rotation of the rotary member 90.

The sixth invention corresponds to the first embodiment.

Since the buffer member 101 is arranged between the one driven piece 74 and the one driving piece 92, the deceleration section when the opening/closing member 50 rotates once in one direction (in a normal rotation direction) can be ensured widely to prevent occurrence of overrun.

If the buffer member 101 is arranged also between the other driven piece 75 and the other driving piece 93, occurrence of overrun can be prevented also at the time of reverse rotation.

In the illegal-act detecting mechanism 24 according to the seventh invention, the drive transmission mechanism 100 includes the two driven pieces 75 and 76 arranged in the rotary member at a different circumferential position from each other, and the two driving pieces 92 and 93 arranged in the driving member at a different circumferential position from each other and having a radial positional relationship in which the driving piece does not interfere with the driven piece. The buffer member 101 is arranged in a circumferential gap formed between the two driven pieces 75 and 76, and when the driving member rotates in the normal rotation direction, biases the one driven piece 75 in the normal rotation direction while being compressed between the one driving piece 92 and the one driven piece 75, and when the driving member rotates in the reverse rotation direction, biases the other driven piece 76 in the reverse rotation direction while being compressed between the other driving piece 93 and the other driven piece 76.

The seventh invention corresponds to the second embodiment.

The effect of enlarging the deceleration section by the buffer member 101, thereby preventing overrun is the same as that of other inventions.

In the illegal-act preventing mechanism 24 according to the eighth invention, the drive transmission mechanism 100 includes the two driven pieces 75 and 76 arranged in the rotary member at a different circumferential position from each other, and the two driving pieces 92 and 93 arranged in the driving member at a different circumferential position from each other and having a radial positional relationship in which the driving piece does not interfere with the driven piece. The buffer member 101 is arranged between the two driving pieces 92 and 93, and when the driving member rotates in the normal rotation direction, biases the one driven piece 75 in the normal rotation direction while being compressed between the one driving piece 92 and the one driven piece 75, and when the driving member rotates in the reverse rotation direction, biases the other driven piece 76 in the reverse rotation direction while being compressed between the other driving piece 93 and the other driven piece 76.

The eighth invention corresponds to the third embodiment.

The effect of enlarging the deceleration section by the buffer member 101, thereby preventing overrun is the same as that of other inventions.

In the illegal-act preventing mechanism 24 according to the ninth invention, the drive transmission mechanism 100 includes the two driven pieces 75 and 76 arranged in the rotary member at a different circumferential position from each other, the one third driven piece (interference-type driven piece) 74, and the two driving pieces 92 and 93 arranged in the driving member at a different circumferential position from each other and having a positional relationship with respect to the driven pieces in which the driving piece does not interfere with the two driven pieces, but interferes with the third driven piece 74. At the time of normal rotation, the one driving piece 93 comes into contact with and presses the third driven piece 74, and at the time of reverse rotation, the other driving piece 92 comes into contact with and presses the third driven piece 74. The buffer member 101 is arranged between the two driven pieces 75 and 76, and when the driving member rotates in the normal rotation direction, the buffer member 101 biases the one driven piece 75 in the normal rotation direction, while being compressed between the other driving piece 92 and the one driven piece 75, and when the driving member rotates in the reverse rotation direction, the buffer member 101 biases the other driven piece 76 in the normal rotation direction, while being compressed between the one driving piece 93 and the other driven piece 76.

The ninth invention corresponds to the fourth embodiment.

Since the third driven piece 74 is directly driven by the driving pieces 92 and 93 each being a rigid body, without via the buffer member whose behavior is not stable, a timing to return to the initial rotation position can be set solely. Accordingly, stability of the rotation operation of the opening/closing member for illegal-act detection and illegal-act prevention can be improved.

The effect of enlarging the deceleration section by the buffer member 101, thereby preventing overrun is the same as that of other inventions.

In the illegal-act preventing mechanism 24 according to the tenth invention, the drive transmission mechanism 100 includes the two driven pieces 75 and 76 arranged in the rotary member at a different circumferential position from each other, the two driving pieces 92 and 93 arranged in the driving member at a different circumferential position from each other and having a positional relationship so as not to interfere with the two driven pieces 75 and 76, and the third driving piece 96 having a positional relationship so as to interfere with the respective driven piece 75 and 76. When the driving member rotates in the normal rotation direction, the third driving piece 96 comes into contact with and presses the one driven piece 76, and when the driving member rotates in the reverse rotation direction, the third driving piece 96 comes into contact with and presses the other driven piece 75. The buffer member 101 is arranged between the two driving pieces 92 and 93, and when the driving member rotates in the normal rotation direction, biases the other driven piece 75 in the normal rotation direction while being compressed between the one driving piece 92 and the other driven piece 75, and when the driving member rotates in the reverse rotation direction, biases the one driven piece 76 in the reverse rotation direction while being compressed between the other driving piece 93 and the one driven piece 76.

The tenth invention corresponds to the fifth embodiment.

Since the respective driven pieces are directly driven by the interference-type driving piece 96 being a rigid body, without via the buffer member whose behavior is not stable, a return timing can be set solely in a process of returning to the initial rotation position. Accordingly, stability of the rotation operation of the opening/closing member for illegal-act detection and illegal-act prevention can be improved.

The illegal-act detecting mechanism 24 according to the eleventh invention includes the illegal-act preventing motor that drives the driving member, the rotation-posture detecting unit that detects that the opening/closing member is at an initial rotation position, and the control unit that controls the illegal-act preventing motor. The control unit turns off the illegal-act preventing motor when the rotation-posture detecting unit is detecting that the opening/closing member is at the initial rotation position.

When the opening/closing member is at a non-initial rotation position, the control unit drives the motor to rotate the driving member.

The paper sheet transport device according to the twelfth invention includes the illegal-act detecting mechanism according to any of the first to eleventh inventions.

According to the paper sheet transport device, the illegal-act detecting and illegal-act preventing effects exerted by the respective illegal-act detecting mechanisms can be exerted.

The paper sheet transport device according to the thirteenth invention includes the paper sheet transport device described above.

According to the paper sheet transport device, the illegal-act detecting and illegal-act preventing effects exerted by the respective illegal-act detecting mechanisms can be exerted.

REFERENCE SIGNS LIST

1 banknote transport device, 3 lower unit, 4 upper unit, 10 banknote transport route, 12 inlet, 16, 20, 28 roller pair, 14 inlet sensor, 18 optical recognition sensor, 22, 26 paper-passage sensor, 24 illegal-act preventing mechanism, 28 outlet roller pair, 30 outlet sensor, 32 outlet, 50 opening/closing member, 52 guide slit, 54 rotation shaft, 56 concavities and convexities, 70 rotary member, 71a annular convex portion, 71*b* central convex portion, 71*c* recess, 72, depressed portion, 73 outer peripheral edge, 74 driven piece, 76, 77 driven piece, 90 drive gear (drive member), 92, 93, 96 driving piece, 100 drive transmission mechanism, 101 buffer member, 120 illegal-act preventing motor, 130 gear mechanism, 132, 133, 134 relay gear, 135 pulse plate, 137 photo interrupter, 140 rotation-posture detecting unit, 142 roller (follow-up member), 142*a* shaft, 144 lever, 144*a* support portion, 144*b* shaft portion, 144*c* detected portion, 146 lever biasing member, 160 home-position detecting sensor, 200 control unit.

The invention claimed is:

1. An illegal-act detecting mechanism that detects that illegal-act means is attached to a paper sheet to be transported, comprising:
- an opening/closing member that permits passage of the paper sheet at an initial rotation position, and blocks passage of the paper sheet at a non-initial rotation position deviated from the initial rotation position;
- a rotary member that integrally rotates with the opening/closing member;
- a driving member for driving the opening/closing member, which is arranged opposite to the rotary member and pivotally supported so as to be able to rotate relative to the rotary member; and
- a drive transmission mechanism that transmits a driving force from the driving member to the rotary member, wherein
- the drive transmission mechanism includes at least one driven piece provided in the rotary member, at least one driving piece that is provided in the driving member and intermittently drives and rotates the rotary member by pressing the driven piece directly or indirectly in a process of rotational transfer relative to the driven piece, and a buffer member that biases the driven piece and the driving piece in a direction away from each other.

2. The illegal-act detecting mechanism according to claim 1, wherein the driving piece and the driven piece have a radial positional relationship in which the driving piece and the driven piece do not interfere with each other, and one of two driven pieces at a different circumferential position from each other and one of two driving pieces press the buffer member therebetween, which is arranged between the two driving pieces at a different circumferential position from each other, and the other driven piece and the other driving piece press the buffer member therebetween.

3. The illegal-act detecting mechanism according to claim 2, wherein the driving member includes an interference-type driving piece that directly presses the driven piece.

4. The illegal-act detecting mechanism according to claim 1, wherein the driving piece and the driven piece have a radial positional relationship in which the driving piece and the driven piece do not interfere with each other, and one of two driving pieces at a different circumferential position from each other and one of two driven pieces press the buffer member therebetween, which is arranged between the two driven pieces at a different circumferential position from each other, and the other driving piece and the other driven piece press the buffer member therebetween.

5. The illegal-act detecting mechanism according to claim 4, wherein the rotary member includes a third driven piece that is directly pressed by the driving piece.

6. The illegal-act detecting mechanism according to claim 1, wherein the buffer member is arranged between one of the driven pieces and one of the driving pieces, and when the driving member rotates, the buffer member comes in direct contact with the one driven piece to press the one driven piece in a rotation direction, while being compressed between the one driving piece and the one driven piece.

7. The illegal-act detecting mechanism according to claim 1, wherein
- the drive transmission mechanism includes two driven pieces arranged in the rotary member at a different circumferential position from each other, and two driving pieces arranged in the driving member at a different circumferential position from each other and having a radial positional relationship in which the driving piece does not interfere with the driven piece, and
- the buffer member is arranged between the two driven pieces, and when the driving member rotates in a normal rotation direction, biases one of the driven pieces in the normal rotation direction while being compressed between the one driving piece and the one driven piece, and when the driving member rotates in a reverse rotation direction, biases the other driven piece in the reverse rotation direction while being compressed between the other driving piece and the other driven piece.

8. The illegal-act detecting mechanism according to claim 1, wherein
- the drive transmission mechanism includes two driven pieces arranged in the rotary member at a different circumferential position from each other, and two driving pieces arranged in the driving member at a different circumferential position from each other and having a radial positional relationship in which the driving piece does not interfere with the driven piece, and
- the buffer member is arranged between the two driving pieces, and when the driving member rotates in a normal rotation direction, biases one of the driven pieces in the normal rotation direction while being compressed between the one driving pieces and the one driven piece, and when the driving member rotates in a reverse rotation direction, biases the other driven piece in the reverse rotation direction while being compressed between the other driving piece and the other driven piece.

9. The illegal-act detecting mechanism according to claim 1, wherein
- the drive transmission mechanism includes two driven pieces arranged in the rotary member at a different circumferential position from each other, one third driven piece, and the two driving pieces arranged in the driving member at a different circumferential position from each other and having a positional relationship with respect to the driven pieces in which the driving piece does not interfere with the two driven pieces, but interferes with the third driven piece, at a time of normal rotation, one of the driving pieces comes into contact with and presses the third driven piece, and at a time of reverse rotation, the other driving piece comes into contact with and presses the third driven piece, the buffer member is arranged between the two driven pieces, and when the driving member rotates in a normal rotation direction, the buffer member biases the one of the driven pieces in the reverse rotation direction, while being compressed between the one driving piece and the one driven piece, and when the driving member rotates in a reverse rotation direction, the buffer member biases the other driven piece in the reverse rotation direction, while being compressed between the other driving piece and the other driven piece.

10. The illegal-act detecting mechanism according to claim 1, wherein the drive transmission mechanism includes two driven pieces arranged in the rotary member at a different circumferential position from each other, two driving pieces arranged in the driving member at a different circumferential position from each other and having a positional relationship so as not to interfere with the two driven pieces, and a third driving piece having a positional relationship so as to interfere with each driven piece, and when the driving member rotates in a normal rotation direction, the third driving piece comes into contact with and presses one of the driven pieces, and when the driving member rotates in a reverse rotation direction, the third driving piece comes into contact with and presses the other driven piece, and the buffer member is arranged between the two driving pieces, and when the driving member rotates in the normal rotation direction, biases the other driven piece in the normal rotation direction while being compressed between the one driving piece and the other driven piece, and when the driving member rotates in the reverse rotation direction, biases the one driven piece in the reverse rotation direction while being compressed between the other driving piece and the one driven piece.

11. The illegal-act detecting mechanism according to claim 1, comprising:

an illegal-act preventing motor that drives the driving member;

a rotation-posture detecting unit that detects that the opening/closing member is at an initial rotation position; and a control unit that controls the illegal-act preventing motor, wherein the control unit turns off the illegal-act preventing motor when the rotation-posture detecting unit is detecting that the opening/closing member is at the initial rotation position.

12. A paper sheet transport device comprising the illegal-act detecting mechanism according to claim 1.

13. A paper sheet handling device comprising the paper sheet transport device according to claim 12.

* * * * *